(12) United States Patent
Rahman et al.

(10) Patent No.: US 11,336,351 B2
(45) Date of Patent: May 17, 2022

(54) METHOD AND APPARATUS FOR HIGHER RANK CSI REPORTING IN ADVANCED WIRELESS COMMUNICATION SYSTEMS

(71) Applicant: Samsung Electronics Co., Ltd., Suwon-si (KR)

(72) Inventors: Md Saifur Rahman, Mountain View, CA (US); Eko Onggosanusi, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 16/608,785

(22) PCT Filed: Apr. 25, 2018

(86) PCT No.: PCT/KR2018/004797
§ 371 (c)(1),
(2) Date: Oct. 25, 2019

(87) PCT Pub. No.: WO2018/199626
PCT Pub. Date: Nov. 1, 2018

(65) Prior Publication Data
US 2020/0220597 A1 Jul. 9, 2020

Related U.S. Application Data

(63) Continuation of application No. 15/961,546, filed on Apr. 24, 2018, now Pat. No. 10,389,426.
(Continued)

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0469* (2013.01); *H04B 7/0486* (2013.01)

(58) Field of Classification Search
CPC .. H04B 7/0478; H04B 7/0639; H04B 7/0469; H04B 7/0486; H04B 7/0456
See application file for complete search history.

(56) References Cited

U.S. PATENT DOCUMENTS

2013/0229980 A1* 9/2013 Wernersson ......... H04B 7/0617
370/328
2014/0098689 A1 4/2014 Lee et al.
(Continued)

FOREIGN PATENT DOCUMENTS

WO 2016/175623 A1 11/2016
WO 2017010753 A1 1/2017
(Continued)

OTHER PUBLICATIONS

International Search Report dated Sep. 12, 2018 in connection with International Patent Application No. PCT/KR2018/004797, 3 pages.
(Continued)

*Primary Examiner* — Sung S Ahn

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of operating a user equipment (UE) for CSI feedback is provided. The method comprises receiving configuration information for the CSI feedback from a base station (BS) and identifying a number of antenna ports for the CSI feedback. The method comprises, if the number of antenna ports is <16, identifying a first codebook for the CSI feedback corresponding to a rank value of 3 or 4, and, if
(Continued)

otherwise, identifying a second codebook for the CSI feedback corresponding to the rank value of 3 or 4. The method comprises generating the CSI feedback using the identified codebook and transmitting the generated CSI feedback to the BS. The first codebook has a structure that partitions the antenna ports into two equal partitions. The second codebook has a structure that partitions the antenna ports into four equal partitions by partitioning each partition into two equal sub-partitions.

24 Claims, 19 Drawing Sheets

Related U.S. Application Data

(60) Provisional application No. 62/532,864, filed on Jul. 14, 2017, provisional application No. 62/530,758, filed on Jul. 10, 2017, provisional application No. 62/527,234, filed on Jun. 30, 2017, provisional application No. 62/520,995, filed on Jun. 16, 2017, provisional application No. 62/490,882, filed on Apr. 27, 2017, provisional application No. 62/489,627, filed on Apr. 25, 2017.

(56) References Cited

U.S. PATENT DOCUMENTS

| | | | |
|---|---|---|---|
| 2016/0043791 A1* | 2/2016 | Nam | H04B 7/0482 |
| | | | 375/267 |
| 2016/0182137 A1 | 6/2016 | Onggosanusi et al. | |
| 2016/0323022 A1* | 11/2016 | Rahman | H04B 7/0478 |
| 2017/0041051 A1 | 2/2017 | Rahman et al. | |
| 2018/0034519 A1 | 2/2018 | Rahman et al. | |
| 2018/0198510 A1 | 7/2018 | Park et al. | |
| 2018/0316407 A1 | 11/2018 | Rahman et al. | |
| 2018/0343046 A1 | 11/2018 | Park et al. | |
| 2019/0158161 A1 | 5/2019 | Faxer et al. | |

FOREIGN PATENT DOCUMENTS

| | | |
|---|---|---|
| WO | 2018/021836 A1 | 2/2018 |
| WO | 2018/199625 A1 | 11/2018 |
| WO | 2019/032018 A1 | 2/2019 |

OTHER PUBLICATIONS

NTT Docomo, "Clarification of advanced CSI feedback on PUSCH", 3GPP TSG RAN WG1 Meeting #88b, Apr. 3-7, 2017, 6 pages, R1-1705678.

Ericsson, "Type I CSI codebook", 3GPP TSG-RAN WG1 Meeting #88bis, Apr. 3-7, 2017, 11 pages, R1-1706164.

Huawei, HiSilicon, "DL Codebook design for multi-panel structured MIMO in NR", 3GPP TSG RAN WG1 Meeting #88, Feb. 13-17, 2017, 6 pages, R1-1701691.

"3rd Generation Partnership Project; Technical Specification Group Radio Access Network; Evolved Universal Terrestrial Radio Access (E-UTRA); Physical channels and modulation (Release 14)", Technical Specification 3GPP TS 36.211 V14.2.0, Mar. 2017, 194 pages.

"3rd Generation Partnership Project; Technical Specification Group Radio Access Network; Evolved Universal Terrestrial Radio Access (E-UTRA); Multiplexing and channel coding (Release 14)", Technical Specification 3GPP TS 36.212 V14.2.0, Mar. 2017, 197 pages.

"3rd Generation Partnership Project; Technical Specification Group Radio Access Network; Evolved Universal Terrestrial Radio Access (E-UTRA); Physical layer procedures (Release 14)", Technical Specification 3GPP TS 36.213 V14.2.0, Mar. 2017, 454 pages.

"3rd Generation Partnership Project; Technical Specification Group Radio Access Network; Evolved Universal Terrestrial Radio Access (E-UTRA); Medium Access Control (MAC) protocol specification (Release 14)", Technical Specification 3GPP TS 36.321 V14.2.0, Mar. 2017, 106 pages.

"3rd Generation Partnership Project; Technical Specification Group Radio Access Network; Evolved Universal Terrestrial Radio Access (E-UTRA); Radio Resource Control (RRC); Protocol specification (Release 14)", Technical Specification 3GPP TS 36.331 V14.2.0, Mar. 2017, 721pages.

"3rd Generation Partnership Project; Technical Specification Group Services and System Aspects; Feasibility Study on New Services and Markets Technology Enablers; Stage 1 (Release 14)", Technical Report 3GPP TR 22.891 V1.2.0, Nov. 2015, 96 pages.

Qualcomm Incorporated, "CSI feedback performance requirements for eFD-MIMO Advanced CSI", 3GPP TSG-RAN WG4 #82bis, Apr. 3-7, 2017, R4-1703255, 6 pages.

Samsung, "Test case design for advanced CSI reporting", 3GPP TSG-RAN WG4 Meeting #82bis, Apr. 3-7, 2017, R4-1704165, 4 pages.

Supplementary European Search Report dated Mar. 27, 2020 in connection with European Patent Application No. 18 79 0463, 14 pages.

* cited by examiner

FIG. 15

METHOD AND APPARATUS FOR HIGHER RANK CSI REPORTING IN ADVANCED WIRELESS COMMUNICATION SYSTEMS

CROSS-REFERENCE TO RELATED APPLICATIONS

This application is a 371 National Stage of International Application No. PCT/KR2018/004797, filed Apr. 25, 2018, which claims the benefit of U.S. Provisional Application No. 62/532,864, filed Jul. 14, 2017, U.S. Provisional Application No. 62/530,758, filed Jul. 10, 2017, U.S. Provisional Application No. 62/527,234, filed Jun. 30, 2017, U.S. Provisional Application No. 62/520,995, filed Jun. 16, 2017, U.S. Provisional Application No. 62/490,882, filed Apr. 27, 2017, U.S. Provisional Application No. 62/489,627, filed Apr. 25, 2017, and is a continuation of application Ser. No. 15/961,546, filed Apr. 24, 2018, the disclosures of which are herein incorporated by reference in their entirety.

TECHNICAL FIELD

The present disclosure relates generally to CSI reporting schemes in advanced wireless communication systems.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology". "wired/wireless communication and network infrastructure". "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Understanding and correctly estimating the channel in an advance wireless communication system between a user equipment (UE) and an eNode B (eNB) is important for efficient and effective wireless communication.

DISCLOSURE

Technical Problem

In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

Technical Solution

In one embodiment, a UE for channel state information (CSI) feedback is provided. The UE includes a transceiver configured to receive, from a base station (BS), configuration information for the CSI feedback. The UE further includes a processor operably connected to the transceiver. The processor is configured to identify a number of antenna ports for the CSI feedback, if the number of antenna ports is <16, identify a first codebook for the CSI feedback corresponding to a rank value of 3 or 4, if the number of antenna ports is ≥16, identify a second codebook for the CSI feedback corresponding to the rank value of 3 or 4; and generate the CSI feedback using the identified codebook. The transceiver is further configured to transmit the generated CSI feedback to the BS. The first codebook has a structure that partitions the antenna ports into two equal partitions, $P_i$ where i=0,1, and the second codebook has a structure that partitions the antenna ports into four equal partitions by partitioning each partition $P_i$ further into two equal sub-partitions, $P_{i,j}$ where j=0, 1. The rank value corresponds to a plurality of layers indicated by a RI.

In another embodiment, a BS is provided. The BS includes a processor configured to generate configuration information for a CSI feedback. The BS further includes a transceiver operably connected to the processor. The transceiver is configured to transmit, to a UE, the configuration information for the CSI feedback and receive, from the UE, the CSI feedback generated by the UE. If a number of antenna ports for the CSI feedback is <16, the CSI feedback corresponding to a rank value of 3 or 4 is generated based on a first codebook. If the number of antenna ports is ≥16, the CSI feedback corresponding to the rank value of 3 or 4 is generated based on a second codebook. The first codebook has a structure that partitions the antenna ports into two equal partitions, $P_i$ where i=0,1, and the second codebook has a structure that partitions the antenna ports into four equal partitions by partitioning each partition $P_i$ further into two equal sub-partitions, $P_{i,j}$ where j=0, 1. The rank value corresponds to a plurality of layers indicated by a RI.

In yet another embodiment, a method of operating a UE for CSI feedback is provided. The method comprises receiving, from a BS, configuration information for the CSI feedback, identifying a number of antenna ports for the CSI feedback, if the number of antenna ports is <16, identifying a first codebook for the CSI feedback corresponding to a rank value of 3 or 4, if the number of antenna ports is ≥16, identifying a second codebook for the CSI feedback corresponding to the rank value of 3 or 4, generating the CSI feedback using the identified codebook, and transmitting the generated CSI feedback to the BS. The first codebook has a structure that partitions the antenna ports into two equal partitions, $P_i$ where i=0,1, and the second codebook has a structure that partitions the antenna ports into four equal partitions by partitioning each partition $P_i$ further into two equal sub-partitions, $P_{i,j}$ where j=0, 1. The rank value corresponds to a plurality of layers indicated by a rank RI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Advantageous Effects

Embodiments of the present disclosure provide methods and apparatuses for CSI reporting in an advanced wireless communication system.

DESCRIPTION OF DRAWINGS

For a more complete understanding of the present disclosure and its advantages, reference is now made to the following description taken in conjunction with the accompanying drawings, in which like reference numerals represent like parts:

FIG. 15 illustrates an example orthogonal beam groups according to embodiments of the present disclosure;

MODE FOR INVENTION

Figure 1:
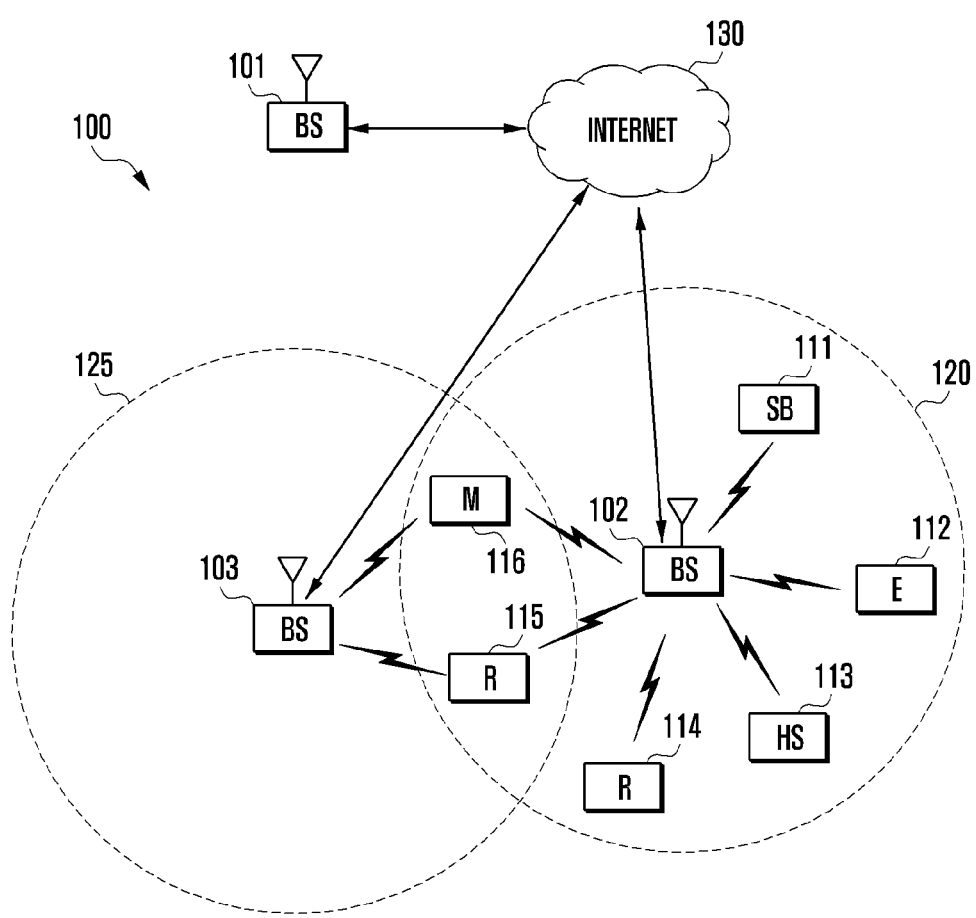
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0, "E-UTRA, Physical Layer Procedures;" 3GPP TS 36.321 v14.2.0, "E-UTRA, Medium Access Control (MAC) protocol specification;" 3GPP TS 36.331 v14.2.0, "E-UTRA, Radio Resource Control (RRC) protocol specification;" 3GPP TR 22.891 v1.2.0, "Feasibility Study on New Services and Markets Technology Enablers;" and 3GPP RAN 1 meeting #89, Chairman's note.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
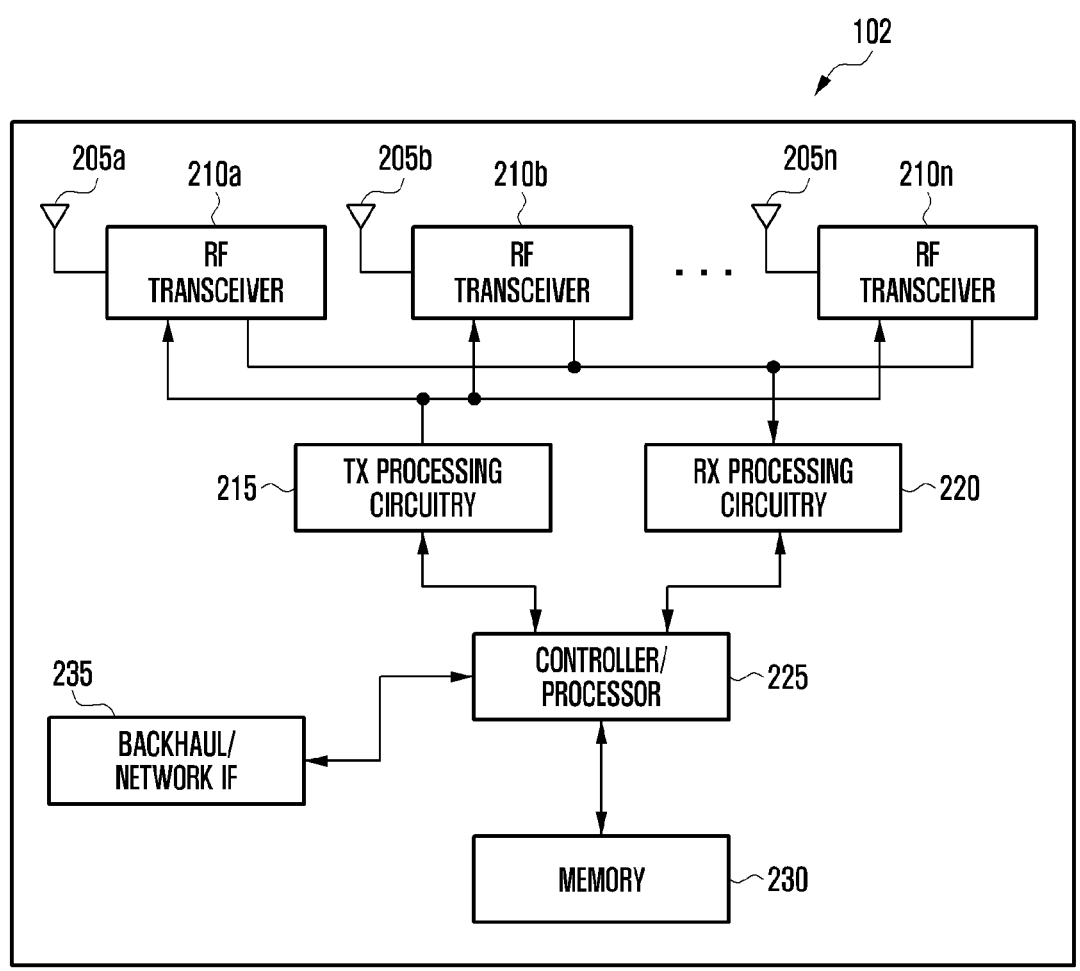
FIG. 2 illustrates an example eNB according to embodiments of the present disclosure.
Figure 3:
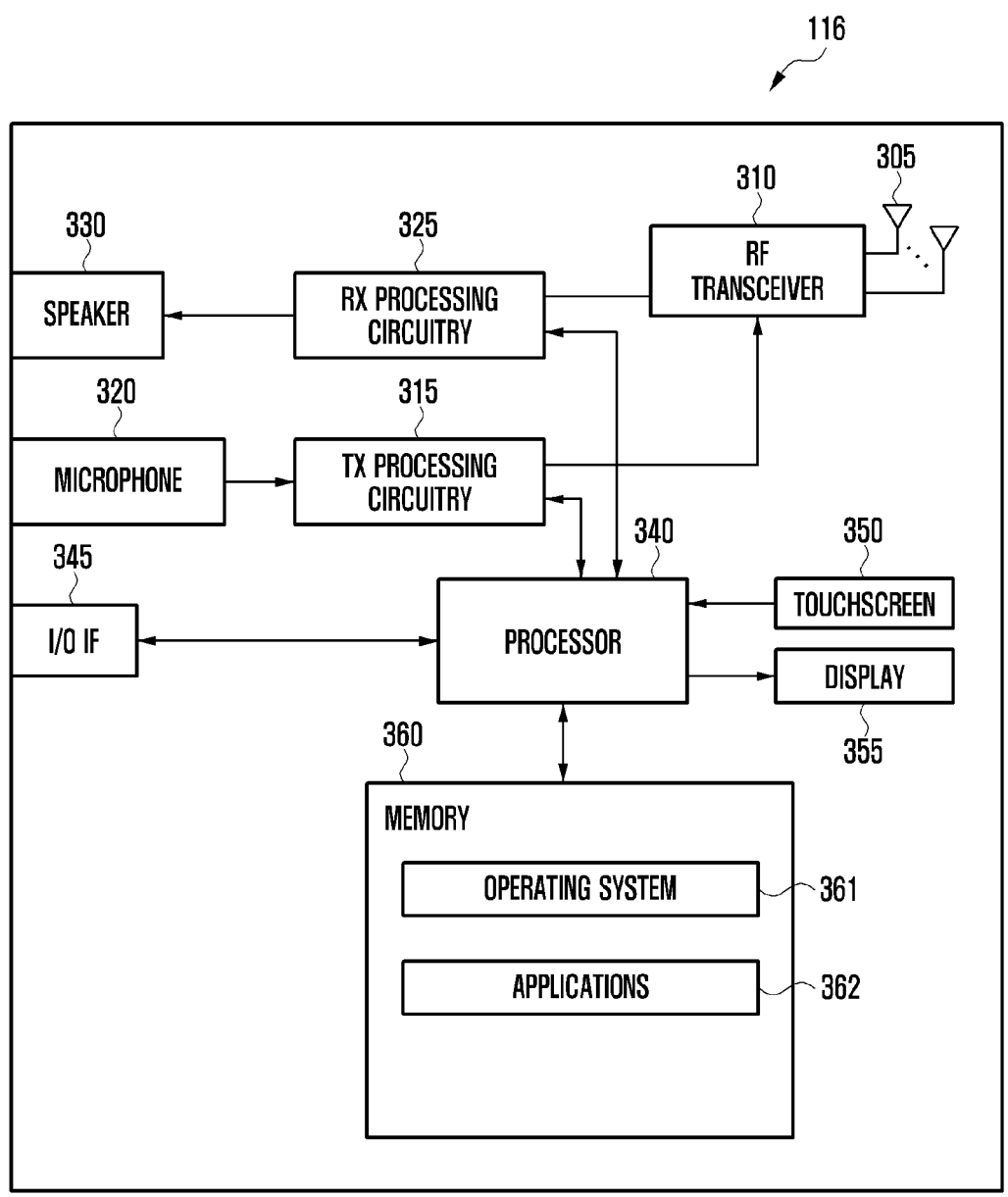
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting in an advanced wireless communication system. In certain embodiments, and one or more of the eNBs 101-103 includes circuitry, programming, or a combination thereof, for receiving efficient CSI reporting in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
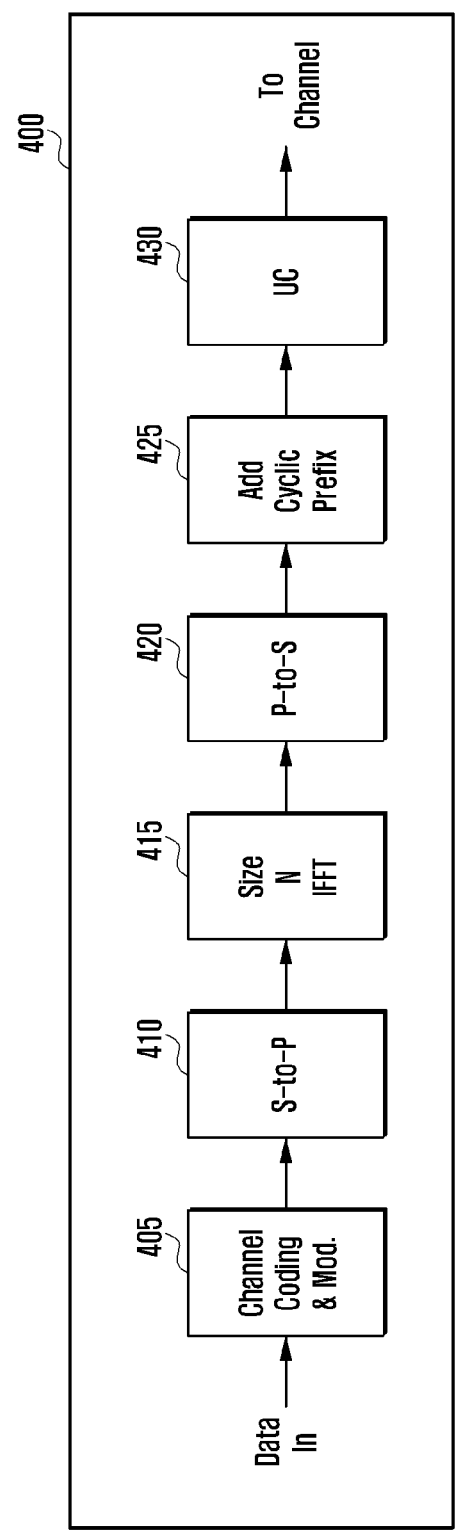
FIG. 4A illustrates a high-level diagram of an orthogonal frequency division multiple access transmit path according to embodiments of the present disclosure.
Figure 4B:
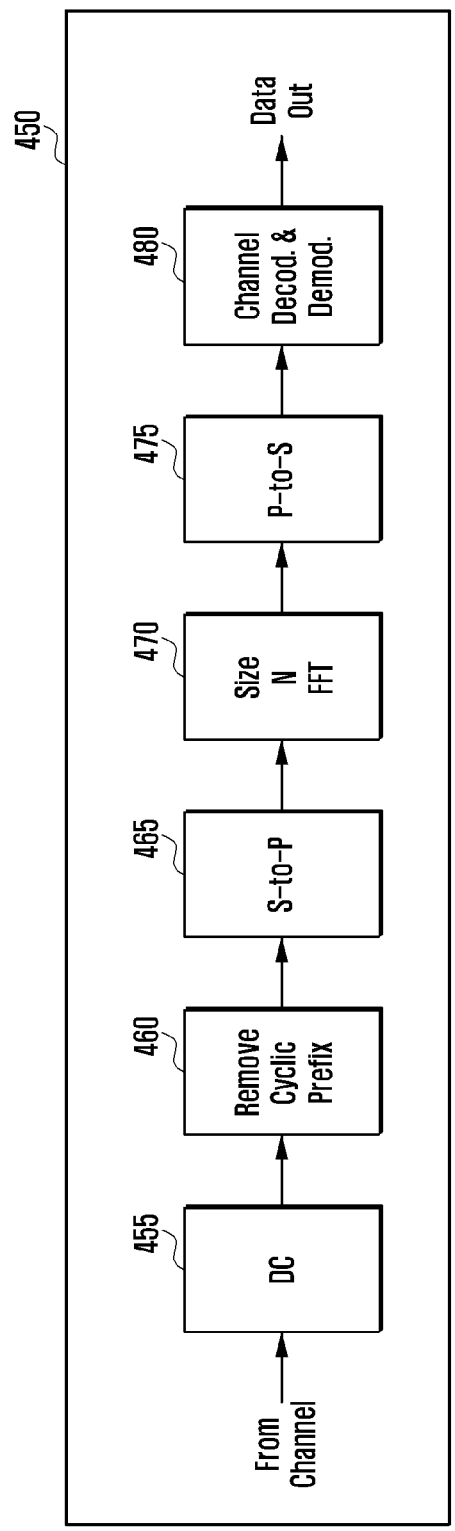
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{sumb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
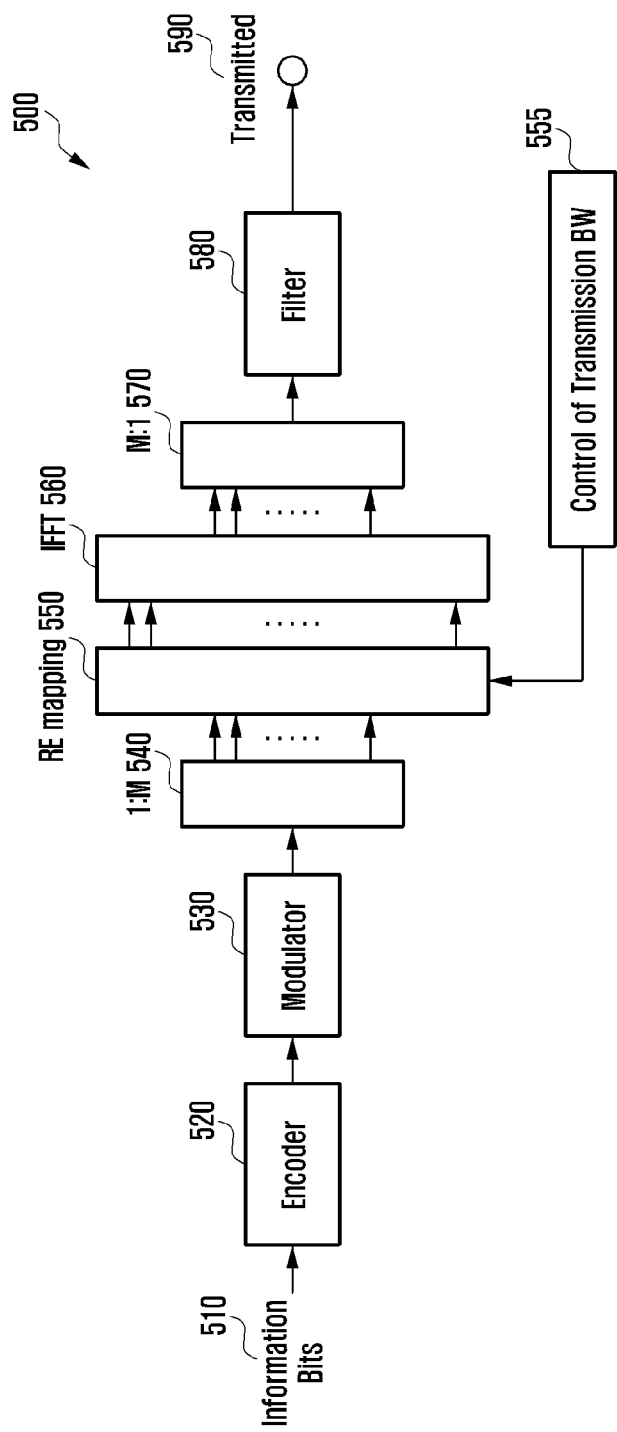
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
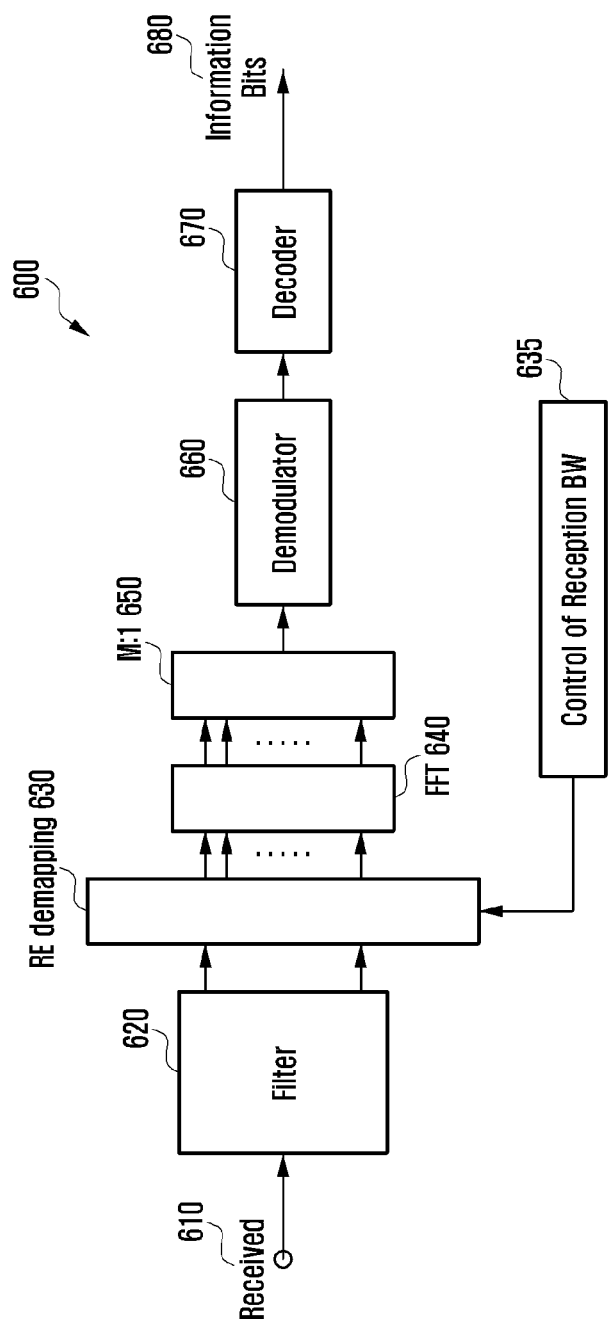
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
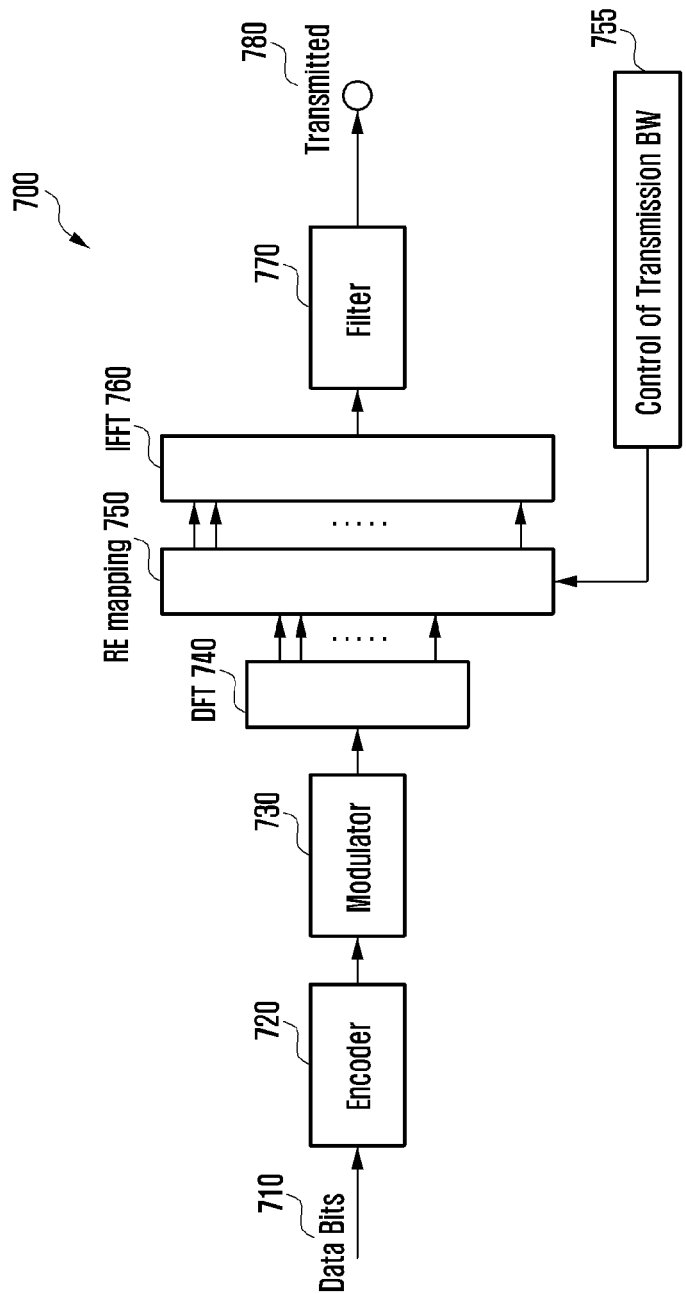
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
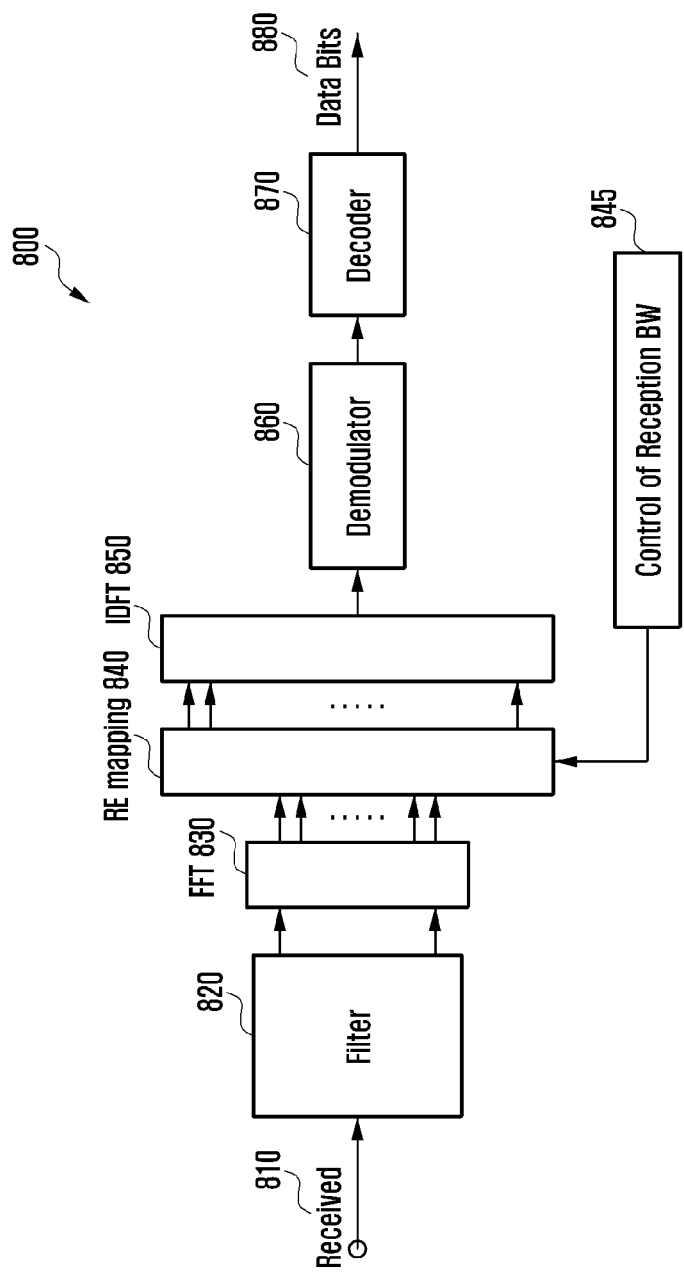
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
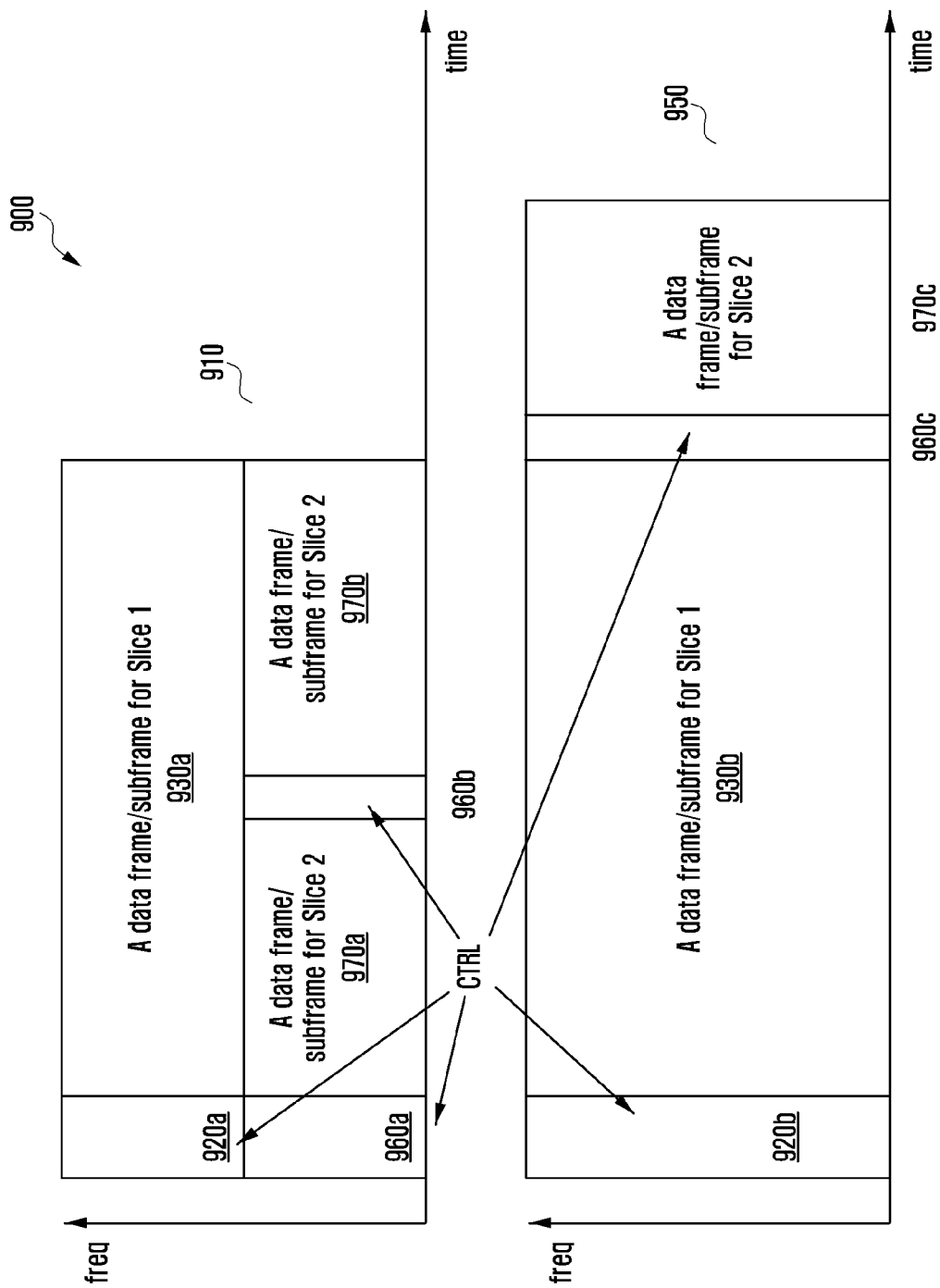
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
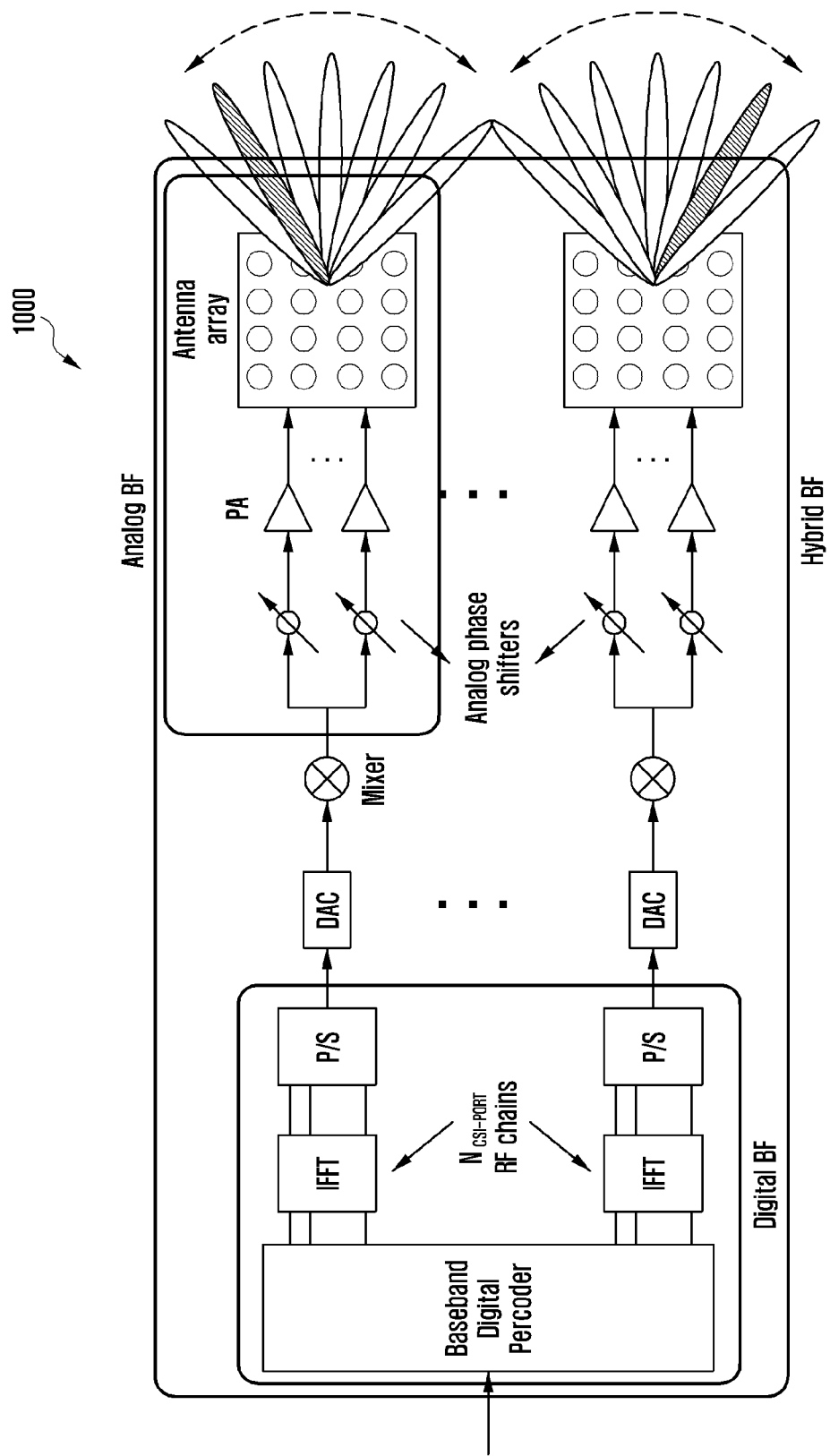
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
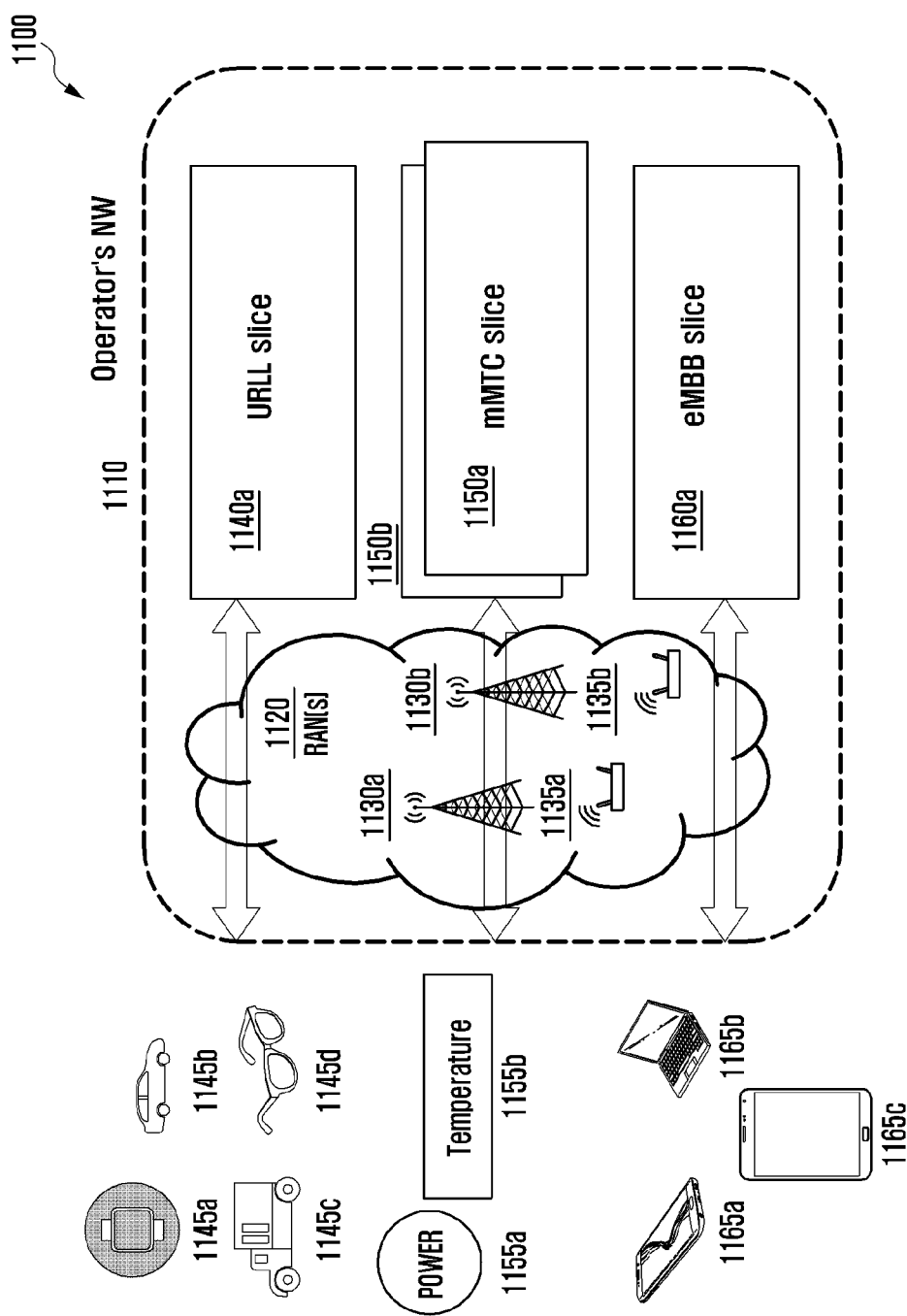
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the block diagram 100.

In order for the 5G network to support such diverse services with different quality of services (QoS), one scheme has been identified in LTE specification, called network slicing.

As shown in FIG. 11, An operator's network 1110 includes a number of radio access network(s) 1120 (RAN(s)) that are associated with network devices as eNBs 1130a and 1130b, small cell base stations (femto/pico eNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

From LTE specification, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, in LTE specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in LTE specification, which, at the very least, can serve as a good starting point to design advanced CSI scheme in NR MIMO. Compared to LTE specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for LTE eFD-MIMO. Such high throughput requirements can only met with a mechanism to provide very accurate CSI to the eNB.

In one example of beamforming, following the trend established in FD-MIMO, NR MIMO system may be beamformed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals.

Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 12:
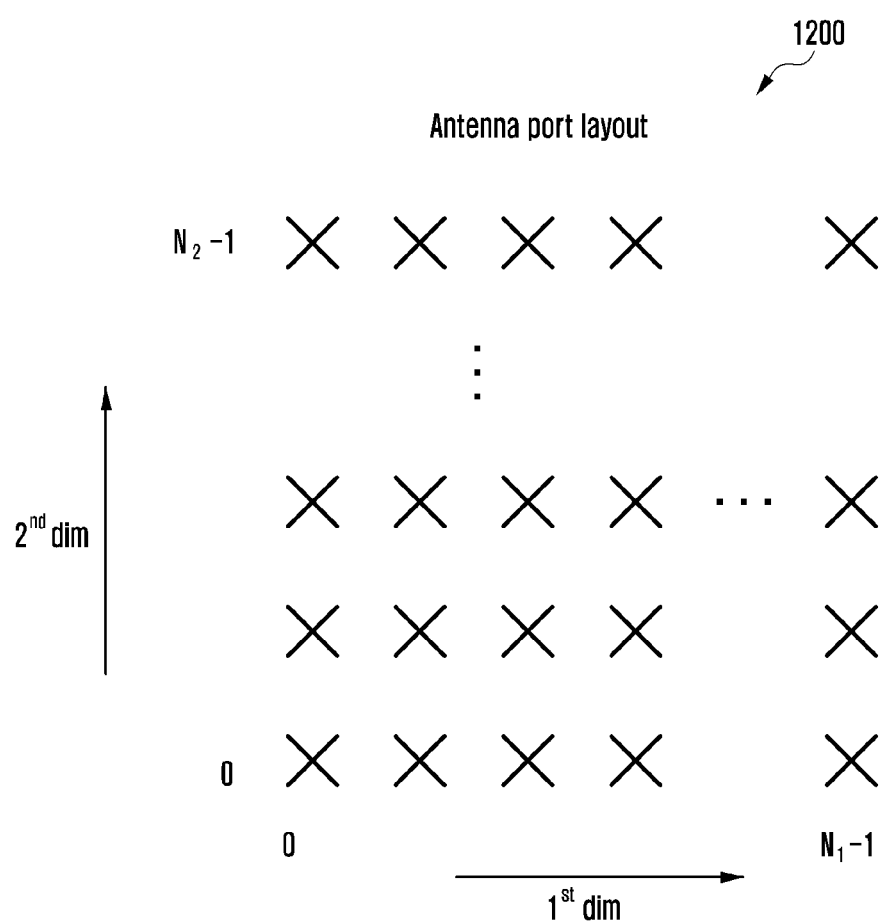
FIG. 12 illustrates an example 2D antenna port layout according to embodiments of the present disclosure.

FIG. 12 illustrates an example 2D antenna port layout 1200 according to embodiments of the present disclosure. The embodiment of the 2D antenna port layout 1200 illustrated in FIG. 12 is for illustration only. FIG. 12 does not limit the scope of this disclosure to any particular implementation.

The present disclosure assumes that $N_1$ and $N_2$ are the number of antenna ports with the same polarization in the first and second dimensions, respectively. For 2D antenna port layouts, the present disclosure has $N_1>1$, $N_2>1$, and for 1D antenna port layouts $N_1>1$ and $N_2=1$. So, for a dual-polarized antenna port layout, the total number of antenna ports is $P=2N_1N_2$.

LTE Class A PMI codebooks for 3 and 4 layers, and for Codebook-Config=1 as in LTE specification are as follows. For 8 antenna ports {15,16,17,18,19,20,21,22}, 12 antenna ports {15,16,17,18,19,20,21,22,23,24,25,26}, 16 antenna ports {15,16,17,18,19,20,21,22,23,24,25,26,27,28,29,30}, 20 antenna ports {15, 16, 17, . . . , 34}, 24 antenna ports {15, 16, 17, . . . , 38}, 28 antenna ports {15, 16, 17, . . . , 42}, 32 antenna ports {15, 16, 17, . . . , 46}, and UE configured with higher layer parameter eMIMO-Type, and eMIMO-Type is set to "CLASS A," except with UE configured with higher layer parameter advancedCodebookEnabledTRUE, and $\upsilon \leq 2$ with $\upsilon$ equal to the associated RI value, each PMI value corresponds to three codebook indices given in LTE specification.

In the LTE specification, the quantities $\varphi_n$, $u_m$ and $v_{l,m}$, are given by:

$$\varphi_n = e^{j\pi n/2} \qquad \text{equation (1)}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The values of $N_1$, $N_2$, $O_1$, and $O_2$ are configured with the higher-layer parameter codebookConfigig-N1, codebookConfig-N2, codebook-Over-Sampling-RateConfig-O1, and codebook-Over-Sampling-RateConfig-O2, respectively. The supported configurations of $(O_1,O_2)$ and $(N_1,N_2)$ for a given number of CSI-RS ports are given in LTE specification (e.g., TABLES 1-3). The number of CSI-RS ports, P, is $2N_1N_2$.

A UE is not expected to be configured with value of CodebookConfig set to 2 or 3, if the value of codebookConfigN2 is set to 1.

A UE may only use $i_{1,2}=0$ and may not report $i_{1,2}$ if the value of codebookConfigN2 is set to 1.

A first PMI value $i_1$ corresponds to the codebook indices pair $\{i_{1,1},i_{1,2}\}$ and a second PMI value $i_2$ corresponds to the codebook index $i_2$ given in LTE specification.

In some cases codebook subsampling is supported. The sub-sampled codebook for PUCCH mode 2-1 for value of parameter codebookConfig set to 2, 3, or 4 is defined in LTE specification for PUCCH Reporting Type 1a.

A UE may only use the value of $i_2$ according to the configured codebook subset restriction and may not report $i_2$ if the UE is configured with higher layer parameter semiolEnabled=TRUE.

TABLE 1

Supported configurations of $(O_1, O_2)$ and $(N_1, N_2)$

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |
| 20 | (2, 5) | (8, 4) |
|  | (5, 2) | (4, 4) |
|  | (10, 1) | (4, —) |
| 24 | (2, 6) | (8, 4) |
|  | (3, 4) | (8, 4) |
|  | (4, 3) | (4, 4) |
|  | (6, 2) | (4, 4) |
|  | (12, 1) | (4, —) |
| 28 | (2, 7) | (8, 4) |
|  | (7, 2) | (4, 4) |
|  | (14, 1) | (4, —) |
| 32 | (2, 8) | (8, 4) |
|  | (4, 4) | (8, 4) |
|  | (8, 2) | (4, 4) |
|  | (16, 1) | (4, —) |

TABLE 2

Codebook for 3-layer CSI reporting using antenna ports 15 to 14 + P

3 Layers, Codebook-Config = 1, $N_1 > 1$, $N_2 > 1$
$i_{1,2} = 0, 1, \cdots, N_2 O_2 - 1$

| $i_{1,1}$ | $i_2$ | |
|---|---|---|
|  | 0 | 1 |
| $0, \cdots, O_1 N_1 - 1$ | $W^{(3)}_{i_{1,1},i_{1,1}+O_1 i_{1,2},i_{1,2}}$ | $\tilde{W}^{(3)}_{i_{1,1},i_{1,1}+O_1 i_{1,2},i_{1,2}}$ |
| $O_1 N_1, \cdots, 2 O_1 N_1 - 1$ | $W^{(3)}_{i_{1,1},i_{1,1}+O_1 i_{1,2},i_{1,2}+O_2}$ | $\tilde{W}^{(3)}_{i_{1,1},i_{1,1}+O_1 i_{1,2},i_{1,2}+O_2}$ | where $W^{(3)}_{l,l',m,m'} = \frac{1}{\sqrt{3P}} \begin{bmatrix} v_{l,m} & v_{l,m} & v_{l',m'} \\ v_{l,m} & -v_{l,m} & -v_{l',m'} \end{bmatrix}$, $\tilde{W}^{(3)}_{l,l',m,m'} = \frac{1}{\sqrt{3P}} \begin{bmatrix} v_{l,m} & v_{l',m'} & v_{l',m'} \\ v_{l,m} & v_{l',m'} & -v_{l',m'} \end{bmatrix}$ TABLE 2-continued Codebook for 3-layer CSI reporting using antenna ports 15 to 14 + P 3 Layers, Codebook-Config = 1, $N_2$ = 1
$i_{1,2}$ = 0

| $i_{1,1}$ | $i_2$ | |
|---|---|---|
| | 0 | 1 |
| $0, \cdots, O_1N_1 - 1$ | $W^{(3)}_{i_{1,1},i_{1,1}+O_1,0,0}$ | $\tilde{W}^{(3)}_{i_{1,1},i_{1,1}+O_1,0,0}$ |
| $O_1N_1, \cdots, 2O_1N_1 - 1$ | $W^{(3)}_{i_{1,1},i_{1,1}+2O_1,0,0}$ | $\tilde{W}^{(3)}_{i_{1,1},i_{1,1}+2O_1,0,0}$ |
| $2O_1N_1, \cdots, 3O_1N_1 - 1$ | $W^{(3)}_{i_{1,1},i_{1,1}+3O_1,0,0}$ | $\tilde{W}^{(3)}_{i_{1,1},i_{1,1}+3O_1,0,0}$ | where $W^{(3)}_{l,l',m,m'} = \frac{1}{\sqrt{3P}} \begin{bmatrix} v_{l,m} & v_{l,m} & v_{l',m'} \\ v_{l,m} & -v_{l,m} & -v_{l',m'} \end{bmatrix}$, $\tilde{W}^{(3)}_{l,l',m,m'} = \frac{1}{\sqrt{3P}} \begin{bmatrix} v_{l,m} & v_{l',m'} & v_{l',m'} \\ v_{l,m} & v_{l',m'} & -v_{l',m'} \end{bmatrix}$

TABLE 3

Codebook for 4-layer CSI reporting using antenna ports 15 to 14 + P

4 Layers, Codebook-Config = 1, $N_1 > 1$, $N_2 > 1$
$i_{1,2} = 0, 1, \cdots, N_2O_2 - 1$

| $i_{1,1}$ | $i_2$ | |
|---|---|---|
| | 0 | 1 |
| $0, \cdots, N_1O_1 - 1$ | $W^{(4)}_{i_{1,1},i_{1,1}+O_1,i_{1,2},i_{1,2},0}$ | $W^{(4)}_{i_{1,1},i_{1,1}+O_1,i_{1,2},i_{1,2},1}$ |
| $O_1N_1, \cdots, 2O_1N_1 - 1$ | $W^{(4)}_{i_{1,1},i_{1,1}+O_1,i_{1,2},i_{1,2}+O_2,0}$ | $W^{(4)}_{i_{1,1},i_{1,1}+O_1,i_{1,2},i_{1,2}+O_2,1}$ | where $W^{(4)}_{l,l',m,m',n} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ 4 Layers, Codebook-Config = 1, $N_2$ = 1
$i_{1,2}$ = 0

Figure 13:
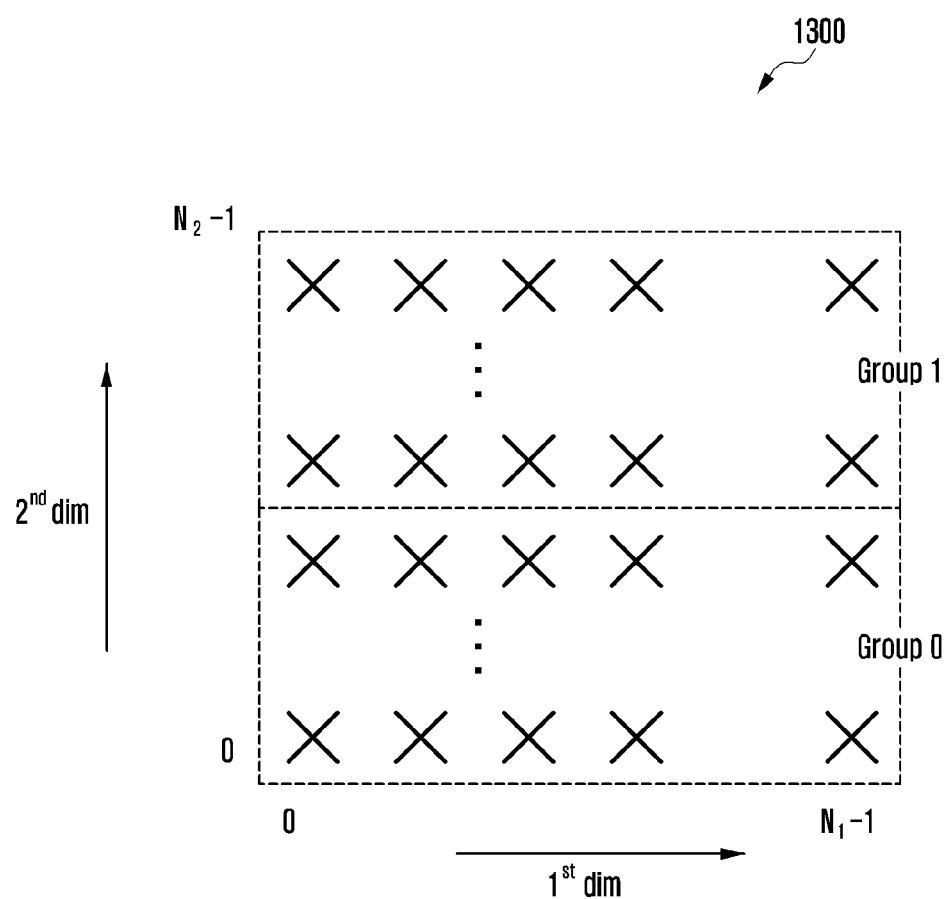
FIG. 13 illustrates an example antenna group per polarization according to embodiments of the present disclosure.

| $i_{1,1}$ | $i_2$ | |
|---|---|---|
| | 0 | 1 |
| $0, \cdots, O_1N_1 - 1$ | $W^{(4)}_{i_{1,1},i_{1,1}+O_1,0,0,0}$ | $W^{(4)}_{i_{1,1},i_{1,1}+O_1,0,0,1}$ |
| $O_1N_1, \cdots, 2O_1N_1 - 1$ | $W^{(4)}_{i_{1,1},i_{1,1}+2O_1,0,0,0}$ | $W^{(4)}_{i_{1,1},i_{1,1}+2O_1,0,0,1}$ |
| $2O_1N_1, \cdots, 3O_1N_1 - 1$ | $W^{(4)}_{i_{1,1},i_{1,1}+3O_1,0,0,0}$ | $W^{(4)}_{i_{1,1},i_{1,1}+3O_1,0,0,1}$ | where $W^{(4)}_{l,l',m,m',n} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ FIG. 13 illustrates an example antenna group per polarization 1300 according to embodiments of the present disclosure. The embodiment of the antenna group per polarization 1300 illustrated in FIG. 13 is for illustration only. FIG. 13 does not limit the scope of this disclosure to any particular implementation.

In one embodiment 1, a UE is configured with a dual-stage $W=W_1W_2$ codebook where $W_1$ codebook for rank 3 and rank 4 CSI reporting has a block diagonal structure with 2 or 4 blocks and is according to at least one of the following two alternatives. In one example of Alt 1-0 (2 blocks $W_1$), $$W_1 = \begin{bmatrix} B & 0 \\ 0 & B \end{bmatrix}.$$

In one example of Alt 1-1 (4 blocks of $W_1$):

$$W_1 = \begin{bmatrix} B & 0 & 0 & 0 \\ 0 & B & 0 & 0 \\ 0 & 0 & B & 0 \\ 0 & 0 & 0 & B \end{bmatrix}$$

where $B_0=[b_0, b_1, \ldots, b_{L-1}]$ is a beam group common for all diagonal blocks and L is the number of beams in the group.

For Alt 1-0, the two diagonal blocks correspond to two partitions or two polarizations, and for Alt 1-1, the four diagonal blocks correspond to two partitions or two polarizations and two antenna groups (or sub-partitions) for each polarization or partition, so in total, there are four sub-partitions in Alt 1-1. An illustration of two antenna groups is shown in FIG. 13. As shown the entire antenna array is partition into 2 groups. Let $M_1$ and $M_2$ respectively denote the number of antenna ports per polarization in the first and second dimensions of each antenna group, which are determined as follows: if $mod(N_1,2) \neq 0$, and $mod(N_2,2)=0$, then $M_1=N_1$ and $M_2=N_2/2$; if $mod(N_1,2)=0$, and $mod(N_2,2) \neq 0$, then $M_1=N_1/2$ and $M_2=N_2$; and If $mod(N_1,2)=0$, and $mod(N_2,2)=0$, then if $N_1 \geq N_2$, then $M_1=N_1/2$ and $M_2=N_2$; and Otherwise, $M_1=N_1$ and $M_2=N)/2$.

In one example, only one of the two $W_1$ codebook structures (Alt 1-0, Alt 1-1) is supported in the specification, for example, Alt 1-0. In another example, one of the two structures is configured to the UE via 1-bit higher layer (RRC) or MAC CE based or DCI based signaling. In yet another example, the UE reports a preferred a $W_1$ codebook structure as a 1-bit WB CSI report either jointly with other WB CSI reports or separately as a separate WB report. In yet another example, only of the two structures is supported for each antenna port layouts.

In one embodiment 1A, a UE is configured with $W_1$ codebook for rank 3 and 4 CSI reporting where the number of beams (L value) in the beam group is the same and is according to at least one of the two alternatives. In one example of Alt 1A-0: L=1. In one example of Alt 1A-1: L=2 or 4

In one example, only one of the two alternatives (Alt 1A-0, Alt 1A-1) is supported in the specification, for example, Alt 1A-0. In another example, one of the two alternatives is configured to the UE via 1-bit higher layer (RRC) or MAC CE based or DCI based signaling. In yet another example, the UE reports a preferred L value as a 1-bit WB CSI report either jointly with other WB CSI reports or separately as a separate WB report. In yet another example, only of the two alternatives is supported for each antenna port layouts.

In one embodiment 1B, a UE is configured with $W_1$ codebook for rank 3 and 4 CSI reporting which has a block diagonal structure with 2 or 4 blocks (Alt 1-0, Alt 1-1) depending on the number of antenna ports $P=2N_1N_2$. For example if $P \leq 12$ or $P < 16$, then the $W_1$ codebook has 2 diagonal blocks (Alt 1-0) and if $P > 12$ or $P \geq 16$, then the $W_1$ codebook has 4 diagonal blocks (Alt 1-1). In the rest of the disclosure, the two blocks can also be referred to as two partitions in case of $P \leq 12$ or $P < 16$, and the four blocks can also be referred to as four sub-partitions in case of $P > 12$ or $P \geq 16$.

In one embodiment 2, a UE is configured with $W_1$ codebook for rank 3 and 4 CSI reporting which has a block diagonal structure with 2 or 4 blocks (Alt 1-0, Alt 1-1) depending on the number of antenna ports $P=2N_1N_2$ (cf.

embodiment 1B). When the $W_1$ codebook has 4 diagonal blocks, then the $W_1$ codebook can be reduced into a 2 block structure as follows:

$$W_1 = \begin{bmatrix} v_{l,m} & 0 & 0 & 0 \\ 0 & v_{l,m} & 0 & 0 \\ 0 & 0 & v_{l,m} & 0 \\ 0 & 0 & 0 & v_{l,m} \end{bmatrix} \begin{bmatrix} 1 & 0 \\ \phi_p & 0 \\ 0 & 1 \\ 0 & \phi_p \end{bmatrix} =$$

$$\begin{bmatrix} v_{l,m} & 0 \\ \phi_p v_{l,m} & 0 \\ 0 & v_{l,m} \\ 0 & \phi_p v_{l,m} \end{bmatrix} = \begin{bmatrix} w_{l,m,p} & 0 \\ 0 & w_{l,m,p} \end{bmatrix}, \text{ where } w_{l,m,p} = \begin{bmatrix} v_{l,m} \\ \phi_p v_{l,m} \end{bmatrix}$$

and $\phi_p$ is the inter-group phase, and $$\phi_n = e^{j\pi n/2}$$

$$u_m = \begin{bmatrix} 1 & e^{j\frac{2\pi m}{O_2 M_2}} & \dots & e^{j\frac{2\pi m(M_2-1)}{O_2 M_2}} \end{bmatrix}$$

$$v_{l,m} = \begin{bmatrix} u_m & e^{j\frac{2\pi l}{O_1 M_1}} u_m & \dots & e^{j\frac{2\pi l(M_1-1)}{O_1 M_1}} u_m \end{bmatrix}^T.$$

Since for rank 3 and 4, in the present disclosure, two orthogonal $W_1$ beams are needed. In the present disclosure, two orthogonal beams are chosen in at least one of the following two ways. In one example of Alt 2-0.

$$w_{l,m,p} = \begin{bmatrix} v_{l,m} \\ \phi_p v_{l,m} \end{bmatrix} \text{ and } w_{l,m,p'} = \begin{bmatrix} v_{l,m} \\ \phi_{p'} v_{l,m} \end{bmatrix}$$

where $\phi_p \in \{1,j\}$ (p=0,1) and $\phi_{p'}=-\phi_p$. Note that 1-bit reporting is needed to report the inter-group phase $\phi_p$ and $\phi_{p'}$. If the inter-group phase $\phi_p$ and $\phi_{p'}$ are reported in a WB manner, then the inter-group phase $\phi_p$ and $\phi_{p'}$ are either reported jointly with the first PMI ($i_1$) indicating the beam $v_{l,m}$ or the inter-group phase $\phi_p$ and $\phi_{p'}$ are reported as a separate WB component. Similarly, if the inter-group phase $\phi_p$ and $\phi_{p'}$ are reported in a SB manner, then the inter-group phase $\phi_p$ and $\phi_{p'}$ are either reported jointly with the second PMI ($i_2$) indicating the co-phase or the inter-group phase $\phi_p$ and $\phi_{p'}$ are reported as a separate SB component.

In another example of Alt 2-1, $$w_{l,m,p} = \begin{bmatrix} v_{l,m} \\ \phi_p v_{l,m} \end{bmatrix} \text{ and } w_{l',m',p'} = \begin{bmatrix} v_{l',m'} \\ \phi_{p'} v_{l',m'} \end{bmatrix}$$

where $v_{l,m}$ and $v_{l',m'}$ are two orthogonal beams. An example of selecting the two orthogonal beams is similar to LTE specification Class A rank 3-4 codebook for Codebook-Config=1, where l'=l+$k_1 O_1$ and m'=m+$k_2 O_2$, and ($k_1,k_2$)∈{(1,0), (0,1)} for 2D antenna port layouts ($N_1$>1, $N_2$>1), and ($k_1,k_2$)∈{(1,0), (2,0), (3,0)} for 1D antenna port layouts ($N_1$>1, $N_2$=1). For 2 antenna groups, ($k_1,k_2$) can be according to at least one of the following alternatives. In one example of Alt 2-1-0A, the same as in LTE Release 13/14 Class A rank 3-4 codebook for Codebook-Config=1, i.e., ($k_1,k_2$)∈{(1,0), (0,1)} for 2D antenna port layouts ($M_1$>1, $M_2$>1), and ($k_1,k_2$)∈{(1,0), (2,0), (3,0)} for 1D antenna port layouts ($M_1$>1, $M_2$=1).

In another example of Alt 2-1-1A, ($k_1,k_2$)∈{(1,0), (0,1)} for 2D antenna port layouts ($M_1$>1, $M_2$>1), and ($k_1,k_2$)∈{(1,0), (2,0)} for 1D antenna port layouts ($M_1$>1, $M_2$=1). In one instance of Alt 2-1-2A, for $M_1$>1 and $M_2$>2 and $M_2$>$M_1$: ($k_1,k_2$)={(0,0), ($O_1$,0), (0,$O_2$), (0,2$O_2$)}; for $M_2$>1 and $M_1$>2 and $M_1$>$M_2$: ($k_1,k_2$)={(0,0), ($O_1$,0), (0,$O_2$), (2$O_1$,0)}; for $M_2$>1 and $M_1$>1 and $M_1$=$M_2$: ($k_1,k_2$)={(0,0), ($O_1$,0), (0,$O_2$), ($O_1,O_2$)}; and For $M_2$=1: ($k_1,k_2$)={(0,0), ($O_1$,0), (2$O_1$,0), (3$O_1$,0)}. Note: the last two values are not applicable for 4 ports (i.e., $M_1$=2).

In one instance of Alt 2-1-3A, for $M_1$>1 and $M_2$>2 and $M_2$>$M_1$: ($k_1,k_2$)={(0,0), ($O_1$,0), (0,$O_2$), (0, ($M_2$-1)$O_2$)}; for $M_2$>1 and $M_1$>2 and $M_1$>$M_2$: ($k_1,k_2$)={(0,0), ($O_1$,0), (0,$O_2$), (($M_1$-1)$O_1$,0)}; for $M_2$>1 and $M_1$>1 and $M_1$=$M_2$: ($k_1,k_2$)={(0,0), ($O_1$,0), (0,$O_2$), ($O_1,O_2$)}; and for $M_2$=1: ($k_1,k_2$)={(0,0), ($O_1$,0), (2$O_1$,0), (($M_1$-1)$O_1$,0)} Note: the last two values are not applicable for 4 ports (i.e., $M_1$=2).

In one instance of Alt 2-1-4A, for $M_2$>1 and $M_1$>1: ($k_1,k_2$)={(0,0), ($O_1$,0), (0,$O_2$), ($O_1,O_2$)} and for $M_2$=1: ($k_1, k_2$)={(0,0), ($O_1$,0), (2$O_1$,0), (3$O_1$,0)}. Note: the last two values are not applicable for 4 ports (i.e., $M_1$=2).

In one instance of Alt 2-1-5A, for $M_2$>1 and $M_1$>1: ($k_1,k_2$)={(0,0), ($O_1$,0), (0,$O_2$), ($O_1,O_2$)} and for $M_2$=1: ($k_1, k_2$)={(0,0), ($O_1$,0), (2$O_1$,0), (($M_1$-1)$O_1$,0)}. Note: the last two values are not applicable for 4 ports (i.e., $M_1$=2).

The group phase $\phi_p$ and $\phi_{p'}$ are reported according to at least one of the following alternatives. In one instance of Alt 2-1-0B, $\phi_p$ and $\phi_{p'}$ are fixed, for example to 1, hence need not be reported. In one instance of Alt 2-1-1B, $\phi_p$ and $\phi_{p'}$ are reported using a 1-bit codebook $\phi_p \in \{1,j\}$ with $\phi_{p'}=-\phi_p$, where this reporting is either WB or SB. In one instance of Alt 2-1-2B, $\phi_p$ and $\phi_{p'}$ are reported using a 2-bit codebook $\phi_p \in \{1,j,-1,-j\}$ with $\phi_{p'}=-\phi_p$, where this reporting is either WB or SB. In one instance of Alt 2-1-3B, $\phi_p$ and $\phi_{p'}$ are reported independently using a 1-bit codebook $\phi_p, \phi_{p'} \in \{1,-1\}$, where this reporting is either WB or SB. This requires 2 bits in total. In one instance of Alt 2-1-3B, $\phi_p$ and $\phi_{p'}$ are reported independently using a 2-bit codebook $\phi_p, \phi_{p'} \in \{1,-1\}$, where this reporting is either WB or SB. This requires 4 bits in total. In one instance of Alt 2-1-4B, $\phi_p$ and $\phi_{p'}$ are reported using a 2-bit codebook $$\phi_p \in \{e^{j\frac{\pi m}{4}}, m = 0, 1, 2, 3\}$$

with $\phi_{p'}=\phi_p$, where this reporting is either WB or SB.

In one embodiment 2A, for Alt 2-0 in the aforementioned embodiment 2, the rank 3 pre-coding matrix in then given by $$W^{(3)}_{l,m,p,p'} = \frac{1}{\sqrt{3P}} \begin{bmatrix} w_{l,m,p} & w_{l,m,p} & w_{l,m,p'} \\ w_{l,m,p} & -w_{l,m,p} & -w_{l,m,p'} \end{bmatrix} \text{ or } \tilde{W}^{(3)}_{l,m,p,p'} =$$

$$\frac{1}{\sqrt{3P}} \begin{bmatrix} w_{l,m,p} & w_{l,m,p} & w_{l,m,p'} \\ w_{l,m,p} & w_{l,m,p'} & -w_{l,m,p'} \end{bmatrix};$$

and the rank 4 pre-coding matrix in given by $$W^{(4)}_{l,m,p,p',n} = \frac{1}{\sqrt{4P}} \begin{bmatrix} w_{l,m,p} & w_{l,m,p'} & w_{l,m,p} & w_{l,m,p'} \\ \phi_n w_{l,m,p} & \phi_n w_{l,m,p'} & -\phi_n w_{l,m,p} & -\phi_n w_{l,m,p'} \end{bmatrix}, n = 0, 1.$$

In one embodiment 2B, for Alt 2-1 in the aforementioned embodiment 2, the rank 3 pre-coding matrix in then given by $$W^{(3)}_{l,l',m,m',p} = \frac{1}{\sqrt{3P}} \begin{bmatrix} w_{l,m,p} & w_{l,m,p} & w_{l',m',p} \\ w_{l,m,p} & -w_{l,m,p} & -w_{l',m',p} \end{bmatrix} \text{ or } W^{(3)}_{l,l',m,m',p} =$$

$$\frac{1}{\sqrt{3P}} \begin{bmatrix} w_{l,m,p} & w_{l',m',p} & w_{l',m',p} \\ w_{l,m,p} & w_{l',m',p} & -w_{l',m',p} \end{bmatrix};$$

and the rank 4 pre-coding matrix in given by $$W^{(4)}_{l,l',m,m',p,n} = \frac{1}{\sqrt{4P}} \begin{bmatrix} w_{l,m,p} & w_{l',m',p} & w_{l,m,p} & w_{l',m',p} \\ \varphi_n w_{l,m,p} & \varphi_n w_{l',m',p} & -\varphi_n w_{l,m,p} & -\varphi_n w_{l',m',p} \end{bmatrix},$$

$n = 0, 1.$

In one embodiment 2C, for Alt 2-1 in the aforementioned embodiment 2, the rank 3 pre-coding matrix in then given by $$W^{(3)}_{l,l',m,m',p,p'} = \frac{1}{\sqrt{3P}} \begin{bmatrix} w_{l,m,p} & w_{l,m,p} & w_{l',m',p'} \\ w_{l,m,p} & -w_{l,m,p} & -w_{l',m',p'} \end{bmatrix} \text{ or } W^{(3)}_{l,l',m,m',p,p'} =$$

$$\frac{1}{\sqrt{3P}} \begin{bmatrix} w_{l,m,p} & w_{l',m',p'} & w_{l',m',p'} \\ w_{l,m,p} & w_{l',m',p'} & -w_{l',m',p'} \end{bmatrix};$$

and the rank 4 pre-coding matrix in given by $$W^{(4)}_{l,l',m,m',p,p',n} = \frac{1}{\sqrt{4P}} \begin{bmatrix} w_{l,m,p} & w_{l',m',p'} & w_{l,m,p} & w_{l',m',p'} \\ \varphi_n w_{l,m,p} & \varphi_n w_{l',m',p'} & -\varphi_n w_{l,m,p} & -\varphi_n w_{l',m',p'} \end{bmatrix},$$

$n = 0, 1.$

In one embodiment 2D, the supported combinations of $(N_1, N_2, O_1, O_2)$ are tabulated in TABLE 4. The UE is configured with higher-layer parameters codebook-Config-N1, and codebook-Config-N2, to configure the codebook parameters $N_1$ and $N_2$, respectively. Note that there is no need to signal (configure) $(O_1, O_2)$ since only one $(O_1, O_2)$ is supported for each $(N_1, N_2)$. An alternative table is given in TABLE 5.

TABLE 4

Supported configurations of $(O_1, O_2)$ and $(N_1, N_2)$

| Number of CSI-RS ports | $(N_1, N_2)$ | $(O_1, O_2)$ |
|---|---|---|
| 4 | (2, 1) | (4, —) |
| 8 | (2, 2) | (4, 4) |
|  | (4, 1) | (4, —) |
| 12 | (3, 2), (2, 3) | (4, 4) |
|  | (6, 1) | (4, —) |
| 16 | (4, 2), (2, 4) | (4, 4) |
|  | (8, 1) | (4, —) |
| 24 | (6, 2), (4, 3), (3, 4), (2, 6) | (4, 4) |
|  | (12, 1) | (4, —) |
| 32 | (8, 2), (4, 4), (2, 8) | (4, 4) |
|  | (16, 1) | (4, —) |

TABLE 5

Supported configurations of $(O_1, O_2)$ and $(N_1, N_2)$

| Number of CSI-RS ports | $(N_1, N_2)$ | $(O_1, O_2)$ |
|---|---|---|
| 4 | (2, 1) | (4, —) |
| 8 | (2, 2) | (4, 4) |

TABLE 5-continued

Supported configurations of $(O_1, O_2)$ and $(N_1, N_2)$

| Number of CSI-RS ports | $(N_1, N_2)$ | $(O_1, O_2)$ |
|---|---|---|
|  | (4, 1) | (4, —) |
| 12 | (3, 2) | (4, 4) |
|  | (6, 1) | (4, —) |
| 16 | (4, 2) | (4, 4) |
|  | (8, 1) | (4, —) |
| 24 | (6, 2), (4, 3) | (4, 4) |
|  | (12, 1) | (4, —) |
| 32 | (8, 2), (4, 4) | (4, 4) |
|  | (16, 1) | (4, —) |

If multiple $(O_1, O_2)$ pairs are supported for any $(N_1, N_2)$ pair, then the UE is further configured with higher-layer parameters codebook-Over-Sampling-RateConfig-O1 and codebook-Over-Sampling-RateConfig-O2, to configure $O_1$ and $O_2$, respectively.

In one embodiment 3, a UE is configured with $W_1$ codebook for rank 3 and 4 CSI reporting which has a block diagonal structure with 2 or 4 blocks (Alt 1-0, Alt 1-1) depending on the number of antenna ports $P=2N_1N_2$ (cf. embodiment 1B). When the $W_1$ codebook has 4 diagonal blocks, then the $W_1$ codebook can be reduced into a 2 block structure as follows:

$$W_1 = \begin{bmatrix} b_{k_1,k_2} & 0 & 0 & 0 \\ 0 & b_{k_1,k_2} & 0 & 0 \\ 0 & 0 & b_{k_1,k_2} & 0 \\ 0 & 0 & 0 & b_{k_1,k_2} \end{bmatrix} \begin{bmatrix} 1 & 1 & 0 & 0 \\ e^{j\alpha} & -e^{j\alpha} & 0 & 0 \\ 0 & 0 & 1 & 1 \\ 0 & 0 & e^{j\alpha} & -e^{j\alpha} \end{bmatrix} =$$

$$\begin{bmatrix} b_{k_1,k_2} & b_{k_1,k_2} & 0 & 0 \\ e^{j\alpha}b_{k_1,k_2} & -e^{j\alpha}b_{k_1,k_2} & 0 & 0 \\ 0 & 0 & b_{k_1,k_2} & b_{k_1,k_2} \\ 0 & 0 & e^{j\alpha}b_{k_1,k_2} & -e^{j\alpha}b_{k_1,k_2} \end{bmatrix} \text{ where } e^{j\alpha} \in \{1, j\}.$$

For rank 4, $$W_2 = \begin{bmatrix} 1 & 1 \\ e^{j\beta} & -e^{j\beta} \end{bmatrix} \otimes I_2 = \begin{bmatrix} 1 & 0 & 1 & 0 \\ 0 & 1 & 0 & 1 \\ e^{j\beta} & 0 & -e^{j\beta} & 0 \\ 0 & e^{j\beta} & 0 & -e^{j\beta} \end{bmatrix},$$

where $e^{j\beta} \in \{1,j\}$, where $\otimes$ denote the Kronecker product. This leads to a rank 4 pre-coding matrix $$W_1 W_2 = \frac{1}{\sqrt{4P}} \begin{bmatrix} b_{k_1,k_2} & b_{k_1,k_2} & 0 & 0 \\ e^{j\alpha}b_{k_1,k_2} & -e^{j\alpha}b_{k_1,k_2} & 0 & 0 \\ 0 & 0 & b_{k_1,k_2} & b_{k_1,k_2} \\ 0 & 0 & e^{j\alpha}b_{k_1,k_2} & -e^{j\alpha}b_{k_1,k_2} \end{bmatrix}$$

$$\begin{bmatrix} 1 & 0 & 1 & 0 \\ 0 & 1 & 0 & 1 \\ e^{j\beta} & 0 & -e^{j\beta} & 0 \\ 0 & e^{j\beta} & 0 & -e^{j\beta} \end{bmatrix} =$$

-continued $$\frac{1}{\sqrt{4P}} \begin{bmatrix} b_{k_1,k_2} & b_{k_1,k_2} & b_{k_1,k_2} & b_{k_1,k_2} \\ e^{j\alpha}b_{k_1,k_2} & -e^{j\alpha}b_{k_1,k_2} & e^{j\alpha}b_{k_1,k_2} & -e^{j\alpha}b_{k_1,k_2} \\ e^{j\beta}b_{k_1,k_2} & e^{j\beta}b_{k_1,k_2} & -e^{j\beta}b_{k_1,k_2} & -e^{j\beta}b_{k_1,k_2} \\ e^{j(\alpha+\beta)}b_{k_1,k_2} & -e^{j(\alpha+\beta)}b_{k_1,k_2} & -e^{j(\alpha+\beta)}b_{k_1,k_2} & e^{j(\alpha+\beta)}b_{k_1,k_2} \end{bmatrix}.$$

For rank-3 pre-coding matrix, one of the four columns from the rank-4 pre-coding matrix is removed. For example, the rank 3 pre-coding matrix is given by $$W_1 W_2 = \frac{1}{\sqrt{3P}} \begin{bmatrix} b_{k_1,k_2} & b_{k_1,k_2} & b_{k_1,k_2} \\ e^{j\alpha}b_{k_1,k_2} & -e^{j\alpha}b_{k_1,k_2} & e^{j\alpha}b_{k_1,k_2} \\ e^{j\beta}b_{k_1,k_2} & e^{j\beta}b_{k_1,k_2} & -e^{j\beta}b_{k_1,k_2} \\ e^{j(\alpha+\beta)}b_{k_1,k_2} & -e^{j(\alpha+\beta)}b_{k_1,k_2} & -e^{j(\alpha+\beta)}b_{k_1,k_2} \end{bmatrix}.$$

In one embodiment 3A, a UE is configured with $W_1$ codebook for rank 3 and 4 CSI reporting where $$W_1 = \begin{bmatrix} b_{k_1,k_2} & 0 & 0 & 0 \\ 0 & b_{k_1,k_2} & 0 & 0 \\ 0 & 0 & b_{k_1,k_2} & 0 \\ 0 & 0 & 0 & b_{k_1,k_2} \end{bmatrix}$$

and $W_2$ decouples into two components:

$$W_2 = W_{2,1} \cdot W_{2,2} = \left(I_2 \otimes \begin{bmatrix} 1 & 1 \\ e^{j\alpha} & -e^{j\alpha} \end{bmatrix}\right) \cdot \left(\begin{bmatrix} 1 & 1 \\ e^{j\beta} & -e^{j\beta} \end{bmatrix} \otimes I_2\right),$$

where a 1 bit reporting is needed to report $e^{j\alpha}$ in a WB manner and a 1 bit reporting is needed to report $e^{j\beta}$ in a SB manner. Alternatively, a 2 bit reporting is needed to report $e^{j\alpha}$ and $e^{j\beta}$ in a SB manner.

In one embodiment 4, a UE is configured with a PMI codebook (via higher layer RRC signaling) for rank 3 and rank 4 CSI reporting for $P=2N_1N_2 \geq 4$ CSI-RS antenna ports as follows. The PMI codebook assumes $W=W_1W_2$ pre-coding matrix structure, where $$W_1 = \begin{bmatrix} B & 0 \\ 0 & B \end{bmatrix},$$

B is composed to L oversampled 2D DFT beams, where $L \in \{1,4\}$. At least one of the following alternatives for L is supported. In one example of Alt 4-0, Only L=1 is supported for all P. In one example of Alt 4-1, for P<16, $L \in \{1,4\}$, where L is RRC configurable, and for $P \geq 16$, L=1. In one example of Alt 4-2, for P<16, L=1, and for $P \geq 16$, $L \in \{1,4\}$, where L is RRC configurable. In one example of Alt 4-3, the value of L is configurable: $L \in \{1,4\}$ via higher layer RRC signaling.

$W_2$ performs subband beam selection (only for L=4) and co-phasing between two polarizations.

Figure 14A:
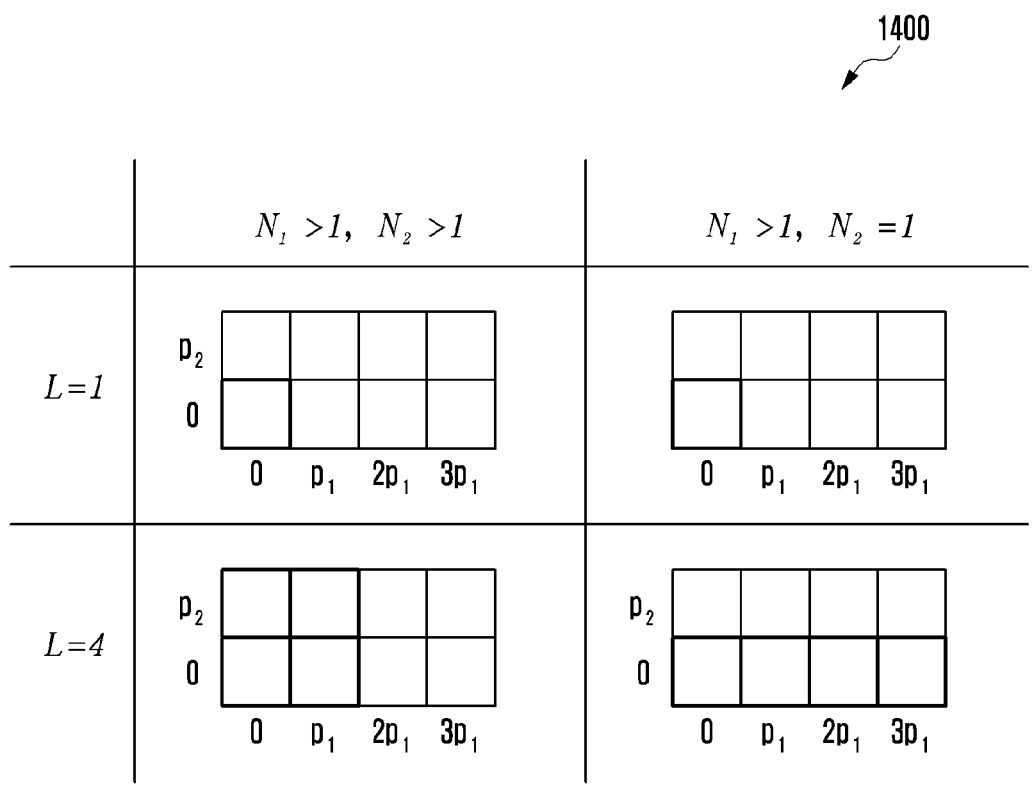
FIG. 14A illustrates an example beam group pattern according to embodiments of the present disclosure.

FIG. 14A illustrates an example beam group pattern 1400 according to embodiments of the present disclosure. The embodiment of the beam group pattern 1400 illustrated in FIG. 14A is for illustration only. FIG. 14A does not limit the scope of this disclosure to any particular implementation.

Figure 14B:
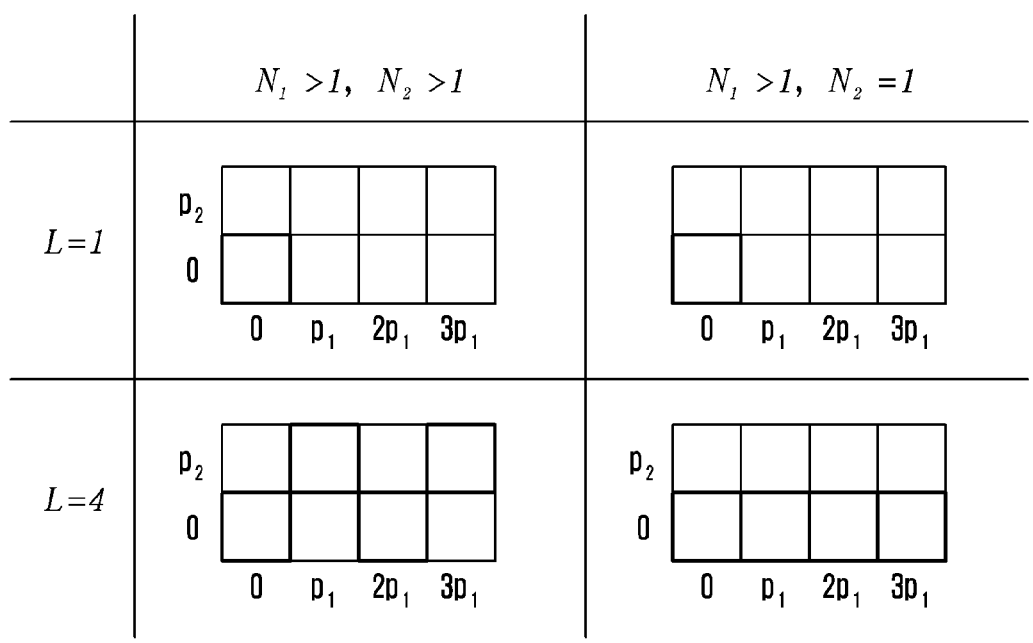
FIG. 14B illustrates an example beam group pattern according to embodiments of the present disclosure.

FIG. 14B illustrates an example beam group pattern 1450 according to embodiments of the present disclosure. The embodiment of beam group pattern 1450 illustrated in FIG. 14B is for illustration only. FIG. 14B does not limit the scope of this disclosure to any particular implementation.

For L=4, only one beam group (B) pattern is supported for each antenna port layouts. Two examples are shown in FIG. 14A and FIG. 14B.

The codebook details for rank 3 and rank 4 CSI reporting are as follows. A 2D DFT beam index $(k_1, k_2)$ may be defined as $k_1 = i_{1,1}s_1 + p_1$, $k_2 = i_{1,2}s_2 + p_2$, where the beam group offset $(s_1, s_2) = (1,1)$ for L=1 and (2,2) for L=4; for $P \geq 16$ ports, let $$N = \frac{N_1}{2},$$

and for P<16 ports, let $N = N_1$; the leading beam index $(i_{1,1}, i_{1,2})$ is reported wideband, where $$i_{1,1} = 0, 1, \ldots \frac{NO_1}{s_1} - 1 \text{ and } i_{1,2} = 0, 1, \ldots \frac{N_2 O_2}{s_2} - 1,$$

hence the leading beam index may be required $$\left\lceil \log_2\left(\frac{NO_1}{s_1} \times \frac{N_2 O_2}{s_2}\right) \right\rceil$$

bits; for L=4, the parameter $(p_1, p_2)$ for beam selection (from the beam group) can be subband (which requires 2 bits/subband). $N_1 > 1$ and $N_2 > 1$: $p_1 = 0, 1$; $p_2 = 0, 1$ (e.g., FIG. 14A) or $(p_1, p_2) \in \{(0,0), (1,1), (2,0), (3,1)\}$ (e.g. FIG. 14B). $N_2 = 1$: $p_1 = 0, 1, 2, 3$; $P_2 = 0$. Note that for L=1, $p_1 = p_2 = 0$ (hence no beam selection is reported). For 3 layer and 4 layer CSI reporting (rank 3 and rank 4), the pre-coding matrices are given by $$W^{(3)} = \frac{1}{\sqrt{3P}} \begin{bmatrix} w_{0,0} & w_{0,1} & w_{0,2} \\ w_{1,0} & w_{1,1} & w_{1,2} \end{bmatrix} \text{ and}$$

$$W^{(4)} = \frac{1}{\sqrt{3P}} \begin{bmatrix} w_{0,0} & w_{0,1} & w_{0,2} & w_{0,3} \\ w_{1,0} & w_{1,1} & w_{1,2} & w_{1,3} \end{bmatrix},$$

respectively.

For $P \geq 16$ ports, $w_{r,l} = d_{k_1,k_2,m,l} \cdot c_{r,l}$ and r=0,1 (for two polarizations), and l=0,1,2,3 (for four layers), and $d_{k_1,k_2,m,l}$ is according to one of the following three alternatives. In one example, $$d_{k_1,k_2,m,l} = \begin{bmatrix} b_{k_1,k_2} \\ \psi_{m,l} b_{k_1,k_2} \end{bmatrix}, \psi_{m,l} = (-1)^l e^{j\frac{\pi m}{4}},$$

m=0, 1, 2, 3. In another example, $$d_{k_1,k_2,m,l} = \begin{bmatrix} b_{k_1,k_2} \\ \psi_{k_1,m,l} b_{k_1,k_2} \end{bmatrix}, \psi_{k_1,m,l} = (-1)^l e^{j\frac{\pi m}{4}} e^{j\frac{\pi k_1}{O_1}}, m = 0, 1, 2, 3.$$

In yet another example, $$d_{k_1,k_2,m,l} = \begin{bmatrix} b_{k_1,k_2} \\ \psi_{k_1,m,l} b_{k_1,k_2} \end{bmatrix}, \psi_{k_1,m,l} = (-1)^l e^{j\frac{\pi m}{4}} e^{j\frac{2\pi k_1}{O_1}}, m = 0, 1, 2, 3.$$

$b_{k_1,k_2}$ is an oversampled 2D DFT beam determined based on beam selection parameter $(p_1, p_2)$. $c_{0,l}=1$, $c_{1,l}=(-1)^{mod(l,2)}\theta_n$, and $$\theta_n = e^{j\frac{\pi n}{2}},$$

n=0,1. The calculation and reporting of m could be wideband or subband with payload 2 bits. The calculation and reporting of n could be wideband or subband with payload 1 bit.

For P<16 ports, $w_{r,l}=d_{k_1,k_2,m,l}c_{r,l}$ and r=0,1 (for two polarizations), l=0,1,2,3 (for four layers), and m=0,1,2,3 (for four orthogonal beams, details below). $b_{k_1,k_1}$ is an oversampled 2D DFT beam determined based on beam selection parameter $(p_1, p_2)$. $d_{k_1,k_2,m,l}=b_{k_1+k_m,l^1,k_2+k_m,l^2}$ is an oversampled 2D DFT beam.

For layer 0 and 2 (l=0, 2), $(k_{m,0}^1, k_{m,0}^2)=(k_{m,2}^1, k_{m,2}^2)=(0,0)$. For layer 1 and 3 (l=1, 3), $(k_{m,1}^1, k_{m,1}^2)=(k_{m,3}^1, k_{m,3}^2)$ whose calculation and reporting is a wideband manner according to at least one of the following alternatives.

In one example of Alt 4-0A, for $N_1$>2 and $N_2$>1 and $N_1$>$N_2$: $(k_{m,l}^1, k_{m,l}^2)=\{(O_1,0), (0,O_2), (O_1,O_2), (2O_1,0)\}$, for $N_1=N_2=2$: $(k_{m,l}^1, k_{m,l}^2)=\{(O_1,0), (0,O_2), (O_1,O_2)\}$, for $N_1=N_2=4$: $(k_{m,l}^1, k_{m,l}^2)=\{(O_1,0), (0,O_2), (O_1,O_2), (2O_1,0)\}$, for $N_2=2$, $N_2=1$: $(k_{m,l}^1, k_{m,l}^2)=\{(O_1,0)\}$, for $N_1=4$, $N_2=1$: $(k_{m,l}^1, k_{m,l}^2)=\{(O_1,0), (2O_1,0), (3O_1,0)\}$, for $N_1\in\{8,12,16\}$, $N_2=1$: $(k_{m,l}^1, k_{m,l}^2)=\{(O_1,0), (2O_1,0), (3O_1,0), (4O_1,0)\}$.

In one example of Alt 4-1A, for $N_1$>2 and $N_2$>1 and $N_1$>$N_2$: $(k_{m,l}^1,k_{m,l}^2)=\{(O_1,0), (0,O_2), (O_1,O_2), ((N_1-1)O_1,0)\}$, for $N_1=N_2=2$: $(k_{m,l}^1,k_{m,l}^2)=\{(O_1,0), (0,O_2), (O_1,O_2)\}$, for $N_1=N_2=4$: $(k_{m,l}^1,k_{m,l}^2)=\{(O_1,0), (0,O_2), (O_1,O_2), (N_1-1)O_1,0)\}$, for $N_2=2$, $N_2=1$: $(k_{m,l}^1,k_{m,l}^2)=\{(O_1,0)\}$, for $N_1=4$, $N_2=(k_{m,l}^1,k_{m,l}^2)=\{(O_1,0), (2O_1,0), (3O_1,0)\}$, for $N_1 \in\{8,12,16\}$, $N_2=1$: $(k_{m,l}^1, k_{m,l}^2)=\{(O_1,0), (2O_1,0), (3O_1,0), ((N_1-1)O_1,0)\}$.

In one example of Alt 4-2A, for $N_1$>1 and $N_2$>1: $(k_{m,l}^1, k_{m,l}^2)=\{(O_1,0), (0,O_2), (O_1,O_2)\}$, for $N_2=2$, $N_2=1$: $(k_{m,l}^1,k_{m,l}^2)=\{(O_1,0)\}$, for $N_1 \in\{0,8,12,16\}$, $N_2=1$: $(k_{m,l}^1, k_{m,l}^2)=\{(O_1,0), (2O_1,0), (3O_1,0)\}$.

In one example of Alt 4-3A, for $N_1$>1 and $N_2$>1: $(k_{m,l}^1, k_{m,l}^2)=\{(O_1,0), (0,O_2), (O_1,O_2)\}$, for $N_2=2$, $N_2=1$: $(k_{m,l}^1, k_{m,l}^2)=\{(O_1,0)\}$, for $N_1\in\{4,8,12,1\}$, $N_2=1$: $(k_{m,l}^1,k_{m,l}^2)=\{(O_1,0), (2O_1,0), ((N_1-1)O_1,0)\}$.

$c_{0,l}=1$, $c_{1,l}=(-1)^{mod(l,2)}\theta_n$, and $$\theta_n = e^{j\frac{\pi n}{2}},$$

n=0,1, where the calculation and reporting of n could be subband with requires 1 bit/subband.

Figure 15:
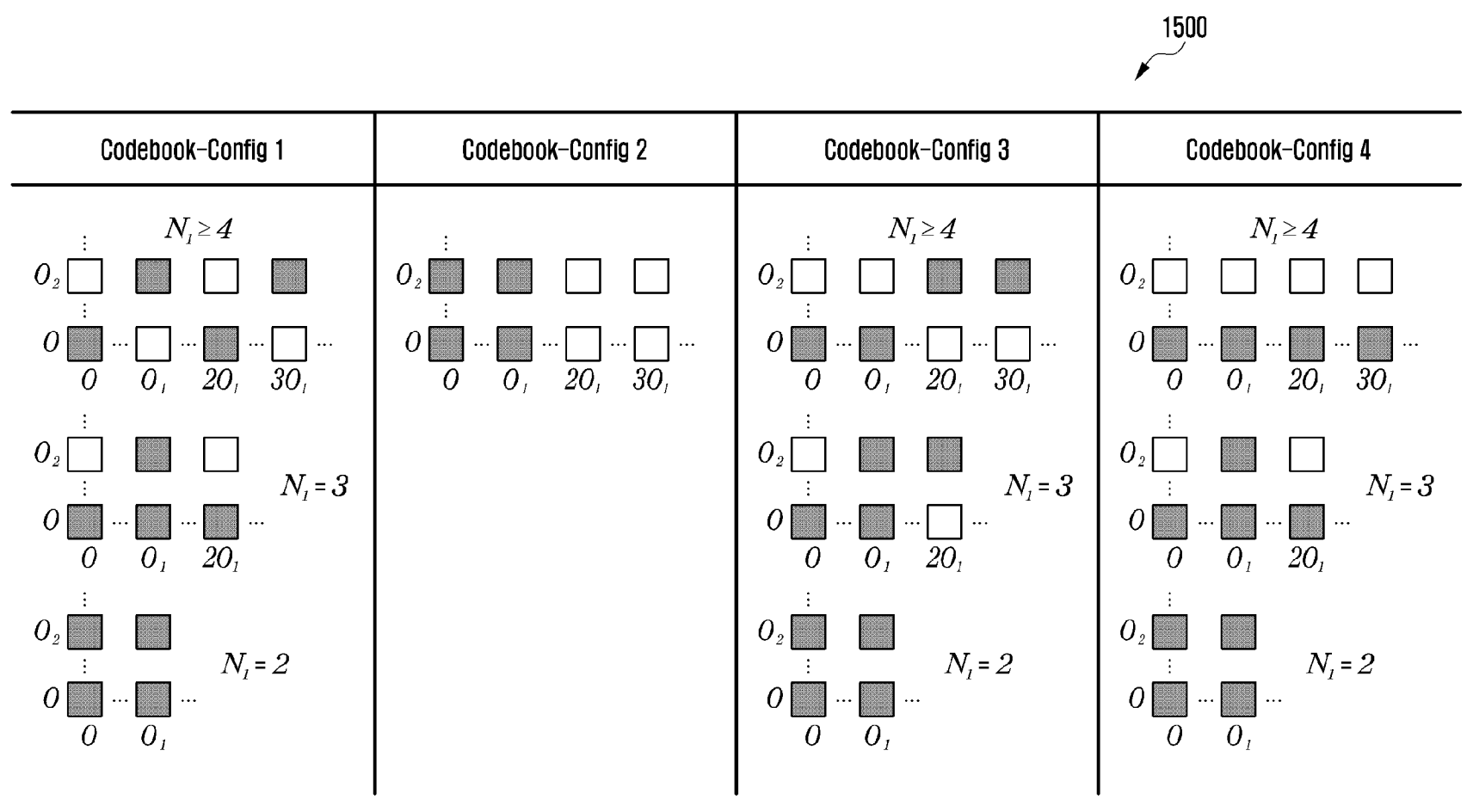

FIG. 15 illustrates an example orthogonal beam groups 1500 according to embodiments of the present disclosure. The embodiment of the orthogonal beam groups 1500 illustrated in FIG. 15 is for illustration only. FIG. 15 does not limit the scope of this disclosure to any particular implementation.

In one embodiment 5, the PMI codebook for rank 5, rank 6, rank 7, and 8 CSI reporting comprises of the following pre-coding matrices $$W = \frac{1}{\sqrt{5P}}\begin{bmatrix} w_{0,0,0} & w_{0,0,1} & w_{0,0,2} & w_{0,0,3} & w_{0,0,4} \\ w_{0,1,0} & w_{0,1,1} & w_{0,1,2} & w_{0,1,3} & w_{0,1,4} \end{bmatrix},$$

$$W = \frac{1}{\sqrt{6P}}\begin{bmatrix} w_{0,0,0} & w_{0,0,1} & w_{0,0,2} & w_{0,0,3} & w_{0,0,4} & w_{0,0,5} \\ w_{0,1,0} & w_{0,1,1} & w_{0,1,2} & w_{0,1,3} & w_{0,1,4} & w_{0,1,5} \end{bmatrix},$$

$$W = \frac{1}{\sqrt{7P}}\begin{bmatrix} w_{0,0,0} & w_{0,0,1} & w_{0,0,2} & w_{0,0,3} & w_{0,0,4} & w_{0,0,5} & w_{0,0,6} \\ w_{0,1,0} & w_{0,1,1} & w_{0,1,2} & w_{0,1,3} & w_{0,1,4} & w_{0,1,5} & w_{0,1,6} \end{bmatrix}, \text{and}$$

$$W = \frac{1}{\sqrt{8P}}\begin{bmatrix} w_{0,0,0} & w_{0,0,1} & w_{0,0,2} & w_{0,0,3} & w_{0,0,4} & w_{0,0,5} & w_{0,0,6} & W_{0,0,7} \\ w_{0,1,0} & w_{0,1,1} & w_{0,1,2} & w_{0,1,3} & w_{0,1,4} & w_{0,1,5} & w_{0,1,6} & W_{0,1,7} \end{bmatrix},$$

respectively,

In such pre-coding matrices, $w_{r,l}=b_{k_1+k_{1,l}',k_2+k_{2,l}'} \cdot c_{r,l}$, r=0,1 (for two polarizations), l=0, 1, 2, 3, 5, 6, 7, 8 (for up to eight layers). In one alternative, $c_{0,l}=1$, $c_{1,l}=(-1)^{mod(l,2)}\theta_n$, and $$\theta_n = e^{j\frac{\pi n}{2}},$$

n=0,1, where the calculation and reporting of n could be subband with requires 1 bit/subband. In another alternative, $c_{0,l}=1$, $c_{1,l}=(-1)^{mod(l,2)}$, and no SB phase reporting is needed. $b_{k_1+k_{1,l}',k_2+k_{2,l}'}$ is an oversampled 2D DFT beam. $k_1=i_{1,1}$, $k_2=i_{1,2}$; the leading beam index $(i_{1,1}, i_{1,2})$ is reported wideband, where $i_{1,1}=0, 1, \ldots N_1O_1-1$ and $i_{1,2}=0,1,\ldots N_2O_2-1$, hence the leading beam index requires $\lceil \log_2(N_1O_1N_2O_2) \rceil$ bits.

For layer 0 and 1 (l=0, 1), the index pair $(k_{1,l}', k_{2,l}')=(b_{1,0}, b_{2,0})$, for layer 2 and 3 (l=2, 3), the index pair $(k_{1,l}', k_{2,l}')=(b_{1,1}, b_{2,1})$, for layer 4 and 5 (l=4, 5), the index pair $(k_{1,l}', k_{2,l}')=(b_{1,2}, b_{2,2})$, and for layer 6 and 7 (l=6, 7), the index pair $(k_{1,l}', k_{2,l}')=(b_{1,3}, b_{2,3})$, where $(b_{1,0}, b_{2,0})$, $(b_{1,1}, b_{2,1})$, $(b_{1,2}, b_{2,2})$, and $(b_{1,3}, b_{2,3})$ for different layers are determined according to at least one of the following alternatives.

In one instance of Alt 5-0, $(b_{1,0}, b_{2,0})$, $(b_{1,1}, b_{2,1})$, $(b_{1,2}, b_{2,2})$, and $(b_{1,3}, b_{2,3})$ are determined based on fixed orthogonal beam patterns (similar to Rel. 13/14 LTE Class A rank 5-8) using higher layer RRC parameter Codebook-Config. In one example, Codebook-Config=1,2,3,4 correspond to the orthogonal beam groups in LTE Class A rank 5-8 as shown in FIG. 15.

In one instance of Alt 5-1, Alt 5-0 in which UE reports a preferred orthogonal beam group using a 2-bit CSI reporting which is reported in a WB manner. This reporting can be separate or joint with other WB CSI reports such as (PMI $i_1$). Alternatively, the reporting can be restricted to 1 bit.

In one instance of Alt 5-2, $(b_{1,0}, b_{2,0})$, $(b_{1,1}, b_{2,1})$, $(b_{1,2}, b_{2,2})$, and $(b_{1,3}, b_{2,3})$ are determined based on independent or free selection from full orthogonal DFT basis comprising of $N_1N_2$ orthogonal beams where this selection is reported in a WB manner. This reporting can be separate or joint with other WB CSI reports such as (PMI $i_1$). Alternatively, the reporting can be restricted to 1 bit.

In one embodiment A, a UE is configured with $W_1$ codebook for rank 3 and 4 CSI reporting which has a block diagonal structure with 2 or 4 blocks (Alt 1-0, Alt 1-1) depending on the number of antenna ports $P=2N_1N_2$ (cf. embodiment 1B). When the $W_1$ codebook has 4 diagonal blocks, then the $W_1$ codebook can be reduced into a 2 block structure as follows:

$$W_1 = \begin{bmatrix} w_{l,m,p} & 0 \\ & w_{l m,p} \end{bmatrix},$$

where $w_{l,m,p}$ is defined as. If $M_1=N_1/2$ and $M_2=N_2$, $w_{l,m,p}=[v_{l,m}\ \phi_p v_{l,m}]^T$ where $$v_{l,m} = \begin{bmatrix} u_m & e^{j\frac{2\pi l}{O_1 M_1}} u_m & \ldots & e^{j\frac{2\pi l(M_1-1)}{O_1 M_1}} u_m \end{bmatrix} \text{ and}$$

$$u_m = \begin{bmatrix} 1 & e^{j\frac{2\pi m}{O_2 M_2}} & \ldots & e^{j\frac{2\pi m(M_2-1)}{O_2 M_2}} \end{bmatrix}.$$

Otherwise $(M_1=N_1$ and $M_2=N_2/2)$, $$w_{l,m,p} = \begin{bmatrix} v_{m,p} & e^{j\frac{2\pi l}{O_1 M_1}} v_{m,p} & \ldots & e^{j\frac{2\pi l(M_1-1)}{O_1 M_1}} v_{m,p} \end{bmatrix}^T$$

where $v_{m,p}=[u_m\ \phi_p u_m]$ and $$u_m = \begin{bmatrix} 1 & e^{j\frac{2\pi m}{O_2 M_2}} & \ldots & e^{j\frac{2\pi m(M_2-1)}{O_2 M_2}} \end{bmatrix}.$$

In one embodiment B, a UE is configured with a codebook for up to rank 8 PMI reporting in which for 3-layer to up to 8-layer CSI reporting, the PMI codebook is as follows.

For 4 antenna ports (e.g. {15, 16, 17, 18}), 8 antenna ports (e.g. {15, 16, . . . , 22}), 12 antenna ports (e.g. {15, 16, . . . , 26}), 16 antenna ports (e.g. {15, 16, . . . , 30}), 24 antenna ports (e.g. {15, 16, . . . , 38}), 32 antenna ports (e.g. {15, 16, . . . 46}), each PMI value corresponds to three codebook indices $i_{1,1}$, $i_{1,2}$, $i_2$ given in TABLES 7-12. The quantities $\varphi_n$, $\theta_p$, $u_m$, and $v_{l,m}$, $$\phi_n = e^{j\pi n/2}$$

$$\theta_m = e^{j\pi m/4}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

are given by $$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \ldots & e^{j\frac{4\pi l(N_1/2-1)}{O_1 N_1}} u_m \end{bmatrix}^T$$

The values of $N_1$ and $N_2$ are configured with the higher-layer parameters CodebookConfig-N1 and CodebookConfig-N2, respectively. The supported configurations of $(N_1, N_2)$ for a given number of CSI-RS ports and the corresponding values of $(O_1, O_2)$ are given in TABLE 6. The number of CSI-RS ports, $P_{CSI-RS}$, is $2N_1N_2$. A UE may only use $i_{1,2}=0$ and may not report $i_{1,2}$ if the value of CodebookConfig-N2 is set to 1.

TABLE 6

Supported configurations of $(N_1, N_2)$ and $(O_1, O_2)$

| Number of CSI-RS antenna ports, $P_{CSI-RS}$ | $(N_1, N_2)$ | $(O_1, O_2)$ |
|---|---|---|
| 4 | (2, 1) | (4, 4) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

TABLE 7

Codebook for 3-layer CSI reporting using antenna ports [15 to 14 + $P_{CSI-RS}$]

3 Layers, Codebook-Config = 1-2, $N_1 = 2$, $N_2 = 1$
$i_{1,2} = 0$

| | $i_2$ | |
|---|---|---|
| $i_{1,1}$ | 0 | 1 |
| $0, \ldots, N_1 O_1 - 1$ | $W^{(3)}_{i_{1,1}, i_{1,1}+O_1, 0, 0, 0}$ | $W^{(3)}_{i_{1,1}, i_{1,1}+O_1, 0, 0, 1}$ | where $$W^{(3)}_{l,l',m,m',n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}.$$

3 Layers, Codebook-Config = 1-2, $N_1 = 4$, $N_2 = 1$
$i_{1,2} = 0$

| | $i_2$ | |
|---|---|---|
| $i_{1,1}$ | 0 | 1 |
| $0, \ldots, N_1 O_1 - 1$ | $W^{(3)}_{i_{1,1}, i_{1,1}+O_1, 0, 0, 0}$ | $W^{(3)}_{i_{1,1}, i_{1,1}+O_1, 0, 0, 1}$ |
| $N_1 O_1, \ldots, 2N_1 O_1 - 1$ | $W^{(3)}_{i_{1,1}, i_{1,1}+2O_1, 0, 0, 0}$ | $W^{(3)}_{i_{1,1}, i_{1,1}+2O_1, 0, 0, 1}$ |
| $2N_1 O_1, \ldots, 3N_1 O_1 - 1$ | $W^{(3)}_{i_{1,1}, i_{1,1}+3O_1, 0, 0, 0}$ | $W^{(3)}_{i_{1,1}, i_{1,1}+3O_1, 0, 0, 1}$ | where $$W^{(3)}_{l,l',m,m',n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}.$$

3 Layers, Codebook-Config = 1-2, $N_1 = 6$, $N_2 = 1$
$i_{1,2} = 0$

| | $i_2$ | |
|---|---|---|
| $i_{1,1}$ | 0 | 1 |
| $0, \ldots, N_1 O_1 - 1$ | $W^{(3)}_{i_{1,1}, i_{1,1}+O_1, 0, 0, 0}$ | $W^{(3)}_{i_{1,1}, i_{1,1}+O_1, 0, 0, 1}$ |
| $N_1 O_1, \ldots, 2N_1 O_1 - 1$ | $W^{(3)}_{i_{1,1}, i_{1,1}+2O_1, 0, 0, 0}$ | $W^{(3)}_{i_{1,1}, i_{1,1}+2O_1, 0, 0, 1}$ |
| $2N_1 O_1, \ldots, 3N_1 O_1 - 1$ | $W^{(3)}_{i_{1,1}, i_{1,1}+3O_1, 0, 0, 0}$ | $W^{(3)}_{i_{1,1}, i_{1,1}+3O_1, 0, 0, 1}$ |
| $3N_1 O_1, \ldots, 4N_1 O_1 - 1$ | $W^{(3)}_{i_{1,1}, i_{1,1}+4O_1, 0, 0, 0}$ | $W^{(3)}_{i_{1,1}, i_{1,1}+4O_1, 0, 0, 1}$ | where $W^{(3)}_{l,l',m,m',n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}.$ TABLE 7-continued Codebook for 3-layer CSI reporting using antenna ports [15 to 14 + $P_{CSI\text{-}RS}$]

3 Layers, Codebook-Config = 1-2, $N_1 = 2$, $N_2 = 2$
$i_{1,2} = 0, 1, \ldots, N_2O_2 - 1$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,i_{1,2},i_{1,2},0}$ | $W^{(3)}_{i_{1,1},i_{1,1}+O_1,i_{1,2},i_{1,2},1}$ |
| $N_1O_1, \ldots, 2N_1O_1 - 1$ | $W^{(3)}_{i_{1,1},i_{1,1},i_{1,2},i_{1,2}+O_2,0}$ | $W^{(3)}_{i_{1,1},i_{1,1},i_{1,2},i_{1,2}+O_2,1}$ |
| $2N_1O_1, \ldots, 3N_1O_1 - 1$ | $W^{(3)}_{i_{1,1},i_{1,1}+O_1,i_{1,2},i_{1,2}+O_2,0}$ | $W^{(3)}_{i_{1,1},i_{1,1}+O_1,i_{1,2},i_{1,2}+O_2,1}$ | where $W^{(3)}_{l,l',m,m',n} = \frac{1}{\sqrt{3P_{CSI\text{-}RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

3 Layers, Codebook-Config = 1-2, $N_1 = 3$, $N_2 = 2$
$i_{1,2} = 0, 1, \ldots, N_2O_2 - 1$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,i_{1,2},i_{1,2},0}$ | $W^{(3)}_{i_{1,1},i_{1,1}+O_1,i_{1,2},i_{1,2},1}$ |
| $N_1O_1, \ldots, 2N_1O_1 - 1$ | $W^{(3)}_{i_{1,1},i_{1,1},i_{1,2},i_{1,2}+O_2,0}$ | $W^{(3)}_{i_{1,1},i_{1,1},i_{1,2},i_{1,2}+O_2,1}$ |
| $2N_1O_1, \ldots, 3N_1O_1 - 1$ | $W^{(3)}_{i_{1,1},i_{1,1}+O_1,i_{1,2},i_{1,2}+O_2,0}$ | $W^{(3)}_{i_{1,1},i_{1,1}+O_1,i_{1,2},i_{1,2}+O_2,1}$ |
| $3N_1O_1, \ldots, 4N_1O_1 - 1$ | $W^{(3)}_{i_{1,1},i_{1,1}+2O_1,i_{1,2},i_{1,2},0}$ | $W^{(3)}_{i_{1,1},i_{1,1}+2O_1,i_{1,2},i_{1,2},1}$ | where $W^{(3)}_{l,l',m,m',n} = \frac{1}{\sqrt{3P_{CSI\text{-}RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

3 Layers, Codebook-Config = 1-2, $P_{CSI\text{-}RS} \geq 16$

| $i_{1,1}$ | $i_{1,2}$ | $i_2$ | |
|---|---|---|---|
| $0, \ldots, \frac{N_1O_1}{2} - 1$ | $0, \ldots, N_2O_2 - 1$ if $N_2 > 1$; 0 otherwise | 0, 1 | $W^{(3)}_{i_{1,1} \bmod \frac{O_1N_1}{2}, i_{1,2}, 0, i_2}$ |
| $\frac{N_1O_1}{2}, \ldots, N_1O_1 - 1$ | $0, \ldots, N_2O_2 - 1$ if $N_2 > 1$; 0 otherwise | 0, 1 | $W^{(3)}_{i_{1,1} \bmod \frac{O_1N_1}{2}, i_{1,2}, 1, i_2}$ |
| $N_1O_1, \ldots, \frac{3N_1O_1}{2} - 1$ | $0, \ldots, N_2O_2 - 1$ if $N_2 > 1$; 0 otherwise | 0, 1 | $W^{(3)}_{i_{1,1} \bmod \frac{O_1N_1}{2}, i_{1,2}, 2, i_2}$ |
| $\frac{3N_1O_1}{2}, \ldots, 2N_1O_1 - 1$ | $0, \ldots, N_2O_2 - 1$ if $N_2 > 1$; 0 otherwise | 0, 1 | $W^{(3)}_{i_{1,1} \bmod \frac{O_1N_1}{2}, i_{1,2}, 3, i_2}$ |

Where $W^{(3)}_{l,m,p,n} = \frac{1}{\sqrt{3P_{CSI\text{-}RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}$

TABLE 8

Codebook for 4-layer CSI reporting using antenna ports [15 to 14 + $P_{CSI\text{-}RS}$]

4 Layers, Codebook-Config = 1-2, $N_1 = 2$, $N_2 = 1$
$i_{1,2} = 0$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,0,0,0}$ | $W^{(3)}_{i_{1,1},i_{1,1}+O_1,0,0,1}$ | where $W^{(4)}_{l,l',m,m',n} = \frac{1}{\sqrt{4P_{CSI\text{-}RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

4 Layers, Codebook-Config = 1-2, $N_1 = 4$, $N_2 = 1$
$i_{1,2} = 0$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,0,0,0}$ | $W^{(3)}_{i_{1,1},i_{1,1}+O_1,0,0,1}$ |
| $N_1O_1, \ldots, 2N_1O_1 - 1$ | $W^{(3)}_{i_{1,1},i_{1,1}+2O_1,0,0,0}$ | $W^{(3)}_{i_{1,1},i_{1,1}+2O_1,0,0,1}$ |
| $2N_1O_1, \ldots, 3N_1O_1 - 1$ | $W^{(3)}_{i_{1,1},i_{1,1}+3O_1,0,0,0}$ | $W^{(3)}_{i_{1,1},i_{1,1}+3O_1,0,0,1}$ | where $W^{(4)}_{l,l',m,m',n} = \frac{1}{\sqrt{4P_{CSI\text{-}RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

4 Layers, Codebook-Config = 1-2, $N_1 = 6$, $N_2 = 1$
$i_{1,2} = 0$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,0,0,0}$ | $W^{(3)}_{i_{1,1},i_{1,1}+O_1,0,0,1}$ |
| $N_1O_1, \ldots, 2N_1O_1 - 1$ | $W^{(3)}_{i_{1,1},i_{1,1}+2O_1,0,0,0}$ | $W^{(3)}_{i_{1,1},i_{1,1}+2O_1,0,0,1}$ |
| $2N_1O_1, \ldots, 3N_1O_1 - 1$ | $W^{(3)}_{i_{1,1},i_{1,1}+3O_1,0,0,0}$ | $W^{(3)}_{i_{1,1},i_{1,1}+3O_1,0,0,1}$ |
| $3N_1O_1, \ldots, 4N_1O_1 - 1$ | $W^{(3)}_{i_{1,1},i_{1,1}+4O_1,0,0,0}$ | $W^{(3)}_{i_{1,1},i_{1,1}+4O_1,0,0,1}$ | where $W^{(4)}_{l,l',m,m',n} = \frac{1}{\sqrt{4P_{CSI\text{-}RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

4 Layers, Codebook-Config = 1-2, $N_1 = 2$, $N_2 = 2$
$i_{1,2} = 0, 1, \ldots, N_2O_2 - 1$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,i_{1,2},i_{1,2},0}$ | $W^{(3)}_{i_{1,1},i_{1,1}+O_1,i_{1,2},i_{1,2},1}$ |
| $N_1O_1, \ldots, 2N_1O_1 - 1$ | $W^{(3)}_{i_{1,1},i_{1,1},i_{1,2},i_{1,2}+O_2,0}$ | $W^{(3)}_{i_{1,1},i_{1,1},i_{1,2},i_{1,2}+O_2,1}$ |
| $2N_1O_1, \ldots, 3N_1O_1 - 1$ | $W^{(3)}_{i_{1,1},i_{1,1}+O_1,i_{1,2},i_{1,2}+O_2,0}$ | $W^{(3)}_{i_{1,1},i_{1,1}+O_1,i_{1,2},i_{1,2}+O_2,1}$ | where $W^{(4)}_{l,l',m,m',n} = \frac{1}{\sqrt{4P_{CSI\text{-}RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

4 Layers, Codebook-Config = 1-2, $N_1 = 3$, $N_2 = 2$
$i_{1,2} = 0, 1, \ldots, N_2O_2 - 1$

| $i_{1,1}$ | $i_2$ | |
|---|---|---|
| | 0 | 1 |
| $0, \ldots, N_1O_1 - 1$ | $W^{(3)}_{i_{1,1},i_{1,1}+O_1,i_{1,2},i_{1,2},0}$ | $W^{(3)}_{i_{1,1},i_{1,1}+O_1,i_{1,2},i_{1,2},1}$ |
| $N_1O_1, \ldots, 2N_1O_1 - 1$ | $W^{(3)}_{i_{1,1},i_{1,1},i_{1,2},i_{1,2}+O_2,0}$ | $W^{(3)}_{i_{1,1},i_{1,1},i_{1,2},i_{1,2}+O_2,1}$ |

TABLE 8-continued

Codebook for 4-layer CSI reporting using antenna ports [15 to 14 + $P_{CSI-RS}$]

| | | |
|---|---|---|
| $2N_1O_1, \ldots, 3N_1O_1 - 1$ | $W_{i_{1,1},i_{1,1}+O_1,i_{1,2},i_{1,2}+O_2,0}^{(3)}$ | $W_{i_{1,1},i_{1,1}+O_1,i_{1,2},i_{1,2}+O_2,1}^{(3)}$ |
| $3N_1O_1, \ldots, 4N_1O_1 - 1$ | $W_{i_{1,1},i_{1,1}+2O_1,i_{1,2},i_{1,2},0}^{(3)}$ | $W_{i_{1,1},i_{1,1}+2O_1,i_{1,2},i_{1,2},1}^{(3)}$ | where $$W_{l,l',m,m',n}^{(4)} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$$

4 Layers, Codebook-Config = 1-2, $P_{CSI-RS} \geq 16$

| $i_{1,1}$ | $i_{1,2}$ | $i_2$ | |
|---|---|---|---|
| $0, \ldots, \frac{N_1O_1}{2} - 1$ | $0, \ldots, N_2O_2 - 1$ if $N_2 > 1$; 0 otherwise | 0, 1 | $W_{i_{1,1}\bmod \frac{O_1N_1}{2},i_{1,2},0,i_2}^{(4)}$ |
| $\frac{N_1O_1}{2}, \ldots, N_1O_1 - 1$ | $0, \ldots, N_2O_2 - 1$ if $N_2 > 1$; 0 otherwise | 0, 1 | $W_{i_{1,1}\bmod \frac{O_1N_1}{2},i_{1,2},1,i_2}^{(4)}$ |
| $N_1O_1, \ldots, \frac{3N_1O_1}{2} - 1$ | $0, \ldots, N_2O_2 - 1$ if $N_2 > 1$; 0 otherwise | 0, 1 | $W_{i_{1,1}\bmod \frac{O_1N_1}{2},i_{1,2},2,i_2}^{(4)}$ |
| $\frac{3N_1O_1}{2}, \ldots, 2N_1O_1 - 1$ | $0, \ldots, N_2O_2 - 1$ if $N_2 > 1$; 0 otherwise | 0, 1 | $W_{i_{1,1}\bmod \frac{O_1N_1}{2},i_{1,2},3,i_2}^{(4)}$ |

TABLE 8-continued

Codebook for 4-layer CSI reporting using antenna ports [15 to 14 + $P_{CSI-RS}$]

Where $$W_{l,m,p,n}^{(4)} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$$

TABLE 9

Codebook for 5-layer CSI reporting using antenna ports [15 to 14 + $P_{CSI-RS}$]
5 Layers, Codebook-Config = 1-2

| | $i_{1,1}$ | $i_{1,2}$ | $i_2$ | |
|---|---|---|---|---|
| $N_2 > 1$ | $0, \ldots, N_1O_1 - 1$ | $0, \ldots, N_2O_2 - 1$ | 0, 1 | $W_{i_{1,1},i_{1,1}+O_1,i_{1,1}+O_1,i_{1,2},i_{1,2},i_{1,2}+O_2,i_2}^{(5)}$ |
| $N_1 > 2, N_2 = 1$ | $0, \ldots, N_1O_1 - 1$ | 0 | 0, 1 | $W_{i_{1,1},i_{1,1}+O_1,i_{1,1}+2O_1,0,0,0,i_2}^{(5)}$ | where $$W_{l,l',l'',m,m',m'',n}^{(5)} = \frac{1}{\sqrt{5P_{CSI-RS}}} \begin{bmatrix} v_{l,m} & v_{l,m} & v_{l',m'} & v_{l',m'} & v_{l'',m''} \\ \varphi_n v_{l,m} & -\varphi_n v_{l,m} & v_{l',m'} & -v_{l',m'} & v_{l'',m''} \end{bmatrix}$$

TABLE 10

Codebook for 6-layer CSI reporting using antenna ports [15 to 14 + $P_{CSI-RS}$]
6 Layers, Codebook-Config = 1-2

| | $i_{1,1}$ | $i_{1,2}$ | $i_2$ | |
|---|---|---|---|---|
| $N_2 > 1$ | $0, \ldots, N_1O_1 - 1$ | $0, \ldots, N_2O_2 - 1$ | 0, 1 | $W_{i_{1,1},i_{1,1}+O_1,i_{1,1}+O_1,i_{1,2},i_{1,2},i_{1,2}+O_2,i_2}^{(6)}$ |
| $N_1 > 2, N_2 = 1$ | $0, \ldots, N_1O_1 - 1$ | 0 | 0, 1 | $W_{i_{1,1},i_{1,1}+O_1,i_{1,1}+2O_1,0,0,0,i_2}^{(6)}$ | where $$W_{l,l',l'',m,m',m'',n}^{(6)} = \frac{1}{\sqrt{6P_{CSI-RS}}} \begin{bmatrix} v_{l,m} & v_{l,m} & v_{l',m'} & v_{l',m'} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} \end{bmatrix}$$

TABLE 11

Codebook for 7-layer CSI reporting using antenna ports [15 to 14 + $P_{CSI-RS}$]
7 Layers, Codebook-Config = 1-2

| | $i_{1,1}$ | $i_{1,2}$ | $i_2$ | |
|---|---|---|---|---|
| $N_1 = 4, N_2 = 1$ | $0, \ldots, \frac{N_1O_1}{2} - 1$ | 0 | 0, 1 | $W_{i_{1,1},i_{1,1}+O_1,i_{1,1}+2O_1,i_{1,1}+3O_1,0,0,0,0,i_2}^{(7)}$ |
| $N_1 > 4, N_2 = 1$ | $0, \ldots, N_1O_1 - 1$ | 0 | 0, 1 | $W_{i_{1,1},i_{1,1}+O_1,i_{1,1}+2O_1,i_{1,1}+3O_1,0,0,0,0,i_2}^{(7)}$ |
| $N_1 = 2, N_2 = 2$ | $0, \ldots, N_1O_1 - 1$ | $0, \ldots, N_2O_2 - 1$ | 0, 1 | $W_{i_{1,1},i_{1,1}+O_1,i_{1,1},i_{1,1}+O_1,i_{1,2},i_{1,2},i_{1,2}+O_2,i_{1,2}+O_2,i_2}^{(7)}$ |
| $N_1 > 2, N_2 = 2$ | $0, \ldots, N_1O_1 - 1$ | $0, \ldots, \frac{N_2O_2}{2} - 1$ | 0, 1 | $W_{i_{1,1},i_{1,1}+O_1,i_{1,1},i_{1,1}+O_1,i_{1,2},i_{1,2},i_{1,2}+O_2,i_{1,2}+O_2,i_2}^{(7)}$ |
| $N_1 > 2, N_2 > 2$ | $0, \ldots, N_1O_1 - 1$ | $0, \ldots, N_2O_2 - 1$ | 0, 1 | $W_{i_{1,1},i_{1,1}+O_1,i_{1,1},i_{1,1}+O_1,i_{1,2},i_{1,2},i_{1,2}+O_2,i_{1,2}+O_2,i_2}^{(7)}$ |

Where $$W_{l,l',l'',l''',m,m',m'',m''',n}^{(7)} = \frac{1}{\sqrt{7P_{CSI-RS}}} \begin{bmatrix} v_{l,m} & v_{l,m} & v_{l',m'} & v_{l',m'} & v_{l'',m''} & v_{l''',m'''} & v_{l''',m'''} \\ \varphi_n v_{l,m} & -\varphi_n v_{l,m} & \varphi_n v_{l',m'} & -\varphi_n v_{l',m'} & v_{l'',m''} & v_{l''',m'''} & -v_{l''',m'''} \end{bmatrix}$$

TABLE 12

Codebook for 8-layer CSI reporting using antenna ports [15 to 14 + $P_{CSI-RS}$]
8 Layers, Codebook-Config = 1-2

| | $i_{1,1}$ | $i_{1,2}$ | $i_2$ | |
|---|---|---|---|---|
| $N_1 = 4, N_2 = 1$ | $0, \ldots, \frac{N_1 O_1}{2} - 1$ | 0 | 0, 1 | $W^{(8)}_{i_{1,1}, i_{1,1}+O_1, i_{1,1}+2O_1, i_{1,1}+3O_1, 0, 0, 0, 0, i_2}$ |
| $N_1 > 4, N_2 = 1$ | $0, \ldots, N_1 O_1 - 1$ | 0 | 0, 1 | $W^{(8)}_{i_{1,1}, i_{1,1}+O_1, i_{1,1}+2O_1, i_{1,1}+3O_1, 0, 0, 0, 0, i_2}$ |
| $N_1 = 2, N_2 = 2$ | $0, \ldots, N_1 O_1 - 1$ | $0, \ldots, N_2 O_2 - 1$ | 0, 1 | $W^{(8)}_{i_{1,1}, i_{1,1}+O_1, i_{1,1}, i_{1,1}+O_1, i_{1,2}, i_{1,2}, i_{1,2}+O_2, i_{1,2}+O_2, i_2}$ |
| $N_1 > 2, N_2 = 2$ | $0, \ldots, N_1 O_1 - 1$ | $0, \ldots, \frac{N_2 O_2}{2} - 1$ | 0, 1 | $W^{(8)}_{i_{1,1}, i_{1,1}+O_1, i_{1,1}, i_{1,1}+O_1, i_{1,2}, i_{1,2}, i_{1,2}+O_2, i_{1,2}+O_2, i_2}$ |
| $N_1 > 2, N_2 > 2$ | $0, \ldots, N_1 O_1 - 1$ | $0, \ldots, N_2 O_2 - 1$ | 0, 1 | $W^{(8)}_{i_{1,1}, i_{1,1}+O_1, i_{1,1}, i_{1,1}+O_1, i_{1,2}, i_{1,2}, i_{1,2}+O_2, i_{1,2}+O_2, i_2}$ | where $$W^{(8)}_{l,l',l''',m,m',m'',m''',n} = \frac{1}{\sqrt{8P_{CSI-RS}}} \begin{bmatrix} v_{l,m} & v_{l,m} & v_{l',m'} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & -\varphi_n v_{l',m'} & v_{l'',m''} & -v_{l'',m''} & v_{l''',m'''} & -v_{l''',m'''} \end{bmatrix}.$$

In one embodiment C, a UE is configured with a codebook for up to rank 8 PMI reporting in which for 3-layer to up to 8-layer CSI reporting, the PMI codebook is the same as in the aforementioned embodiment B except for 3-layer and 4-layers. When the number of layers $\upsilon \in \{3,4\}$ and the number of CSI-RS ports $P_{CSI-RS} < 16$, each PMI value corresponds to three codebook indices $i_{1,1}$, $i_{1,2}$, $i_2$ given in TABLES 7-12. When the number of layers $\upsilon \in \{3, 4\}$ and the number of CSI-RS ports $P_{CSI-RS} \geq 16$, each PMI value correspond to four codebook indices $i_{1,1}, i_{1,2}, i_{1,3}, i_2$ given in TABLES 13 and 14.

TABLE 13

Codebook for 3-layer CSI reporting using antenna ports
[15 to 14 + $P_{CSI-RS}$]
3 Layers, Codebook-Config = 1-2, $P_{CSI-RS} \geq 16$

| $i_{1,1}$ | $i_{1,2}$ | $i_{1,3}$ | $i_2$ | |
|---|---|---|---|---|
| $0, \ldots, \frac{N_1 O_1}{2} - 1$ | $0, \ldots, N_2 O_2 - 1$ if $N_2 > 1$; 0 otherwise | 0, 1, 2, 3 | 0, 1 | $W^{(3)}_{i_{1,1}, i_{1,2}, i_{1,3}, i_2}$ | where $$W^{(3)}_{l,m,p,n} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}.$$

TABLE 14

Codebook for 4-layer CSI reporting using antenna ports
[15 to 14 + $P_{CSI-RS}$]
4 Layers, Codebook-Config = 1-2, $P_{CSI-RS} \geq 16$

| $i_{1,1}$ | $i_{1,2}$ | $i_{1,3}$ | $i_2$ | |
|---|---|---|---|---|
| $0, \ldots, \frac{N_1 O_1}{2} - 1$ | $0, \ldots, N_2 O_2 - 1$ if $N_2 > 1$; 0 otherwise | 0, 1, 2, 3 | 0, 1 | $W^{(4)}_{i_{1,1}, i_{1,2}, i_{1,3}, i_2}$ |

Where $$W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}.$$

In one embodiment D, a UE is configured with a codebook for up to rank 8 PMI reporting in which for 3-layer to up to 8-layer CSI reporting, the PMI codebook is the same as in the aforementioned embodiment B except for 3-layer and 4-layers. When the number of layers $\upsilon \in \{3, 4\}$ each PMI value correspond to four codebook indices $i_{1,1}$, $i_{1,2}$, $i_{1,3}$, $i_2$ given in TABLES 16 and 17. The mapping of $i_{1,3}$ to $k_1$ and $k_2$ for $P_{CSI-RS} < 16$ is given in TABLE 15.

TABLE 15

Mapping of $i_{1,3}$ field to $k_1$ and $k_2$ for 3-layer and 4-layer and $P_{CSI-RS} < 16$

| Value of | $N_1 = 2, N_2 = 1$ | | $N_1 = 4, N_2 = 1$ | | $N_1 = 6, N_2 = 1$ | | $N_1 = 2, N_2 = 2$ | | $N_1 = 3, N_2 = 2$ | |
|---|---|---|---|---|---|---|---|---|---|---|
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0 |

TABLE 16

Codebook for 3-layer CSI reporting using antenna ports [15 to 14 + $P_{CSI-RS}$]

3 Layers, Codebook-Config = 1-2, $P_{CSI-RS} < 16$

|   | $i_{1,1}$ | $i_{1,2}$ |
|---|---|---|
| $N_2 = 1$ | $0, \ldots, N_1O_1 - 1$ | $0$ |
| $N_2 > 1$ | $0, \ldots, N_1O_1 - 1$ | $i_{1,2} = 0, 1, \ldots, N_2O_2 - 1$ |

| | $i_2$ | |
|---|---|---|
| | 0 | 1 |
| $N_2 = 1$ | $W^{(3)}_{i_{1,1},i_{1,1}+k_1,0,0,0}$ | $W^{(3)}_{i_{1,1},i_{1,1}+k_1,0,0,1}$ |
| $N_2 > 1$ | $W^{(3)}_{i_{1,1},i_{1,1}+k_1,i_{1,2},i_{1,2}+k_2,0}$ | $W^{(3)}_{i_{1,1},i_{1,1}+k_1,i_{1,2},i_{1,2}+k_2,0}$ | where $W^{(3)}_{l,l',m,m',n} = \dfrac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

3 Layers, Codebook-Config = 1-2, $P_{CSI-RS} \geq 16$

|   | $i_{1,1}$ | $i_{1,2}$ | $i_{1,3}$ | $i_2$ | |
|---|---|---|---|---|---|
| $N_2 = 1$ | $0, \ldots, \dfrac{N_1O_1}{2} - 1$ | 0 | 0, 1, 2, 3 | 0, 1 | $W^{(3)}_{i_{1,1},i_{1,2},i_{1,3},i_2}$ |
| $N_2 > 1$ | $0, \ldots, \dfrac{N_1O_1}{2} - 1$ | $i_{1,2} = 0, 1, \ldots, N_2O_2 - 1$ | 0, 1, 2, 3 | 0, 1 | $W^{(3)}_{i_{1,1},i_{1,2},i_{1,3},i_2}$ |

Where $$W^{(3)}_{l,m,p,n} = \dfrac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}.$$

TABLE 17

Codebook for 4-layer CSI reporting using antenna ports. [15 to 14 + $P_{CSI-RS}$]

4 Layers, Codebook-Config = 1-2, $P_{CSI-RS} < 16$

|   | $i_{1,1}$ | $i_{1,2}$ |
|---|---|---|
| $N_2 = 1$ | $0, \ldots, N_1O_1 - 1$ | $0$ |
| $N_2 > 1$ | $0, \ldots, N_1O_1 - 1$ | $i_{1,2} = 0, 1, \ldots, N_2O_2 - 1$ |

| | $i_2$ | |
|---|---|---|
| | 0 | 1 |
| $N_2 = 1$ | $W^{(4)}_{i_{1,1},i_{1,1}+k_1,0,0,0}$ | $W^{(4)}_{i_{1,1},i_{1,1}+k_1,0,0,1}$ |
| $N_2 > 1$ | $W^{(4)}_{i_{1,1},i_{1,1}+k_1,i_{1,2},i_{1,2}+k_2,0}$ | $W^{(4)}_{i_{1,1},i_{1,1}+k_1,i_{1,2},i_{1,2}+k_2,1}$ |

Where $$W^{(4)}_{l,l',m,m',n} = \dfrac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}.$$

4 Layers, Codebook-Config = 1-2, $P_{CSI-RS} \geq 16$

|   | $i_{1,1}$ | $i_{1,2}$ | $i_{1,3}$ | $i_2$ | |
|---|---|---|---|---|---|
| $N_2 = 1$ | $0, \ldots, \dfrac{N_1O_1}{2} - 1$ | 0 | 0, 1, 2, 3 | 0, 1 | $W^{(4)}_{i_{1,1},i_{1,2},i_{1,3},i_2}$ |
| $N_2 > 1$ | $0, \ldots, \dfrac{N_1O_1}{2} - 1$ | $i_{1,2} = 0, 1, \ldots, N_2O_2 - 1$ | 0, 1, 2, 3 | 0, 1 | $W^{(4)}_{i_{1,1},i_{1,2},i_{1,3},i_2}$ |

TABLE 17-continued

Codebook for 4-layer CSI reporting using antenna ports. [15 to 14 + $P_{CSI-RS}$]

Where $$W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}.$$

In one embodiment E, a UE is configured with a codebook for up to rank 8 PMI reporting in which for 3-layer to up to 8-layer CSI reporting, the PMI codebook is the same as in the aforementioned embodiment B except for 3-layer and 4-layers. When the number of layers $\upsilon \in \{3,4\}$ each PMI value correspond to five codebook indices $i_{1,1}$ $i_{1,2}$, $i_{1,3}$, $i_{1,4}$, $i_2$ given in TABLES 16 and 17. The mapping of $i_{1,3}$ and $i_{1,4}$ to $k_1$ and $k_2$, respectively for $P_{CSI-RS}$<16 is given in TABLE 18 where for $N_1$=3, $N_2$=2, the UE can report only four values for $(i_{1,3}, i_{1,4})$={$(O_1,0), (0,O_2), (O_1,O_2), (2O_1,0)$}, and also the UE may not report $(i_{1,3}, i_{1,4})$=(0,0).

TABLE 18

Mapping of $i_{1, 3}$ and $i_{1, 4}$ field to $k_1$ and $k_2$ for 3-layer and 4-layer and $P_{CSI-RS}$ < 16

| Value of $i_{1, 3}$ | $N_1 = 2$, $N_2 = 1$ $k_1$ | $N_1 = 4$, $N_2 = 1$ $k_1$ | $N_1 = 6$, $N_2 = 1$ $k_1$ | $N_1 = 2$, $N_2 = 2$ $k_1$ | $N_1 = 3$, $N_2 = 2$ $k_1$ |
|---|---|---|---|---|---|
| 0 | $O_1$ | $O_1$ | $O_1$ | 0 | 0 |
| 1 | | $2O_1$ | $2O_1$ | $O_1$ | $O_1$ |
| 2 | | | $3O_1$ | | $2O_1$ |
| 3 | | | $4O_1$ | | |

| Value of $i_{1, 4}$ | $N_1 = 2$, $N_2 = 1$ $k_2$ | $N_1 = 4$, $N_2 = 1$ $k_2$ | $N_1 = 6$, $N_2 = 1$ $k_2$ | $N_1 = 2$, $N_2 = 2$ $k_2$ | $N_1 = 3$, $N_2 = 2$ $k_2$ |
|---|---|---|---|---|---|
| 0 | 0 | 0 | 0 | 0 | 0 |
| 1 | | | | $O_2$ | $O_2$ |

The present disclosure assumes that $N_1$ and $N_2$ are the number of antenna ports with the same polarization in the first and second dimensions, respectively. For 2D antenna port layouts, 2D antenna port layouts may have $N_1$>1, $N_2$>1, and for 1D antenna port layouts $N_1$>1 and $N_2$=1. So, for a dual-polarized antenna port layout, the total number of antenna ports is $X=2N_1N_2$. Note that with a little abuse of notation, P and X are used interchangeably for the number of antenna ports in the disclosure.

Figure 16:
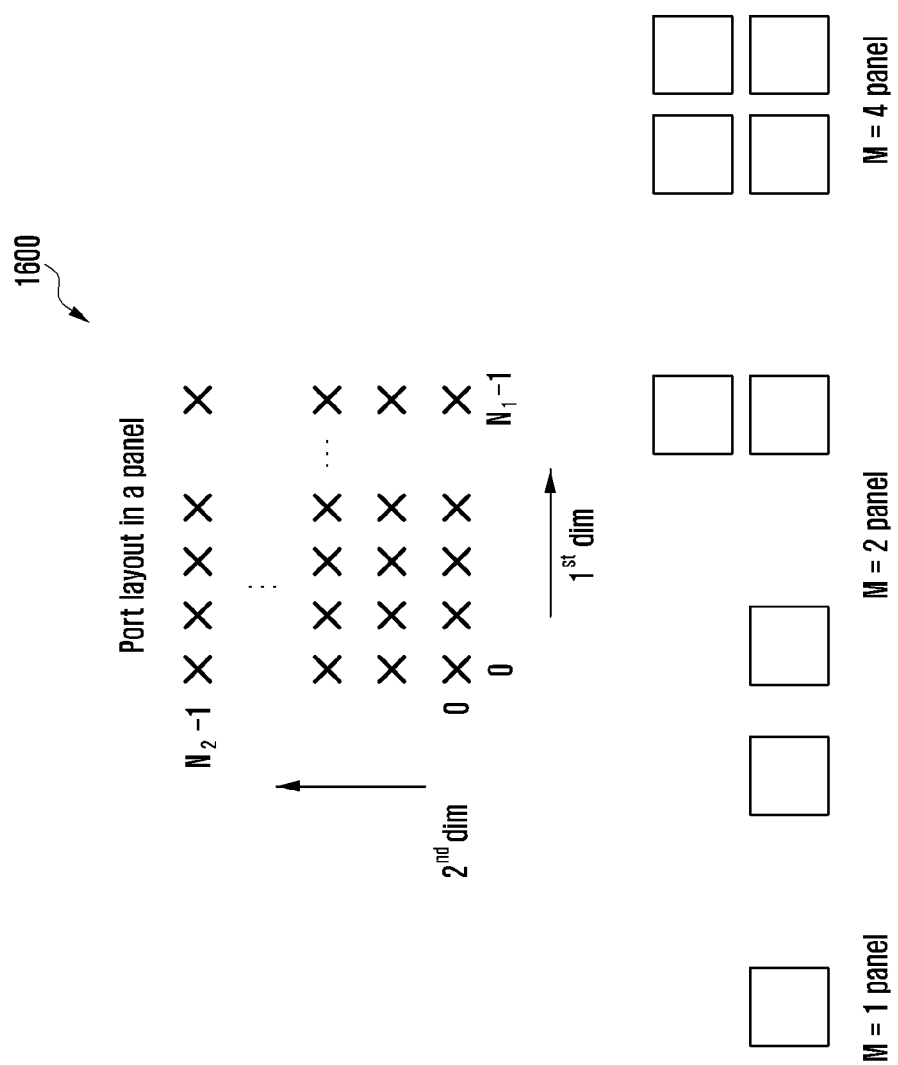
FIG. 16 illustrates an example multiple antenna panels according to embodiments of the present disclosure.

FIG. 16 illustrates an example multiple antenna panels 1600 according to embodiments of the present disclosure. The embodiment of the multiple antenna panels 1600 illustrated in FIG. 16 is for illustration only. FIG. 16 does not limit the scope of this disclosure to any particular implementation.

Also, the embodiments of the present disclosure is applicable to a setup in which multiple antenna panels are included where each panel is a dual-polarized antenna ports with $N_1$ and $N_2$ ports in two dimensions. An illustration is shown in FIG. 16 in which there are M antenna panels. Note that the antenna port layouts may or may not be the same in different antenna panel.

A dual-stage $W=W_1W_2$ port selection codebook for rank 1 and 2 CSI reporting is provided in the present disclosure.

In one embodiment, the number of CSI-RS ports is X. In one alternative, $X=2N_1N_2 \in \{2,4,8,12,16,24,32\}$ or $\{4,8,12,16,24,32\}$. In another alternative, $X \in \{2,4,8\}$.

The rank-R, where R=1, 2, dual-stage precoding matrix has the structure $W=W_1W_2$, each column of W is normalized to $$\frac{1}{\sqrt{R}},$$

where $$W_1 = \begin{bmatrix} E_{\frac{X}{2} \times L} & 0 \\ 0 & E_{\frac{X}{2} \times L} \end{bmatrix},$$

where $$E_{\frac{X}{2} \times L}$$

is a port selection matrix, $L \bigstar \{2, 3, 4\}$ is configurable, and $X \geq 2L$;

$$W_2 = \begin{bmatrix} p^{(WB)}_{0,0,0} \cdot p^{(SB)}_{0,0,0} \cdot c_{0,0,0} & p^{(WB)}_{0,1,0} \cdot p^{(SB)}_{0,1,0} \cdot c_{0,1,0} \\ \vdots & \vdots \\ p^{(WB)}_{0,0,L-1} \cdot p^{(SB)}_{0,0,L-1} \cdot c_{0,0,L-1} & p^{(WB)}_{0,1,L-1} \cdot p^{(SB)}_{0,1,L-1} \cdot c_{0,1,L-1} \\ p^{(WB)}_{1,0,L-1} \cdot p^{(SB)}_{1,0,L-1} \cdot c_{1,0,L-1} & p^{(WB)}_{1,1,L-1} \cdot p^{(SB)}_{1,1,L-1} \cdot c_{1,1,L-1} \\ \vdots & \vdots \\ p^{(WB)}_{1,0,L-1} \cdot p^{(SB)}_{1,0,L-1} \cdot c_{1,0,L-1} & p^{(WB)}_{1,1,L-1} \cdot p^{(SB)}_{1,1,L-1} \cdot c_{1,1,L-1} \end{bmatrix}$$

for rank 2 (R=2), where $p_{r,l,i}^{(WB)}$ wideband (WB) coefficient amplitude scaling factor for coefficient i and on polarization r and layer l, $p_{r,l,i}^{(SB)}$ subband (SB) coefficient amplitude scaling factor for coefficient i and on polarization r and layer l, and $c_{r,l,i}$ combining coefficient (phase) for coefficient i and on polarization r and layer l.

The codebook for phase reporting is configurable (via RRC) between QPSK (2 bits) and 8PSK (3 bits). The amplitude scaling mode is configurable (via RRC) between WB+SB (with unequal bit allocation) and WB-only.

The strongest out of 2L coefficient is reported per layer in a WB manner, which requires $\lceil \log_2(2L) \rceil$ bits per layer. The rest of the (2L−1) coefficients are normalized by the strongest coefficient and the amplitude and phase of the normalized 2L−1 coefficients are reporter per layer.

The reporting of amplitude scaling is as follows. In one example, each amplitude scaling is independently, selected for each beam, polarization, and layer. In one example, a UE is configured to report wideband amplitude with or without subband amplitude. In one example, the wideband amplitude codebook is $\{1, \sqrt{0.5}, \sqrt{0.25}, \sqrt{0.125}, \sqrt{0.0625}, \sqrt{0.0313}, \sqrt{0.0156}, 0\}$, which requires 3 bits per WB amplitude. In one example, the subband amplitude codebook is $\{1, \sqrt{0.5}\}$, which requires 1 bit per SB amplitude. In one example, the PMI payload (amplitude and phase) can vary depending on whether a WB amplitude is zero or not.

The reporting of phase for combining coefficients is as follows. In one example, each phase is reported independently per SB, selected for each beam, polarization, and layer. In one example, the phase codebook is either $$\{e^{j\frac{\pi n}{2}}, n = 0, 1, 2, 3\}$$

(2 bits) or $$\{e^{j\frac{\pi n}{4}}, n = 0, 1, \ldots, 7\}$$

(3 bits). In one alternative, the port selection matrix $$E_{\frac{X}{2} \times L} = \left[ e^{\left(\frac{X}{2}\right)}_{mod\left(md, \frac{X}{2}\right)} \; e^{\left(\frac{X}{2}\right)}_{mod\left(md+1, \frac{X}{2}\right)} \; \cdots \; e^{\left(\frac{X}{2}\right)}_{mod\left(md+L-1, \frac{X}{2}\right)} \right] \text{ where } e^{\left(\frac{X}{2}\right)}_i$$

is based on fixed port selection patterns. For example, $$E_{\frac{X}{2} \times L}$$

is a length X/2 port select column vector whose all entries all zero except i-th entry which is 1, $$m \in \left\{0, 1, \ldots, \left\lceil \frac{X}{2d} \right\rceil - 1\right\},$$

and $d \in \{1,2,3,4\}$ is configurable (via RRC), and $d \le L$ and $d \le X/2$.

The overhead for port selection reporting (i.e., to report an m value) using the $W_1$ codebook is $$\left\lceil \log_2 \left\lceil \frac{X}{2d} \right\rceil \right\rceil$$

bits, which is reported in a WB manner and the overhead is common for all layers and two polarizations.

In one embodiment 6A, the possible values of in depending on the configured value of d and the number of antenna ports X are summarized in TABLE 19.

TABLE 19

The range of values of m as a function of d and X

| | | X | | | | | | |
|---|---|---|---|---|---|---|---|---|
| | | 2 | 4 | 8 | 12 | 16 | 24 | 32 |
| d | 1 | {0} | {0, 1} | {0, 1, 2, 3} | {0, 1, ..., 5} | {0, 1, ..., 7} | {0, 1, ..., 11} | {0, 1, ..., 15} |
| | 2 | — | {0} | {0, 1} | {0, 1, 2} | {0, 1, 2, 3} | {0, 1, ..., 5} | {0, 1, ..., 7} |
| | 3 | — | — | {0, 1} | {0, 1} | {0, 1, 2} | {0, 1, 2, 3} | {0, 1, ..., 5} |
| | 4 | — | — | {0} | {0, 1} | {0, 1} | {0, 1, 2} | {0, 1, 2, 3} |

In one embodiment 6B, the above port selection codebook is extended to include L=1 in which only one port (per polarization) is selected using $W_1$. The set of values where L is configured a value from include 1, for example, $L \in \{1, 2, 3, 4\}$.

In one embodiment 6C, the port selection codebook is extended to rank 3 and rank 4. The UE can report CSI up to rank 4. Note that the minimum values of X and L for rank 4 CSI reporting are 4 and 2, respectively.

The $W_1$ codebook to select the port selection matrix $$E_{\frac{X}{2} \times L}$$

can be common for all layers. So, one m value is reported for all layers (for example using Table 19). Alternatively, two in values are reported where the first in value is reported for layers 1-2 and the second in value is reported for layer 3-4.

The $W_2$ codebook to select amplitudes and phases of (port) combining coefficients is according to one of the following alternatives. In one example of Alt 6C-0, independent encoding of layers. In one example of Alt 6C-1, dependent encoding of layers.

In one embodiment 7, a UE is configured with a dual-stage $W=W_1 W_2$ codebook for rank R (e.g. R=1-8) CSI reporting in which the $W_1$ codebook is a port selection codebook, i.e., $$W_1 = \begin{bmatrix} E_{\frac{X}{2} \times l} & 0 \\ 0 & E_{\frac{X}{2} \times l} \end{bmatrix},$$

where $l \le L$. The port selection matrix $$E_{\frac{X}{2} \times l}$$

is reported in a WB manner for all ranks (i.e., there is no SB port selection).

The UE is configured (e.g. via RRC signaling) with the maximum value of the number of ports (L) that can be selected per polarization. The UE selects l (where $l \le L$) ports per polarization to report rank R CSI where the value l changes with rank, for example, l increases with increasing rank. A summary of port selection for different rank is provided in TABLE 20. Based on the summary, the CSI reporting is according to at least one of the following alternatives.

In one example of Alt 7-0, the UE is configured with L=1, then the UE selects l=1 port per polarization for rank 1 and 2, and reports a 1-bit RI regardless of the UE's capability to report max 2 or 4 or 8 layers. In such example, the UE is configured with L=2, and is capable of: max 2 layers reporting, then the UE selects l=1 port per polarization for rank 1-2, and reports a 1-bit RI for rank 1-2; and/or max 4 or 8 layers reporting, then the UE selects l=1 port per polarization for rank 1-2, l=2 ports per polarization for rank 3-4, and reports a 2-bit RI for rank 1-4.

In such example, the UE is configured with L=3, and is capable of: max 2 layers reporting, then the UE selects l=1 port per polarization for rank 1-2, and reports a 1-bit RI for rank 1-2; max 4 layers reporting, then the UE selects l=1 port per polarization for rank 1-2, l=2 ports per polarization for rank 3-4, and reports a 2-bit RI for rank 1-4; and/or max 8 layers reporting, then the UE selects l=1 port per polarization for rank 1-2, l=2 ports per polarization for rank 3-4, l=3 ports per polarization for rank 5-6, and reports a 3-bit RI for rank 1-6.

In such example, the UE is configured with L=4, and is capable of: max 2 layers reporting, then the UE selects l=1 port per polarization for rank 1-2, and reports a 1-bit RI for rank 1-2; max 4 layers reporting, then the UE selects l=1 port per polarization for rank 1-2, l=2 ports per polarization for rank 3-4, and reports a 2-bit RI for rank 1-4; and/or max 8 layers reporting, then the UE selects l=1 port per polarization for rank 1-2, l=2 ports per polarization for rank 3-4, l=3 ports per polarization for rank 5-6, l=4 ports per polarization for rank 7-8, and reports a 3-bit RI for rank 1-8.

In one example of Alt 7-1, the configured value of L one-to-one maps to the UE's capability to report maximum number of layers: the UE is configured with L=1 if the UE is capable of reporting max 2 layers; the UE is configured with L=2 if the UE is capable of reporting max 4 layers; the UE is configured with L=3 if the UE is capable of reporting max 6 layers; and/or the UE is configured with L=4 if the UE is capable of reporting max 8 layers.

In one example of Alt 7-2, either Alt 7-0 or Alt 7-1 is used in which the UE can only be configured with a subset of L values in $\{1, 2, 3, 4\}$, for example, $\{1, 2, 4\}$.

TABLE 20

Summary of port selection vs rank

| L | Max # layers | Number of selected ports (l), Rank | | | RI (bits) |
|---|---|---|---|---|---|
| 1 | max 2 layers | 1, 1-2 | — | — | 1 |
| 2 | max 2 layers | 1, 1-2 | — | — | 1 |
|   | max 4 layers | 1, 1-2 | 2, 3-4 | — | 2 |
| 3 | max 2 layers | 1, 1-2 | — | — | 1 |
|   | max 4 layers | 1, 1-2 | 2, 3-4 | — | 2 |
|   | max 8 layers | 1, 1-2 | 2, 3-4 | 3, 5-6 | 3 |
| 4 | max 2 layers | 1, 1-2 | — | — | 1 |
|   | max 4 layers | 1, 1-2 | 2, 3-4 | — | 2 |
|   | max 8 layers | 1, 1-2 | 2, 3-4 | 3, 5-6 | 3 |
|   | max 8 layers | 1, 1-2 | 2, 3-4 | 3, 5-6 | 4, 7-8 | 3 |

The rank-R dual-stage precoding matrix structure is then as follows: $W=W_1 W_2$, each column of W is normalized to $$\frac{1}{\sqrt{2R}}; W_1 = \begin{bmatrix} E_{\frac{X}{2} \times l} & 0 \\ 0 & E_{\frac{X}{2} \times l} \end{bmatrix},$$

where l=1 for rank 1-2, l=2 for rank 3-4, l=3 for rank 5-6, and l=4 for rank 7-8; and $$W_2 = \begin{bmatrix} c_{0,0} & 0 & & 0 \\ 0 & c_{0,0} & \cdots & 0 \\ \vdots & \vdots & & \vdots \\ 0 & 0 & & c_{0,R-1} \\ c_{1,0} & 0 & & 0 \\ 0 & c_{1,1} & \cdots & 0 \\ \vdots & \vdots & & \vdots \\ 0 & 0 & & c_{1,R-1} \end{bmatrix}$$

is 2L×R cophasing matrix where $c_{0,l}=1$ and $c_{1,l}$ is selected from QPSK alphabet $\{1, j, -1, -j\}$ for all l in $\{0, 1, \ldots, R-1\}$.

In one embodiment 7A, $W_2$ matrix structure and cophasing coefficients reporting are as follows. For rank 1 (R=1), $$W_2 = \begin{bmatrix} c_{0,0} \\ c_{1,0} \end{bmatrix} = \begin{bmatrix} c_{0,0} e_0^{(1)} \\ c_{1,0} e_0^{(1)} \end{bmatrix}$$

where $c_{r,0}$ is co-phasing coefficient (between two polarizations) with $c_{0,0}=1$ and $c_{1,0} \in \{1, j, -1, -j\}$. The calculation and reporting of $c_{1,0}$ can be subband (which requires 2 bits/subband).

For rank 2-8, $W_2$ is as follows:

$$W_2 = \begin{bmatrix} c_{0,0} & c_{0,1} \\ c_{1,0} & c_{1,1} \end{bmatrix} = \begin{bmatrix} c_{0,0} e_0^{(1)} & c_{0,1} e_0^{(1)} \\ c_{1,0} e_0^{(1)} & c_{1,1} e_0^{(1)} \end{bmatrix}$$

for rank 2 (R=2);

$$W_2 = \begin{bmatrix} c_{0,0} & c_{0,1} & 0 \\ 0 & 0 & c_{0,2} \\ c_{1,0} & c_{1,1} & 0 \\ 0 & 0 & c_{1,2} \end{bmatrix} = \begin{bmatrix} c_{0,0} e_0^{(2)} & c_{0,1} e_0^{(2)} & c_{0,2} e_1^{(2)} \\ c_{1,0} e_0^{(2)} & c_{1,1} e_0^{(2)} & c_{1,2} e_1^{(2)} \end{bmatrix}$$

for rank 3 (R=3);

$$W_2 = \begin{bmatrix} c_{0,0} & c_{0,1} & 0 & 0 \\ 0 & 0 & c_{0,2} & c_{0,3} \\ c_{1,0} & c_{1,1} & 0 & 0 \\ 0 & 0 & c_{1,2} & c_{1,3} \end{bmatrix} = \begin{bmatrix} c_{0,0} e_0^{(2)} & c_{0,1} e_0^{(2)} & c_{0,2} e_1^{(2)} & c_{0,3} e_1^{(2)} \\ c_{1,0} e_0^{(2)} & c_{1,1} e_0^{(2)} & c_{1,2} e_1^{(2)} & c_{1,3} e_1^{(2)} \end{bmatrix}$$

for rank 4 (R=4);

$$W_2 = \begin{bmatrix} c_{0,0} & c_{0,1} & 0 & 0 & 0 \\ 0 & 0 & c_{0,2} & c_{0,3} & 0 \\ 0 & 0 & 0 & 0 & c_{0,4} \\ c_{1,0} & c_{1,1} & 0 & 0 & 0 \\ 0 & 0 & c_{1,2} & c_{1,3} & 0 \\ 0 & 0 & 0 & 0 & c_{1,4} \end{bmatrix} = \begin{bmatrix} c_{0,0}e_0^{(3)} & c_{0,1}e_0^{(3)} & c_{0,2}e_1^{(3)} & c_{0,3}e_1^{(3)} & c_{0,4}e_2^{(3)} \\ c_{1,0}e_0^{(3)} & c_{1,1}e_0^{(3)} & c_{1,2}e_1^{(3)} & c_{1,3}e_1^{(3)} & c_{1,4}e_2^{(3)} \end{bmatrix}$$

for rank 5 (R=5);

$$W_2 = \begin{bmatrix} c_{0,0} & c_{0,1} & 0 & 0 & 0 & 0 \\ 0 & 0 & c_{0,2} & c_{0,3} & 0 & 0 \\ 0 & 0 & 0 & 0 & c_{0,4} & c_{0,5} \\ c_{1,0} & c_{1,1} & 0 & 0 & 0 & 0 \\ 0 & 0 & c_{1,2} & c_{1,3} & 0 & 0 \\ 0 & 0 & 0 & 0 & c_{1,4} & c_{1,5} \end{bmatrix} = \begin{bmatrix} c_{0,0}e_0^{(3)} & c_{0,1}e_0^{(3)} & c_{0,2}e_1^{(3)} & c_{0,3}e_1^{(3)} & c_{0,4}e_2^{(3)} & c_{0,5}e_2^{(3)} \\ c_{1,0}e_0^{(3)} & c_{1,1}e_0^{(3)} & c_{1,2}e_1^{(3)} & c_{1,3}e_1^{(3)} & c_{1,4}e_2^{(3)} & c_{1,5}e_2^{(3)} \end{bmatrix};$$

for rank 6 (R=6)

$$W_2 = \begin{bmatrix} c_{0,0} & c_{0,1} & 0 & 0 & 0 & 0 & 0 \\ 0 & 0 & c_{0,2} & c_{0,3} & 0 & 0 & 0 \\ 0 & 0 & 0 & 0 & c_{0,4} & c_{0,5} & 0 \\ 0 & 0 & 0 & 0 & 0 & 0 & c_{0,6} \\ c_{1,0} & c_{1,1} & 0 & 0 & 0 & 0 & 0 \\ 0 & 0 & c_{1,2} & c_{1,3} & 0 & 0 & 0 \\ 0 & 0 & 0 & 0 & c_{1,4} & c_{1,5} & 0 \\ 0 & 0 & 0 & 0 & 0 & 0 & c_{1,6} \end{bmatrix} = \begin{bmatrix} c_{0,0}e_0^{(3)} & c_{0,1}e_0^{(3)} & c_{0,2}e_1^{(3)} & c_{0,3}e_1^{(3)} & c_{0,4}e_2^{(3)} & c_{0,5}e_2^{(3)} & c_{0,6}e_3^{(4)} \\ c_{1,0}e_0^{(3)} & c_{1,1}e_0^{(3)} & c_{1,2}e_1^{(3)} & c_{1,3}e_1^{(3)} & c_{1,4}e_2^{(3)} & c_{1,5}e_2^{(3)} & c_{1,6}e_3^{(4)} \end{bmatrix}$$

for rank 7 (R=7), and $$W_2 = \begin{bmatrix} c_{0,0} & c_{0,1} & 0 & 0 & 0 & 0 & 0 & 0 \\ 0 & 0 & c_{0,2} & c_{0,3} & 0 & 0 & 0 & 0 \\ 0 & 0 & 0 & 0 & c_{0,4} & c_{0,5} & 0 & 0 \\ 0 & 0 & 0 & 0 & 0 & 0 & c_{0,6} & c_{0,7} \\ c_{1,0} & c_{1,1} & 0 & 0 & 0 & 0 & 0 & 0 \\ 0 & 0 & c_{1,2} & c_{1,3} & 0 & 0 & 0 & 0 \\ 0 & 0 & 0 & 0 & c_{1,4} & c_{1,5} & 0 & 0 \\ 0 & 0 & 0 & 0 & 0 & 0 & c_{1,6} & c_{1,7} \end{bmatrix} =$$

$$\begin{bmatrix} c_{0,0}e_0^{(3)} & c_{0,1}e_0^{(3)} & c_{0,2}e_1^{(3)} & c_{0,3}e_1^{(3)} & c_{0,4}e_2^{(3)} & c_{0,5}e_2^{(3)} & c_{0,6}e_3^{(4)} & c_{0,7}e_3^{(4)} \\ c_{1,0}e_0^{(3)} & c_{1,1}e_0^{(3)} & c_{1,2}e_1^{(3)} & c_{1,3}e_1^{(3)} & c_{1,4}e_2^{(3)} & c_{1,5}e_2^{(3)} & c_{1,6}e_3^{(4)} & c_{1,7}e_3^{(4)} \end{bmatrix}$$

for rank 8 (R=8).

For rank 2-8, $c_{r,l}$ is co-phase coefficients with $c_{0,l}=1$, and $$c_{1,l} = (-1)^{l \bmod 2} e^{j\frac{\pi n}{2}},$$

$n \in \{0,1\}$. The calculation and reporting of n can be subband (which requires 1 bit/subband).

In one embodiment 7B, $W_2$ matrix structure and co-phasing coefficients for rank 3-4 reporting are as follows.
Rank 3:

$$W_2 = \begin{bmatrix} c_{0,0} & 0 & c_{0,2} \\ 0 & c_{0,1} & 0 \\ c_{1,0} & 0 & c_{1,2} \\ 0 & c_{1,1} & 0 \end{bmatrix} = \begin{bmatrix} c_{0,0}e_0^{(2)} & c_{0,1}e_1^{(2)} & c_{0,2}e_0^{(2)} \\ c_{1,0}e_0^{(2)} & c_{1,1}e_1^{(2)} & c_{1,2}e_0^{(2)} \end{bmatrix}.$$

Rank 4:

$$W_2 = \begin{bmatrix} c_{0,0} & 0 & c_{0,2} & 0 \\ 0 & c_{0,1} & 0 & c_{0,3} \\ c_{1,0} & 0 & c_{1,2} & 0 \\ 0 & c_{1,1} & 0 & c_{1,3} \end{bmatrix} = \begin{bmatrix} c_{0,0}e_0^{(2)} & c_{0,1}e_1^{(2)} & c_{0,2}e_0^{(2)} & c_{0,3}e_1^{(2)} \\ c_{1,0}e_0^{(2)} & c_{1,1}e_1^{(2)} & c_{1,2}e_0^{(2)} & c_{1,3}e_1^{(2)} \end{bmatrix}.$$

$c_{0,l}=1$, $c_{1,l} = (-1)^{\lfloor l/2 \rfloor} e^{j\frac{\pi n}{2}}$, $n \in \{0,1\}$. The calculation and reporting of n can be subband (which requires 1 bit/subband).

In one embodiment 7C, for rank 5-8 CSI reporting, n=0 is fixed, and hence there is no need to report any SB co-phase coefficients.

In one embodiment 7D, $W_2$ matrix structure and co-phasing coefficients for rank 5-8 reporting are as follows. For Rank 5 and 6, $c_{0,l}=1$, $c_{1,1}=-c_{1,0}$, $c_{1,3}=-c_{1,2}$, $c_{1,5}=-c_{1,4}$. For rank 5: $c_{1,0} \in \{1,j\}$ and $c_{1,2}=c_{1,4}=1$. The calculation and reporting of $c_{1,0}$ can be subband (which requires 1 bit/subband). For rank 6: $c_{1,0}=c_{1,2} \in \{1,j\}$ and $c_{1,4}=1$. The calculation and reporting of $c_{1,0}$ can be subband (which requires 1 bit/subband).

For Rank $$W_2 = \begin{bmatrix} c_{0,0} & c_{0,1} & 0 & 0 & 0 & 0 & 0 \\ 0 & 0 & c_{0,2} & 0 & 0 & 0 & 0 \\ 0 & 0 & 0 & c_{0,3} & c_{0,4} & 0 & 0 \\ 0 & 0 & 0 & 0 & 0 & c_{0,5} & c_{0,6} \\ c_{1,0} & c_{1,1} & 0 & 0 & 0 & 0 & 0 \\ 0 & 0 & c_{1,2} & 0 & 0 & 0 & 0 \\ 0 & 0 & 0 & c_{1,3} & c_{1,4} & 0 & 0 \\ 0 & 0 & 0 & 0 & 0 & c_{1,5} & c_{1,6} \end{bmatrix} =$$

$$\begin{bmatrix} c_{0,0}e_0^{(4)} & c_{0,1}e_0^{(4)} & c_{0,2}e_1^{(4)} & c_{0,3}e_2^{(4)} & c_{0,4}e_2^{(4)} & c_{0,5}e_3^{(4)} & c_{0,6}e_3^{(4)} \\ c_{1,0}e_0^{(4)} & c_{1,1}e_0^{(4)} & c_{1,2}e_1^{(4)} & c_{1,3}e_2^{(4)} & c_{1,4}e_2^{(4)} & c_{1,5}e_3^{(4)} & c_{1,6}e_3^{(4)} \end{bmatrix} \cdot c_{0,l} =$$

1, $c_{1,1} = -c_{1,0}$, $c_{1,4} = -c_{1,3}$, $c_{1,6} = -c_{1,5}$; $c_{1,0} = c_{1,2} \in \{1, j\}$ and $c_{1,3} = c_{1,5} = 1$. The calculation and reporting of $c_{1,0}$ can be subband (which requires 1 bit/subband).

For Rank 8, $c_{0,l} = 1$, $c_{1,1} = -c_{1,0}$, $c_{1,3} = -c_{1,2}$, $c_{1,5} = -c_{1,4}$, $c_{1,7} = -c_{1,6}$; $c_{1,0} = c_{1,2} \in \{1, j\}$ and $c_{1,4} = c_{1,6} = 1$. The calculation and reporting of $c_{1,0}$ can be subband (which requires 1 bit/subband).

In one embodiment 8, a UE is configured with a dual-stage $W = W_1 W_2$ codebook for rank R (e.g. R=1-8) CSI reporting in which the $W_1$ codebook is a port selection codebook, i.e., $$W_1 = \begin{bmatrix} E_{\frac{X}{2} \times L} & 0 \\ 0 & E_{\frac{X}{2} \times L} \end{bmatrix}.$$

In particular, the port selection matrix $$E_{\frac{X}{2} \times L}$$

is reported in a WB manner and the port selection matrix is the same for all ranks (i.e., rank-independent). The UE is configured (e.g. via RRC signaling) with the value of the number of ports (L) that can be selected per polarization. The UE selects L ports per polarization to report rank R CSI.

The rank-R dual-stage precoding matrix structure is then as follows. $W = W_1 W_2$, each column of W is normalized to $$\frac{1}{\sqrt{2R}} \cdot W_1 = \begin{bmatrix} E_{\frac{X}{2} \times L} & 0 \\ 0 & E_{\frac{X}{2} \times L} \end{bmatrix},$$

where L≥1 for rank 1-2, L≥2 for rank 3-4, L≥3 for rank 5-6, and L≥4 for rank 7-8.

$$W_2 = W_{2,1} W_{2,2} = \begin{bmatrix} E_{L \times R} & 0 \\ 0 & E_{L \times R} \end{bmatrix} W_{2,2},$$

where $E_{L \times R} = [e_{i_0}^{(L)}, e_{i_1}^{(L)}, \ldots, e_{i_{R-1}}^{(L)}]$ is the (SB) port selection matrix whose l-th column, where l belongs to $\{0, 1, \ldots, R-1\}$, corresponds to the port selected out of the L ports in the (WB) port selection matrix $$E_{\frac{X}{2} \times L},$$

and $$W_{2,2} = \begin{bmatrix} c_{0,0} & 0 & & 0 \\ 0 & c_{0,0} & \cdots & 0 \\ \vdots & \vdots & & \vdots \\ 0 & 0 & & c_{0,R-1} \\ c_{1,0} & 0 & & 0 \\ 0 & c_{1,1} & \cdots & 0 \\ \vdots & \vdots & & \vdots \\ 0 & 0 & & c_{1,R-1} \end{bmatrix}$$

is 2R×R cophasing matrix where $c_{0,l} = 1$ and $c_{1,l}$ is selected from QPSK alphabet $\{1, j, -1, -j\}$ for all l in $\{0, 1, \ldots, R-1\}$.

In one embodiment 8A, $W_2$ matrix structure and cophasing coefficients reporting are as follows. For rank 1 (R=1), $$W_{2,1} = \begin{bmatrix} e_{i_0}^{(L)} & 0 \\ 0 & e_{i_0}^{(L)} \end{bmatrix} \text{ and } W_{2,2} = \begin{bmatrix} c_{0,0} \\ c_{1,0} \end{bmatrix},$$

which implies that $$W_2 = \begin{bmatrix} c_{0,0} e_{i_0}^{(L)} \\ c_{1,0} e_{i_0}^{(L)} \end{bmatrix}.$$

$e_{i_0}^{(L)}$ is such that $i_0 \in \{0, 1, \ldots, L-1\}$. For L>1, the calculation and reporting of $i_0$ can be subband (which requires $\lceil \log_2 L \rceil$ bits/subband). $c_{r,0}$ is co-phasing coefficient (between two polarizations) with $c_{0,0} = 1$ and $c_{1,0} \in \{1, j, -1, -j\}$. The calculation and reporting of $c_{1,0}$ can be subband (which requires 2 bits/subband).

For rank 2 (R=2), $$W_{21} = \begin{bmatrix} e_{i_0}^{(L)}, e_{i_1}^{(L)} & 0 \\ 0 & e_{i_0}^{(L)}, e_{i_1}^{(L)} \end{bmatrix} \text{ and } W_{2,2} = \begin{bmatrix} c_{0,0} & 0 \\ 0 & c_{0,1} \\ c_{1,0} & 0 \\ 0 & c_{1,1} \end{bmatrix},$$

which implies that $$W_2 = \begin{bmatrix} c_{0,0} e_{i_0}^{(L)} & c_{0,1} e_{i_1}^{(L)} \\ c_{1,0} e_{i_0}^{(L)} & c_{1,1} e_{i_1}^{(L)} \end{bmatrix}.$$

$e_{i_0}^{(L)}$ and $e_{i_1}^{(L)}$ are such $(i_0, i_1)$ is according to at least one of the following alternatives. In one example of Alt 8A-0, the SB port selection corresponds to an extension of the port selection in LTE Class B, K=1 codebook. In such example, L=1: $(i_0, i_1)$ belongs to $\{(0, 0)\}$; hence there is no SB port selection necessary. L=2: $(i_0, i_1)$ belongs to $\{(0, 0), (1, 1), (0, 1), (1, 0)\}$. L=3: $(i_0, i_1)$ belongs to $\{(0, 0), (1, 1), (2, 2), (0, 1), (1, 0), (1, 2), (2, 1), (0, 2)\}$. L=4: $(i_0, i_1)$ belongs to $\{(0, 0), (1, 1), (2, 2), (3, 3), (0, 1), (1, 2), (0, 3), (1, 3)\}$.

In one example of Alt 8A-1, the SB port selection corresponds to a subset of the port selection in LTE Class B, K=1 codebook. In such example, L=1: $(i_0, i_1)$ belongs to $\{(0, 0)\}$; hence there is no SB port selection necessary. L=2: $(i_0, i_1)$ belongs to $\{(0, 0), (1, 1)\}$. L=3: $(i_0, i_1)$ belongs to $\{(0, 0), (1, 1), (2, 2)\}$. L=4: $(i_0, i_1)$ belongs to $\{(0, 0), (1, 1), (2, 2), (3, 3)\}$.

For L>1, the calculation and reporting of $(i_0, i_1)$ can be subband (which requires 2 (if L=2) or 3 (if L=3 or 4) bits/subband for Alt 8A-0 and $\lceil \log_2(L) \rceil$ bits/subband for Alt 8A-1). $c_{r,l}$ is co-phase coefficients with $c_{0,l}=1$, $c_{1,0}=-c_{1,1}$, and $c_{1,0} \in \{1, j\}$. The calculation and reporting of $c_{1,0}$ can be subband (which requires 1 bit/subband).

For rank 3 (R=3), $$W_{2,1} = \begin{bmatrix} e_{i_0}^{(L)}, e_{i_1}^{(L)}, e_{i_2}^{(L)} & 0 \\ 0 & e_{i_0}^{(L)}, e_{i_1}^{(L)}, e_{i_2}^{(L)} \end{bmatrix} \text{ and } W_{2,2} = \begin{bmatrix} \text{diag}(c_{0,0}, c_{0,1}, c_{0,2}) \\ \text{diag}(c_{1,0}, c_{1,1}, c_{1,2}) \end{bmatrix},$$

where $\text{diag}(c_{0,0}, c_{0,1}, c_{0,2})$ is a digonal matrix with diagonal elements $c_{0,0}$, $c_{0,1}$, and $c_{0,2}$, which implies that $$W_2 = \begin{bmatrix} c_{0,0} e_{i_0}^{(L)} & c_{0,1} e_{i_1}^{(L)} & c_{0,2} e_{i_2}^{(L)} \\ c_{1,0} e_{i_0}^{(L)} & c_{1,1} e_{i_1}^{(L)} & c_{1,2} e_{i_2}^{(L)} \end{bmatrix}.$$

$e_{i_0}^{(L)}$, $e_{i_1}^{(L)}$, and $e_{i_2}^{(L)}$ are such $(i_0, i_1, i_2)$ is according to at least one of the following alternatives. In one example of Alt 8A-2, L=1: rank 3 CSI cannot be reported, L=2: $(i_0, i_1, i_2)$ belongs to $\{(0, 0, 1), (1, 0, 1), (0, 1, 1), (1, 0, 0)\}$, L=3: $(i_0, i_1, i_2)$ belongs to $\{(0, 0, 1), (1, 0, 1), (0, 1, 1), (1, 0, 0), (1, 1, 2), (2, 1, 2), (1, 2, 2), (2, 1, 1), (2, 2, 0), (0, 2, 0), (2, 0, 0), (0, 2, 2)\}$, and L=4: $(i_0, i_1, i_2)$ belongs to $\{(0, 0, 1), (1, 0, 1), (0, 1, 1), (1, 0, 0), (1, 1, 2), (2, 1, 2), (1, 2, 2), (2, 1, 1), (2, 2, 3), (3, 2, 3), (2, 3, 3), (3, 2, 2), (3, 3, 0), (0, 3, 0), (3, 0, 0), (0, 3, 3)\}$.

In one example of Alt 8A-3, L=1: rank 3 CSI cannot be reported, L=2: $(i_0, i_1, i_2)$ belongs to $\{(0, 0, 1)\}$, L=3: $(i_0, i_1, i_2)$ belongs to $\{(0, 0, 1), (1, 1, 2), (2, 2, 0)\}$, and L=4: $(i_0, i_1, i_2)$ belongs to $\{(0, 0, 1), (1, 1, 2), (2, 2, 3), (3, 3, 0)\}$.

For L>1, the calculation and reporting of $(i_0, i_1, i_2)$ can be subband. $c_{r,l}$ is co-phase coefficients with $c_{0,l}=1$, and $$c_{1,l} = (-1)^{l \bmod 2} e^{j\frac{\pi n}{2}},$$

$n \in \{0, 1\}$. The calculation and reporting of n can be subband (which requires 1 bit/subband).

For rank 4 (R=4), $$W_{2,1} = \begin{bmatrix} e_{i_0}^{(L)}, e_{i_1}^{(L)}, e_{i_2}^{(L)}, e_{i_3}^{(L)} & 0 \\ 0 & e_{i_0}^{(L)}, e_{i_1}^{(L)}, e_{i_2}^{(L)}, e_{i_3}^{(L)} \end{bmatrix}$$

and $W_{2,2} = \begin{bmatrix} \text{diag}(c_{0,0}, c_{0,1}, c_{0,2}, c_{0,3}) \\ \text{diag}(c_{1,0}, c_{1,1}, c_{1,2}, c_{1,3}) \end{bmatrix}$, which implies that $$W_2 = \begin{bmatrix} c_{0,0} e_{i_0}^{(L)} & c_{0,1} e_{i_1}^{(L)} & c_{0,2} e_{i_2}^{(L)} & c_{0,3} e_{i_3}^{(L)} \\ c_{1,0} e_{i_0}^{(L)} & c_{1,1} e_{i_1}^{(L)} & c_{1,2} e_{i_2}^{(L)} & c_{1,3} e_{i_3}^{(L)} \end{bmatrix}.$$

$e_{i_0}^{(L)}$, $e_{i_1}^{(L)}$, $e_{i_2}^{(L)}$, and $e_{i_3}^{(L)}$ are such $(i_0, i_1, i_2, i_3)$ is according to at least one of the following alternatives. In one example of Alt 8A-4, L=1: rank 4 CSI cannot be reported, L=2: $(i_0, i_1, i_2, i_3)$ belongs to $\{(0, 0, 1, 1)\}$, L=3: $(i_0, i_1, i_2, i_3)$ belongs to $\{(0, 0, 1, 1), (1, 1, 2, 2), (2, 2, 0, 0)\}$, and L=4: $(i_0, i_1, i_2, i_3)$ belongs to $\{(0, 0, 1, 1), (1, 1, 2, 2), (2, 2, 3, 3), (3, 3, 0, 0)\}$.

In one example of Alt 8A-5, L=1: rank 4 CSI cannot be reported, L=2: $(i_0, i_1, i_2, i_3)$ belongs to $\{(0, 0, 1, 1)\}$, L=3: $(i_0, i_1, i_2, i_3)$ belongs to $\{(0, 0, 1, 1), (1, 1, 2, 2), (2, 2, 0, 0)\}$, and L=4: $(i_0, i_1, i_2, i_3)$ belongs to $\{(0, 0, 1, 1), (1, 1, 2, 2), (1, 1, 3, 3), (3, 3, 0, 0)\}$.

For L>1, the calculation and reporting of $(i_0, i_1, i_2, i_3)$ can be subband. $c_{r,l}$ is co-phase coefficients with $c_{0,l}=1$, and $$c_{1,l} = (-1)^{l \bmod 2} e^{j\frac{\pi n}{2}},$$

$n \in \{0, 1\}$. The calculation and reporting of n can be subband (which requires 1 bit/subband).

For rank 5 (R=5), $$W_{2,1} = \begin{bmatrix} e_{i_0}^{(L)}, e_{i_1}^{(L)}, \ldots, e_{i_4}^{(L)} & 0 \\ 0 & e_{i_0}^{(L)}, e_{i_1}^{(L)}, \ldots, e_{i_4}^{(L)} \end{bmatrix} \text{ and}$$

$$W_{2,2} = \begin{bmatrix} \text{diag}(c_{0,0}, c_{0,1}, \ldots, c_{0,4}) \\ \text{diag}(c_{1,0}, c_{1,1}, \ldots, c_{1,4}) \end{bmatrix},$$

which implies that $$W_2 = \begin{bmatrix} c_{0,0} e_{i_0}^{(L)} & c_{0,1} e_{i_1}^{(L)} & \ldots & c_{0,4} e_{i_4}^{(L)} \\ c_{1,0} e_{i_0}^{(L)} & c_{1,1} e_{i_1}^{(L)} & \ldots & c_{1,4} e_{i_4}^{(L)} \end{bmatrix}.$$

$e_{i_0}^{(L)}$, $e_{i_1}^{(L)}$, $\ldots$, $e_{i_4}^{(L)}$ are such $(i_0, i_1, \ldots, i_4)$ is according to at least one of the following alternatives.

In one example of Alt 8A-6, L=1-2: rank 5 CSI cannot be reported, L=3: $(i_0, i_1, \ldots, i_4)$ belongs to $\{(0, 0, 1, 1, 2), (1, 1, 2, 2, 0), (2, 2, 0, 0, 1)\}$, and L=4: $(i_0, i_1, \ldots, i_4)$ belongs to $\{(0, 0, 1, 1, 2), (1, 1, 2, 2, 3), (2, 2, 3, 3, 0), (3, 3, 0, 0, 1)\}$.

In one example of Alt 8A-7, L=1-2: rank 5 CSI cannot be reported, L=3: $(i_0, i_1, \ldots, i_4)$ belongs to $\{(0, 0, 1, 1, 2), (1, 1, 2, 2, 0)\}$, and L=4: $(i_0, i_1, \ldots, i_4)$ belongs to $\{(0, 0, 1, 1, 2), (1, 1, 2, 2, 3)\}$.

In one example of Alt 8A-8, L=1-2: rank 5 CSI cannot be reported, L=3: $(i_0, i_1, \ldots, i_4)$ belongs to $\{(0, 0, 1, 1, 2)\}$, and L=4: $(i_0, i_1, \ldots, i_4)$ belongs to $\{(0, 0, 1, 1, 2), (1, 1, 2, 2, 3)\}$.

For L>2, the calculation and reporting of $(i_0, i_1, \ldots, i_4)$ can be subband. $c_{r,l}$ is co-phase coefficients with $c_{0,l}=1$, and $$c_{1,l} = (-1)^{l \bmod 2} e^{j\frac{\pi n}{2}},$$

$n \in \{0,1\}$. The calculation and reporting of n can be subband (which requires 1 bit/subband).

For rank 6 (R=6), $$W_{2,1} = \begin{bmatrix} e_{i_0}^{(L)}, e_{i_1}^{(L)}, \ldots, e_{i_5}^{(L)} & 0 \\ 0 & e_{i_0}^{(L)}, e_{i_1}^{(L)}, \ldots, e_{i_5}^{(L)} \end{bmatrix} \text{ and }$$

$$W_{2,2} = \begin{bmatrix} \text{diag}(c_{0,0}, c_{0,1}, \ldots, c_{0,5}) \\ \text{diag}(c_{1,0}, c_{1,1}, \ldots, c_{1,5}) \end{bmatrix},$$

which implies that $$W_2 = \begin{bmatrix} c_{0,0}e_{i_0}^{(L)} & c_{0,1}e_{i_1}^{(L)} & \ldots & c_{0,4}e_{i_5}^{(L)} \\ c_{1,0}e_{i_0}^{(L)} & c_{1,1}e_{i_1}^{(L)} & \ldots & c_{1,4}e_{i_5}^{(L)} \end{bmatrix}.$$

$e_{i_0}^{(L)}, e_{i_1}^{(L)}, \ldots, e_{i_5}^{(L)}$ are such $(i_0, i_1, \ldots, i_5)$ is according to at least one of the following alternatives.

In one example of Alt 8A-9, L=1-2: rank 6 CSI cannot be reported, L=3: $(i_0, i_1, \ldots, i_5)$ belongs to $\{(0, 0, 1, 1, 2, 2), (1, 1, 2, 2, 0, 0), (2, 2, 0, 0, 1, 1)\}$, and L=4: $(i_0, i_1, \ldots, i_5)$ belongs to $\{(0,0, 1, 1, 2, 2), (1, 1, 2, 2, 3, 3), (2, 2, 3, 3, 0, 0), (3, 3, 0, 0, 1, 1)\}$.

In one example of Alt 8A-10, L=1-2: rank 6 CSI cannot be reported, L=3: $(i_0, i_1, \ldots, i_5)$ belongs to $\{(0, 0, 1, 1, 2, 2), (1, 1, 2, 2, 0, 0)\}$, and L=4: $(i_0, i_1, \ldots, i_5)$ belongs to $\{(0, 0, 1, 1, 2, 2), (1, 1, 2, 2, 3, 3)\}$.

In one example of Alt 8A-11, L=1-2: rank 6 CSI cannot be reported, L=3: $(i_0, i_1, \ldots, i_5)$ belongs to $\{(0, 0, 1, 1, 2, 2)\}$, and L=4: $(i_0, i_1, \ldots, i_5)$ belongs to $\{(0, 0, 1, 1, 2, 2), (1, 1, 2, 2, 3, 3)\}$.

For L>2, the calculation and reporting of $(i_0, i_1, \ldots, i_5)$ can be subband. $c_{r,l}$ is co-phase coefficients with $c_{0,l}=1$, and $$c_{1,l} = (-1)^{l \mod 2} e^{j\frac{\pi n}{2}},$$

$n \in \{0,1\}$. The calculation and reporting of n can be subband (which requires 1 bit/subband).

For rank 7 (R=7), $$W_{2,1} = \begin{bmatrix} e_{i_0}^{(L)}, e_{i_1}^{(L)}, \ldots, e_{i_6}^{(L)} & 0 \\ 0 & e_{i_0}^{(L)}, e_{i_1}^{(L)}, \ldots, e_{i_6}^{(L)} \end{bmatrix} \text{ and }$$

$$W_{2,2} = \begin{bmatrix} \text{diag}(c_{0,0}, c_{0,1}, \ldots, c_{0,6}) \\ \text{diag}(c_{1,0}, c_{1,1}, \ldots, c_{1,6}) \end{bmatrix},$$

which implies that $$W_2 = \begin{bmatrix} c_{0,0}e_{i_0}^{(L)} & c_{0,1}e_{i_1}^{(L)} & \ldots & c_{0,4}e_{i_6}^{(L)} \\ c_{1,0}e_{i_0}^{(L)} & c_{1,1}e_{i_1}^{(L)} & \ldots & c_{1,4}e_{i_6}^{(L)} \end{bmatrix}.$$

$e_{i_0}^{(L)}, e_{i_1}^{(L)}, \ldots, e_{i_6}^{(L)}$ are such $(i_0, i_1, \ldots, i_6)$ is according to at least one of the following alternatives. In one example of Alt 8A-12, L=1-3: rank 7 CSI cannot be reported and L=4: $(i_0, i_1, \ldots, i_6)$ belongs to $\{(0, 0, 1, 1, 2, 2, 3), (1, 1, 2, 2, 3, 3, 0), (2, 2, 3, 3, 0, 0, 1), (3, 3, 0, 0, 1, 1, 2)\}$.

In one example of Alt 8A-13, L=1-3: rank 7 CSI cannot be reported and L=4: $(i_0, i_1, \ldots, i_6)$ belongs to $\{(0, 0, 1, 1, 2, 2, 3), (1, 1, 2, 2, 3, 3, 0)\}$.

In one example of Alt 8A-14, L=1-3: rank 7 CSI cannot be reported and L=4: $(i_0, i_1, \ldots, i_6)$ belongs to $\{(0, 0, 1, 1, 2, 2, 3)\}$.

For L>3, the calculation and reporting of $(i_0, i_1, \ldots, i_6)$ can be subband. $c_{r,l}$ is co-phase coefficients with $c_{0,l}=1$, and $$c_{1,l} = (-1)^{l \mod 2} e^{j\frac{\pi n}{2}},$$

$n \in \{0,1\}$. The calculation and reporting of n can be subband (which requires 1 bit/subband).

For rank 8 (R=8), $$W_{2,1} = \begin{bmatrix} e_{i_0}^{(L)}, e_{i_1}^{(L)}, \ldots, e_{i_7}^{(L)} & 0 \\ 0 & e_{i_0}^{(L)}, e_{i_1}^{(L)}, \ldots, e_{i_7}^{(L)} \end{bmatrix} \text{ and }$$

$$W_{2,2} = \begin{bmatrix} \text{diag}(c_{0,0}, c_{0,1}, \ldots, c_{0,7}) \\ \text{diag}(c_{1,0}, c_{1,1}, \ldots, c_{1,7}) \end{bmatrix},$$

which implies that $$W_2 = \begin{bmatrix} c_{0,0}e_{i_0}^{(L)} & c_{0,1}e_{i_1}^{(L)} & \ldots & c_{0,4}e_{i_7}^{(L)} \\ c_{1,0}e_{i_0}^{(L)} & c_{1,1}e_{i_1}^{(L)} & \ldots & c_{1,4}e_{i_7}^{(L)} \end{bmatrix}.$$

$e_{i_0}^{(L)}, e_{i_1}^{(L)}, \ldots, e_{i_7}^{(L)}$ are such $(i_0, i_1, \ldots, i_7)$ is according to at least one of the following alternatives. In one example, L=1-3: rank 8 CSI cannot be reported and L=4: $(i_0, i_1, \ldots, i_7)$ belongs to $\{(0, 0, 1, 1, 2, 2, 3, 3)\}$. $c_{r,l}$ is co-phase coefficients with $c_{0,l}=1$, and $$c_{1,l} = (-1)^{l \mod 2} e^{j\frac{\pi n}{2}},$$

$n \in \{0,1\}$. The calculation and reporting of n can be subband (which requires 1 bit/subband).

In one embodiment 8B, SB port selection matrix structure and co-phasing coefficients for rank 3-4 reporting (in the aforementioned embodiment 8) are as follows. For rank 3, $e_{i_0}^{(L)}$, $e_{i_1}^{(L)}$, and $e_{i_2}^{(L)}$ are such $(i_0, i_1, i_2)$ is according to at least one of the following alternatives.

In one example of Alt 8B-2, L=1: rank 3 CSI cannot be reported, L=2: $(i_0, i_1, i_2)$ belongs to $\{(0, 1, 0), (1, 1, 0), (0, 1, 1), (1, 0, 0)\}$, L=3: $(i_0, i_1, i_2)$ belongs to $\{(0, 1, 0), (1, 1, 0), (0, 1, 1), (1, 0, 0), (1, 2, 1), (2, 2, 1), (1, 2, 2), (2, 1, 1), (2, 0, 2), (0, 0, 2), (2, 0, 0), (0, 2, 2)\}$, and L=4: $(i_0, i_1, i_2)$ belongs to $\{(0, 1, 0), (1, 1, 0), (0, 1, 1), (1, 0, 0), (1, 2, 1), (2, 2, 1), (1, 2, 2), (2, 1, 1), (2, 3, 2), (3, 3, 2), (2, 3, 3), (3, 2, 2), (3, 0, 3), (0, 0, 3), (3, 0, 0), (0, 3, 3)\}$.

In one example of Alt 8B-3, L=1: rank 3 CSI cannot be reported, L=2: $(i_0, i_1, i_2)$ belongs to $\{(0, 1, 0)\}$, L=3: $(i_0, i_1, i_2)$ belongs to $\{(0, 1, 0), (1, 2, 1), (2, 0, 2)\}$, and L=4: $(i_0, i_1, i_2)$ belongs to $\{(0, 1, 0), (1, 2, 0), (2, 3, 2), (3, 0, 3)\}$.

For rank 4, $e_{i_0}^{(L)}$, $e_{i_1}^{(L)}$, $e_{i_2}^{(L)}$, and $e_{i_3}^{(L)}$ are such $(i_0, i_1, i_2, i_3)$ is according to at least one of the following alternatives. In one example of Alt 8B-4: L=1: rank 4 CSI cannot be reported, L=2: $(i_0, i_1, i_2, i_3)$ belongs to $\{(0, 1, 0, 1)\}$, L=3: $(i_0, i_1, i_2, i_3)$ belongs to $\{(0, 1, 0, 1), (1, 2, 1, 2), (2, 0, 2, 0)\}$, and L=4: $(i_0, i_1, i_2, i_3)$ belongs to $\{(0, 1, 0, 1), (1, 2, 1, 2), (2, 3, 2, 3), (3, 0, 3, 0)\}$.

In one example of Alt 8B-5, L=1: rank 4 CSI cannot be reported, L=2: $(i_0, i_1, i_2, i_3)$ belongs to $\{(0, 1, 0, 1)\}$, L=3:

$(i_0, i_1, i_2, i_3)$ belongs to $\{(0, 1, 0, 1), (1, 2, 1, 2), (2, 0, 2, 0)\}$, L=4: $(i_0, i_1, i_2, i_3)$ belongs to $\{(0, 1, 0, 1), (1, 2, 1, 2), (1, 3, 1, 3), (3, 0, 3, 0)\}$. For L>1, the calculation and reporting of $(i_0, i_1, i_2, i_3)$ can be subband. $c_{0,l}=1$, $$c_{1,l} = (-1)^{\lfloor l/2 \rfloor} e^{j\frac{\pi n}{2}},$$

$n \in \{0,1\}$. The calculation and reporting of n can be subband (which requires 1 bit/subband).

In one embodiment 8C, for rank 5-8 CSI reporting (in the aforementioned embodiment 3), n=0 is fixed, and hence there is no need to report any SB co-phase coefficients.

In one embodiment 8D, SB port selection matrix structure and co-phasing coefficients for rank 5-8 reporting (in the aforementioned embodiment 8) are as follows.

For Rank 5 and 6, $c_{0,l}=1$, $c_{1,1}=-c_{1,0}$, $c_{1,3}=-c_{1,2}$, $c_{1,5}=-c_{1,4}$.

For rank 5: $c_{1,0} \in \{1,j\}$ and $c_{1,2}=c_{1,4}=1$. The calculation and reporting of $c_{1,0}$ can be subband (which requires 1 bit/subband).

For rank 6: $c_{1,0}=c_{1,2} \in \{1,j\}$ and $c_{1,4}=1$. The calculation and reporting of $c_{1,0}$ can be subband (which requires 1 bit/subband).

For Rank 7, $e_{i_0}^{(L)}, e_{i_1}^{(L)}, \ldots, e_{i_6}^{(L)}$ are such $(i_0, i_1, \ldots, i_6)$ is according to at least following alternatives. In one example of Alt 8C-12, L=1-3: rank 7 CSI cannot be reported and L=4: $(i_0, i_1, \ldots, i_6)$ belongs to $\{(0, 0, 1, 2, 2, 3, 3), (1, 1, 2, 3, 3, 0, 0), (2, 2, 3, 0, 0, 1, 1), (3, 3, 0, 1, 1, 2, 2)\}$.

In one example of Alt 8C-13, L=1-3: rank 7 CSI cannot be reported and L=4: $(i_0, i_1, \ldots, i_6)$ belongs to $\{(0, 0, 1, 2, 2, 3, 3), (1, 1, 2, 3, 3, 0, 0)\}$.

In one example of Alt 8C-14, L=1-3: rank 7 CSI cannot be reported and L=4: $(i_0, i_1, \ldots, i_6)$ belongs to $\{(0, 0, 1, 2, 2, 3, 3)\}$. $c_{0,l}=1$, $c_{1,1}=-c_{1,0}$, $c_{1,4}=-c_{1,3}$, $c_{1,6}=-c_{1,5}$; $c_{1,0}=c_{1,2} \in \{1,j\}$ and $c_{1,3}=c_{1,5}=1$. The calculation and reporting of $c_{1,0}$ can be subband (which requires 1 bit/subband).

For Rank 8, $c_{0,l}=1$, $c_{1,1}=-c_{1,0}$, $c_{1,3}=-c_{1,2}$, $c_{1,5}=-c_{1,4}$, $c_{1,7}=-c_{1,6}$; $c_{1,0}=c_{1,2} \in \{1,j\}$ and $c_{1,4}=c_{1,6}=1$. The calculation and reporting of $c_{1,0}$ can be subband (which requires 1 bit/subband).

In one embodiment 8E, the $W_2$ codebook for L=1, 2, and 4 corresponds to LTE Class B, K=1 codebooks that are given in TABLE 21 and 22, and TABLE 24, respectively. For L=3, the $W_2$ codebook is given in TABLE 23.

TABLE 21

W2 Codebook for -layer CSI reporting for L = 1

| Codebook index, n | Number of layers υ | |
|---|---|---|
| | 1 | 2 |
| 0 | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ j & -j \end{bmatrix}$ |
| 2 | $\frac{1}{\sqrt{2}}\begin{bmatrix} 1 \\ j \end{bmatrix}$ | — |
| 3 | $\frac{1}{\sqrt{2}}\begin{bmatrix} 1 \\ -j \end{bmatrix}$ | — |

TABLE 22

W2 Codebook for -layer CSI reporting for L = 2

| Codebook index, n | Number of layers υ | |
|---|---|---|
| | 1 | 2 |
| 0 | $\frac{1}{\sqrt{2}}\begin{bmatrix} e_0^{(2)} \\ e_0^{(2)} \end{bmatrix}$ | $\frac{1}{2}\begin{bmatrix} e_0^{(2)} & e_0^{(2)} \\ e_0^{(2)} & -e_0^{(2)} \end{bmatrix}$ |
| 1 | $\frac{1}{\sqrt{2}}\begin{bmatrix} e_0^{(2)} \\ -e_0^{(2)} \end{bmatrix}$ | $\frac{1}{2}\begin{bmatrix} e_0^{(2)} & e_0^{(2)} \\ je_0^{(2)} & -je_0^{(2)} \end{bmatrix}$ |
| 2 | $\frac{1}{\sqrt{2}}\begin{bmatrix} e_0^{(2)} \\ j \cdot e_0^{(2)} \end{bmatrix}$ | $\frac{1}{2}\begin{bmatrix} e_1^{(2)} & e_1^{(2)} \\ e_1^{(2)} & -e_1^{(2)} \end{bmatrix}$ |
| 3 | $\frac{1}{\sqrt{2}}\begin{bmatrix} e_0^{(2)} \\ -j \cdot e_0^{(2)} \end{bmatrix}$ | $\frac{1}{2}\begin{bmatrix} e_1^{(2)} & e_1^{(2)} \\ je_1^{(2)} & -je_1^{(2)} \end{bmatrix}$ |
| 4 | $\frac{1}{\sqrt{2}}\begin{bmatrix} e_1^{(2)} \\ e_1^{(2)} \end{bmatrix}$ | $\frac{1}{2}\begin{bmatrix} e_0^{(2)} & e_1^{(2)} \\ e_0^{(2)} & -e_1^{(2)} \end{bmatrix}$ |
| 5 | $\frac{1}{\sqrt{2}}\begin{bmatrix} e_1^{(2)} \\ -e_1^{(2)} \end{bmatrix}$ | $\frac{1}{2}\begin{bmatrix} e_0^{(2)} & e_1^{(2)} \\ je_0^{(2)} & -je_1^{(2)} \end{bmatrix}$ |
| 6 | $\frac{1}{\sqrt{2}}\begin{bmatrix} e_1^{(2)} \\ j \cdot e_1^{(2)} \end{bmatrix}$ | $\frac{1}{2}\begin{bmatrix} e_1^{(2)} & e_0^{(2)} \\ e_1^{(2)} & -e_0^{(2)} \end{bmatrix}$ |
| 7 | $\frac{1}{\sqrt{2}}\begin{bmatrix} e_1^{(2)} \\ -j \cdot e_1^{(2)} \end{bmatrix}$ | $\frac{1}{2}\begin{bmatrix} e_1^{(2)} & e_0^{(2)} \\ je_1^{(2)} & -je_0^{(2)} \end{bmatrix}$ |

| Codebook index, n | Number of layers υ | |
|---|---|---|
| | 3 | 4 |
| 0 | $\frac{1}{\sqrt{6}}\begin{bmatrix} e_0^{(2)} & e_0^{(2)} & e_1^{(2)} \\ e_0^{(2)} & -e_0^{(2)} & -e_1^{(2)} \end{bmatrix}$ | $\frac{1}{2\sqrt{2}}\begin{bmatrix} e_0^{(2)} & e_1^{(2)} & e_0^{(2)} & e_1^{(2)} \\ e_0^{(2)} & e_1^{(2)} & -e_0^{(2)} & -e_1^{(2)} \end{bmatrix}$ |
| 1 | $\frac{1}{\sqrt{6}}\begin{bmatrix} e_1^{(2)} & e_0^{(2)} & e_1^{(2)} \\ e_1^{(2)} & -e_0^{(2)} & -e_1^{(2)} \end{bmatrix}$ | $\frac{1}{2\sqrt{2}}\begin{bmatrix} e_0^{(2)} & e_1^{(2)} & e_0^{(2)} & e_1^{(2)} \\ je_0^{(2)} & je_1^{(2)} & -je_0^{(2)} & -je_1^{(2)} \end{bmatrix}$ |
| 2 | $\frac{1}{\sqrt{6}}\begin{bmatrix} e_0^{(2)} & e_1^{(2)} & e_1^{(2)} \\ e_0^{(2)} & e_1^{(2)} & -e_1^{(2)} \end{bmatrix}$ | — |
| 3 | $\frac{1}{\sqrt{6}}\begin{bmatrix} e_1^{(2)} & e_0^{(2)} & e_0^{(2)} \\ e_1^{(2)} & e_0^{(2)} & -e_0^{(2)} \end{bmatrix}$ | — |
| 4 | — | — |
| 5 | — | — |
| 6 | — | — |
| 7 | — | — |

TABLE 23

| | W2 Codebook for υ-layer CSI reporting for L = 3 | |
|---|---|---|
| Codebook index, n | Number of layers υ | |
| | 1 | 2 |
| 0 | $\frac{1}{\sqrt{2}}\begin{bmatrix} e_0^{(3)} \\ e_0^{(3)} \end{bmatrix}$ | $\frac{1}{2}\begin{bmatrix} e_0^{(3)} & e_0^{(3)} \\ e_0^{(3)} & -e_0^{(3)} \end{bmatrix}$ |
| 1 | $\frac{1}{\sqrt{2}}\begin{bmatrix} e_0^{(3)} \\ -e_0^{(3)} \end{bmatrix}$ | $\frac{1}{2}\begin{bmatrix} e_0^{(3)} & e_0^{(3)} \\ je_0^{(3)} & -je_0^{(3)} \end{bmatrix}$ |
| 2 | $\frac{1}{\sqrt{2}}\begin{bmatrix} e_0^{(3)} \\ je_0^{(3)} \end{bmatrix}$ | $\frac{1}{2}\begin{bmatrix} e_1^{(3)} & e_1^{(3)} \\ e_1^{(3)} & -e_1^{(3)} \end{bmatrix}$ |
| 3 | $\frac{1}{\sqrt{2}}\begin{bmatrix} e_0^{(3)} \\ -je_0^{(3)} \end{bmatrix}$ | $\frac{1}{2}\begin{bmatrix} e_1^{(3)} & e_1^{(3)} \\ je_1^{(3)} & -je_1^{(3)} \end{bmatrix}$ |
| 4 | $\frac{1}{\sqrt{2}}\begin{bmatrix} e_1^{(3)} \\ e_1^{(3)} \end{bmatrix}$ | $\frac{1}{2}\begin{bmatrix} e_2^{(3)} & e_2^{(3)} \\ e_2^{(3)} & -e_2^{(3)} \end{bmatrix}$ |
| 5 | $\frac{1}{\sqrt{2}}\begin{bmatrix} e_1^{(3)} \\ -e_1^{(3)} \end{bmatrix}$ | $\frac{1}{2}\begin{bmatrix} e_2^{(3)} & e_2^{(3)} \\ je_2^{(3)} & -je_2^{(3)} \end{bmatrix}$ |
| 6 | $\frac{1}{\sqrt{2}}\begin{bmatrix} e_1^{(3)} \\ je_1^{(3)} \end{bmatrix}$ | $\frac{1}{2}\begin{bmatrix} e_0^{(3)} & e_1^{(3)} \\ e_0^{(3)} & -e_1^{(3)} \end{bmatrix}$ |
| 7 | $\frac{1}{\sqrt{2}}\begin{bmatrix} e_1^{(3)} \\ -je_1^{(3)} \end{bmatrix}$ | $\frac{1}{2}\begin{bmatrix} e_0^{(3)} & e_1^{(3)} \\ je_0^{(3)} & -je_1^{(3)} \end{bmatrix}$ |
| 8 | $\frac{1}{\sqrt{2}}\begin{bmatrix} e_2^{(3)} \\ e_2^{(3)} \end{bmatrix}$ | $\frac{1}{2}\begin{bmatrix} e_1^{(3)} & e_2^{(3)} \\ e_1^{(3)} & -e_2^{(3)} \end{bmatrix}$ |
| 9 | $\frac{1}{\sqrt{2}}\begin{bmatrix} e_2^{(3)} \\ -e_2^{(3)} \end{bmatrix}$ | $\frac{1}{2}\begin{bmatrix} e_1^{(3)} & e_2^{(3)} \\ je_1^{(3)} & -je_2^{(3)} \end{bmatrix}$ |
| 10 | $\frac{1}{\sqrt{2}}\begin{bmatrix} e_2^{(3)} \\ je_2^{(3)} \end{bmatrix}$ | $\frac{1}{2}\begin{bmatrix} e_0^{(3)} & e_2^{(3)} \\ e_0^{(3)} & -e_2^{(3)} \end{bmatrix}$ |
| 11 | $\frac{1}{\sqrt{2}}\begin{bmatrix} e_2^{(3)} \\ -je_2^{(3)} \end{bmatrix}$ | $\frac{1}{2}\begin{bmatrix} e_0^{(3)} & e_2^{(3)} \\ je_0^{(3)} & -je_2^{(3)} \end{bmatrix}$ |

| Codebook index, n | Number of layers υ | |
|---|---|---|
| | 3 | 4 |
| 0 | $\frac{1}{\sqrt{6}}\begin{bmatrix} e_0^{(3)} & e_0^{(3)} & e_1^{(3)} \\ e_0^{(3)} & -e_0^{(3)} & e_1^{(3)} \end{bmatrix}$ | $\frac{1}{2\sqrt{2}}\begin{bmatrix} e_0^{(3)} & e_1^{(3)} & e_0^{(3)} & e_1^{(3)} \\ e_0^{(3)} & e_1^{(3)} & -e_0^{(3)} & -e_1^{(3)} \end{bmatrix}$ |
| 1 | $\frac{1}{\sqrt{6}}\begin{bmatrix} e_1^{(3)} & e_0^{(3)} & e_1^{(3)} \\ e_1^{(3)} & -e_0^{(3)} & -e_1^{(3)} \end{bmatrix}$ | $\frac{1}{2\sqrt{2}}\begin{bmatrix} e_0^{(3)} & e_1^{(3)} & e_0^{(3)} & e_1^{(3)} \\ je_0^{(3)} & je_1^{(3)} & -je_0^{(3)} & -je_1^{(3)} \end{bmatrix}$ |
| 2 | $\frac{1}{\sqrt{6}}\begin{bmatrix} e_0^{(3)} & e_1^{(3)} & e_1^{(3)} \\ e_0^{(3)} & e_1^{(3)} & -e_1^{(3)} \end{bmatrix}$ | $\frac{1}{2\sqrt{2}}\begin{bmatrix} e_1^{(3)} & e_2^{(3)} & e_1^{(3)} & e_2^{(3)} \\ e_1^{(3)} & e_2^{(3)} & -e_1^{(3)} & -e_2^{(3)} \end{bmatrix}$ |
| 3 | $\frac{1}{\sqrt{6}}\begin{bmatrix} e_1^{(3)} & e_0^{(3)} & e_0^{(3)} \\ e_1^{(3)} & e_0^{(3)} & -e_0^{(3)} \end{bmatrix}$ | $\frac{1}{2\sqrt{2}}\begin{bmatrix} e_1^{(3)} & e_2^{(3)} & e_1^{(3)} & e_2^{(3)} \\ je_1^{(3)} & je_2^{(3)} & -je_1^{(3)} & -je_2^{(3)} \end{bmatrix}$ |

TABLE 23-continued

W2 Codebook for υ-layer CSI reporting for L = 3

| Codebook index, n | υ = 3 | υ = 4 |
|---|---|---|
| 4 | $\frac{1}{\sqrt{6}}\begin{bmatrix} e_1^{(3)} & e_1^{(3)} & e_2^{(3)} \\ e_1^{(3)} & -e_1^{(3)} & -e_2^{(3)} \end{bmatrix}$ | $\frac{1}{2\sqrt{2}}\begin{bmatrix} e_2^{(3)} & e_0^{(3)} & e_2^{(3)} & e_0^{(3)} \\ e_2^{(3)} & e_0^{(3)} & -e_2^{(3)} & -e_0^{(3)} \end{bmatrix}$ |
| 5 | $\frac{1}{\sqrt{6}}\begin{bmatrix} e_2^{(3)} & e_1^{(3)} & e_2^{(3)} \\ e_2^{(3)} & -e_1^{(3)} & -e_2^{(3)} \end{bmatrix}$ | $\frac{1}{2\sqrt{2}}\begin{bmatrix} e_2^{(3)} & e_0^{(3)} & e_2^{(3)} & e_0^{(3)} \\ je_2^{(3)} & je_0^{(3)} & -je_2^{(3)} & -je_0^{(3)} \end{bmatrix}$ |
| 6 | $\frac{1}{\sqrt{6}}\begin{bmatrix} e_1^{(3)} & e_2^{(3)} & e_2^{(3)} \\ e_1^{(3)} & e_2^{(3)} & -e_2^{(3)} \end{bmatrix}$ | — |
| 7 | $\frac{1}{\sqrt{6}}\begin{bmatrix} e_2^{(3)} & e_1^{(3)} & e_1^{(3)} \\ e_2^{(3)} & e_1^{(3)} & -e_1^{(3)} \end{bmatrix}$ | — |
| 8 | $\frac{1}{\sqrt{6}}\begin{bmatrix} e_0^{(3)} & e_0^{(3)} & e_2^{(3)} \\ e_0^{(3)} & -e_0^{(3)} & -e_2^{(3)} \end{bmatrix}$ | — |
| 9 | $\frac{1}{\sqrt{6}}\begin{bmatrix} e_2^{(3)} & e_0^{(3)} & e_2^{(3)} \\ e_2^{(3)} & -e_0^{(3)} & -e_2^{(3)} \end{bmatrix}$ | — |
| 10 | $\frac{1}{\sqrt{6}}\begin{bmatrix} e_0^{(3)} & e_2^{(3)} & e_2^{(3)} \\ e_0^{(3)} & e_2^{(3)} & -e_2^{(3)} \end{bmatrix}$ | — |
| 11 | $\frac{1}{\sqrt{6}}\begin{bmatrix} e_2^{(3)} & e_0^{(3)} & e_0^{(3)} \\ e_2^{(3)} & e_0^{(3)} & -e_0^{(3)} \end{bmatrix}$ | — |

| Codebook index, n | υ = 5 | υ = 6 |
|---|---|---|
| 0 | $\frac{1}{\sqrt{10}}\begin{bmatrix} e_0^{(3)} & e_0^{(3)} & e_1^{(3)} & e_1^{(3)} & e_2^{(3)} \\ e_0^{(3)} & -e_0^{(3)} & e_1^{(3)} & -e_1^{(3)} & e_2^{(3)} \end{bmatrix}$ | $\frac{1}{2\sqrt{3}}\begin{bmatrix} e_0^{(3)} & e_0^{(3)} & e_1^{(3)} & e_1^{(3)} & e_2^{(3)} & e_2^{(3)} \\ e_0^{(3)} & -e_0^{(3)} & e_1^{(3)} & -e_1^{(3)} & e_2^{(3)} & -e_2^{(3)} \end{bmatrix}$ |
| 1-15 | — | — |

TABLE 24

W2 Codebook for υ-layer CSI reporting for L = 4

| Codebook index, n | υ = 1 | υ = 2 |
|---|---|---|
| 0 | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_0^{(4)} \\ e_0^{(4)} & -e_0^{(4)} \end{bmatrix}$ |
| 1 | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ |
| 2 | $\frac{1}{\sqrt{2}}\begin{bmatrix} e_0^{(4)} \\ j \cdot e_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ |
| 3 | $\frac{1}{\sqrt{2}}\begin{bmatrix} e_0^{(4)} \\ -j \cdot e_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ |
| 4 | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_2^{(4)} \end{bmatrix}$ |

TABLE 24-continued

W2 Codebook for υ-layer CSI reporting for L = 4

| n | 1 | 2 |
|---|---|---|
| 5 | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ |
| 6 | $\frac{1}{\sqrt{2}}\begin{bmatrix} e_1^{(4)} \\ j \cdot e_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ |
| 7 | $\frac{1}{\sqrt{2}}\begin{bmatrix} e_1^{(4)} \\ -j \cdot e_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ |
| 8 | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ |
| 9 | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ |
| 10 | $\frac{1}{\sqrt{2}}\begin{bmatrix} e_2^{(4)} \\ j \cdot e_0^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ |
| 11 | $\frac{1}{\sqrt{2}}\begin{bmatrix} e_2^{(4)} \\ -j \cdot e_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ |
| 12 | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ |
| 13 | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ |
| 14 | $\frac{1}{\sqrt{2}}\begin{bmatrix} e_3^{(4)} \\ j \cdot e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ |
| 15 | $\frac{1}{\sqrt{2}}\begin{bmatrix} e_3^{(4)} \\ -j \cdot e_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ |

| Codebook index, n | Number of layers υ | |
|---|---|---|
| | 3 | 4 |
| 0 | $\frac{1}{\sqrt{6}}\begin{bmatrix} e_0^{(4)} & e_0^{(4)} & e_1^{(4)} \\ e_0^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ e_0^{(4)} & e_1^{(4)} & -e_0^{(4)} & -e_1^{(4)} \end{bmatrix}$ |
| 1 | $\frac{1}{\sqrt{6}}\begin{bmatrix} e_1^{(4)} & e_0^{(4)} & e_1^{(4)} \\ e_1^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ je_0^{(4)} & je_1^{(4)} & -je_0^{(4)} & -je_1^{(4)} \end{bmatrix}$ |
| 2 | $\frac{1}{\sqrt{6}}\begin{bmatrix} e_0^{(4)} & e_1^{(4)} & e_1^{(4)} \\ e_0^{(4)} & e_1^{(4)} & -e_1^{(4)} \end{bmatrix}$ | $\frac{1}{2\sqrt{2}}\begin{bmatrix} e_1^{(4)} & e_2^{(4)} & e_1^{(4)} & e_2^{(4)} \\ e_1^{(4)} & e_2^{(4)} & -e_1^{(4)} & -e_2^{(4)} \end{bmatrix}$ |
| 3 | $\frac{1}{\sqrt{6}}\begin{bmatrix} e_1^{(4)} & e_0^{(4)} & e_0^{(4)} \\ e_1^{(4)} & e_0^{(4)} & -e_0^{(4)} \end{bmatrix}$ | $\frac{1}{2\sqrt{2}}\begin{bmatrix} e_1^{(4)} & e_2^{(4)} & e_1^{(4)} & e_2^{(4)} \\ je_1^{(4)} & je_2^{(4)} & -je_1^{(4)} & -je_2^{(4)} \end{bmatrix}$ |
| 4 | $\frac{1}{\sqrt{6}}\begin{bmatrix} e_1^{(4)} & e_1^{(4)} & e_2^{(4)} \\ e_1^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ e_2^{(4)} & e_3^{(4)} & -e_2^{(4)} & -e_3^{(4)} \end{bmatrix}$ |
| 5 | $\frac{1}{\sqrt{6}}\begin{bmatrix} e_2^{(4)} & e_1^{(4)} & e_2^{(4)} \\ e_2^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ je_2^{(4)} & je_3^{(4)} & -je_2^{(4)} & -je_3^{(4)} \end{bmatrix}$ |

TABLE 24-continued

W2 Codebook for υ-layer CSI reporting for L = 4

| | | |
|---|---|---|
| 6 | $\frac{1}{\sqrt{6}}\begin{bmatrix} e_1^{(4)} & e_2^{(4)} & e_2^{(4)} \\ e_1^{(4)} & e_2^{(4)} & -e_2^{(4)} \end{bmatrix}$ | $\frac{1}{2\sqrt{2}}\begin{bmatrix} e_3^{(4)} & e_0^{(4)} & e_3^{(4)} & e_0^{(4)} \\ e_3^{(4)} & e_0^{(4)} & -e_0^{(4)} & -e_0^{(4)} \end{bmatrix}$ |
| 7 | $\frac{1}{\sqrt{6}}\begin{bmatrix} e_2^{(4)} & e_1^{(4)} & e_1^{(4)} \\ e_2^{(4)} & e_1^{(4)} & -e_1^{(4)} \end{bmatrix}$ | $\frac{1}{2\sqrt{2}}\begin{bmatrix} e_3^{(4)} & e_0^{(4)} & e_3^{(4)} & e_0^{(4)} \\ je_3^{(4)} & je_0^{(4)} & -je_0^{(4)} & -je_0^{(4)} \end{bmatrix}$ |
| 8 | $\frac{1}{\sqrt{6}}\begin{bmatrix} e_2^{(4)} & e_2^{(4)} & e_3^{(4)} \\ e_2^{(4)} & -e_2^{(4)} & -e_3^{(4)} \end{bmatrix}$ | — |
| 9 | $\frac{1}{\sqrt{6}}\begin{bmatrix} e_3^{(4)} & e_2^{(4)} & e_3^{(4)} \\ e_3^{(4)} & -e_2^{(4)} & -e_3^{(4)} \end{bmatrix}$ | — |
| 10 | $\frac{1}{\sqrt{6}}\begin{bmatrix} e_2^{(4)} & e_3^{(4)} & e_3^{(4)} \\ e_2^{(4)} & e_3^{(4)} & -e_3^{(4)} \end{bmatrix}$ | — |
| 11 | $\frac{1}{\sqrt{6}}\begin{bmatrix} e_3^{(4)} & e_2^{(4)} & e_2^{(4)} \\ e_3^{(4)} & e_2^{(4)} & -e_2^{(4)} \end{bmatrix}$ | — |
| 12 | $\frac{1}{\sqrt{6}}\begin{bmatrix} e_3^{(4)} & e_3^{(4)} & e_0^{(4)} \\ e_3^{(4)} & -e_3^{(4)} & -e_0^{(4)} \end{bmatrix}$ | — |
| 13 | $\frac{1}{\sqrt{6}}\begin{bmatrix} e_0^{(4)} & e_3^{(4)} & e_0^{(4)} \\ e_0^{(4)} & -e_3^{(4)} & -e_0^{(4)} \end{bmatrix}$ | — |
| 14 | $\frac{1}{\sqrt{6}}\begin{bmatrix} e_3^{(4)} & e_0^{(4)} & e_0^{(4)} \\ e_3^{(4)} & e_0^{(4)} & -e_0^{(4)} \end{bmatrix}$ | — |
| 15 | $\frac{1}{\sqrt{6}}\begin{bmatrix} e_0^{(4)} & e_3^{(4)} & e_3^{(4)} \\ e_0^{(4)} & e_3^{(4)} & -e_3^{(4)} \end{bmatrix}$ | — |

| Codebook index, n | Number of layers υ | |
|---|---|---|
| | 5 | 6 |
| 0 | $\frac{1}{\sqrt{10}}\begin{bmatrix} e_0^{(4)} & e_0^{(4)} & e_1^{(4)} & e_1^{(4)} & e_2^{(4)} \\ e_0^{(4)} & -e_0^{(4)} & e_1^{(4)} & -e_1^{(4)} & e_2^{(4)} \end{bmatrix}$ | $\frac{1}{2\sqrt{3}}\begin{bmatrix} e_0^{(4)} & e_0^{(4)} & e_1^{(4)} & e_1^{(4)} & e_2^{(4)} & e_2^{(4)} \\ e_0^{(4)} & -e_0^{(4)} & e_1^{(4)} & -e_1^{(4)} & e_2^{(4)} & -e_2^{(4)} \end{bmatrix}$ |
| 1-15 | — | — |

| Codebook index, n | Number of layers υ |
|---|---|
| | 7 |
| 0 | $\frac{1}{\sqrt{14}}\begin{bmatrix} e_0^{(4)} & e_0^{(4)} & e_1^{(4)} & e_1^{(4)} & e_2^{(4)} & e_2^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} \end{bmatrix}$ |
| 1-15 | — |

| Codebook index, n | Number of layers υ |
|---|---|
| | 8 |
| 0 | $\frac{1}{4}\begin{bmatrix} e_0^{(4)} & e_0^{(4)} & e_1^{(4)} & e_1^{(4)} & e_2^{(4)} & e_2^{(4)} & e_3^{(4)} & e_3^{(4)} \\ e_0^{(4)} & -e_0^{(4)} & e_1^{(4)} & -e_1^{(4)} & e_2^{(4)} & -e_2^{(4)} & e_3^{(4)} & -e_3^{(4)} \end{bmatrix}$ |
| 1-15 | — |

In one embodiment 8F, the SB port selection matrix is supported only for rank 1 and rank 2 CSI reporting (according to at least one of the aforementioned embodiment 8 through embodiment 8E), and hence the UE can be configured with an L value from {1, 2, 3, 4}. For rank 3-8, port selection is WB and SB port selection is not supported (according to at least one of the aforementioned embodiment 7 through embodiment 7D). For rank 3-4, a fixed L=2 is used for WB port selection, for rank 5-6, a fixed L=3 is used for WB port selection, and for rank 7-8, a fixed L=4 is used for WB port selection.

In one embodiment 8G, the SB port selection matrix is supported only for rank 1-4 CSI reporting (according to at least one of the aforementioned embodiment 8 through embodiment 8E), and hence the UE can be configured with an L value from {1, 2, 3, 4}. For rank 5-8, port selection is WB and SB port selection is not supported (according to at least one of the aforementioned embodiment 7 through embodiment 7D). For rank 5-6, a fixed L=3 is used for WB port selection, and for rank 7-8, a fixed L=4 is used for WB port selection.

In one embodiment 8H, the SB port selection is configurable for example via higher layer RRC signalling or more dynamic MAC CE based or DCI signalling. If the UE is configured with SB port selection, then the UE uses the port selection codebook for CSI reporting according to at least one of the aforementioned embodiment 8 through embodiment 8G. Otherwise, the UE uses the codebook according to at least one of the aforementioned embodiment 7 through embodiment 7D.

In one embodiment 9, the supported values of L in the provided port selection codebook is according to at least one of the following alternatives: Alt 9-0: L belongs to {1, 2, 3, 4}; Alt 9-1: L belongs to {1, 2, 4}; Alt 9-2: L belongs to {1, 4}; and/or Alt 9-3: L belongs to {2, 3, 4}.

In one embodiment 10, the supported values of X in the provided port selection codebook is according to at least one of the following alternatives: Alt 10-0: X belongs to {2, 4, 8, 12, 16, 24, 32}; Alt 10-1: X belongs to {4, 8, 12, 16, 24, 32}; Alt 10-2: X belongs to {2, 4, 8} and L≤X/2; and Alt 10-3: X belongs to {2, 4, 8} or {2, 4, 6, 8} and L=X/2 and d=1.

In Alt 10-0, 10-1, and 5-2, $$W_1 = \begin{bmatrix} E_{\frac{X}{2} \times L} & 0 \\ 0 & E_{\frac{X}{2} \times L} \end{bmatrix}$$

(WB) port selection codebook structure is used for L out of X/2 port selection (per polarization).

In Alt 10-3, the WB port selection codebook is not needed, i.e., $W_1$ is an identity matrix. In one example of this alternative, LTE Class B, K=1 codebook is used for CSI reporting: L=1: LTE 2 port Class B, K=1 codebook is used (TABLE 21); L=2: LTE 4 port Class B, K=1 codebook is used (TABLE 22); L=2: 6 port codebook is used (TABLE 23); and L=4: LTE 8 port Class B, K=1 codebook is used (TABLE 24).

In one embodiment 11, a UE is configured with the number of polarization P in the port selection codebook according to at least one of the following alternatives. In one example of Alt 11-0, P=2 is fixed, and a port selection codebook is defined for a dual-polarized antenna port layout at the gNB according to some of the embodiments of the present disclosure.

In one example of Alt 11-1, the UE is configured with P=1 or 2 via 1-bit signaling via higher layer RRC or more dynamic MAC CE based or DCI signaling. In the UE is configured with P=2, then the UE uses a port selection codebook according to some of the embodiments of the present disclosure. Otherwise (i.e., P=1), the port selection codebook corresponds to at least one of the following alternatives.

In one example of Alt 11-1-0, if port selection is either WB only or SB only, then the port selection pre-coding matrix selects one port per layer. Example codebooks for X=2, 3, and 4 are shown in TABLES 25-27, respectively.

In one example of Alt 11-1-1, if port selection is dual-stage (both WB and SB), then the port selection pre-coding matrix has the following structure:

$$W = \frac{1}{\sqrt{R}} W_1 W_2,$$

where $W_1 = E_{X \times L}$ for WB selection of L out of X ports, where X=number of ports and R=rank. An example is $$E_{X \times L} = \begin{bmatrix} e^{(X)}_{mod(m,X)} & e^{(X)}_{mod(m+1,X)} & \cdots & e^{(X)}_{mod(m+L-1,X)} \end{bmatrix}$$

where $e^{(X)}$ is a length X port select column vector whose all entries all zero except i-th entry which is 1, m∈{0,1, ..., X−1}.

The overhead for WB port selection reporting (i.e., to report an m value) using the $W_1$ codeook is $\lceil \log_2 X \rceil$ bits, which is reported in a WB manner. $W_2$ is the SB port selection matrix for R layers. For X=1, $W_2$=1. For X=2, 3, and 4, the codebooks are shown in TABLES 25-27, respectively.

TABLE 25

Port selection codebook for υ layer CSI reporting for X = 2

| Codebook index, n | Number of layers υ | |
| --- | --- | --- |
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | — |

TABLE 26

Port selection codebook for υ layer CSI reporting for X = 3

| Codebook index, n | Number of layers υ | | |
| --- | --- | --- | --- |
| | 1 | 2 | 3 |
| 0 | $\begin{bmatrix}1\\0\\0\end{bmatrix}$ | $\frac{1}{\sqrt{2}}\begin{bmatrix}1 & 0\\0 & 1\\0 & 0\end{bmatrix}$ | $\frac{1}{\sqrt{2}}\begin{bmatrix}1 & 0 & 0\\0 & 1 & 0\\0 & 0 & 1\end{bmatrix}$ |
| 1 | $\begin{bmatrix}0\\1\\0\end{bmatrix}$ | $\frac{1}{\sqrt{2}}\begin{bmatrix}1 & 0\\0 & 0\\0 & 1\end{bmatrix}$ | — |

TABLE 26-continued

Port selection codebook for υ layer CSI reporting for X = 3

| Codebook index, n | Number of layers υ | | |
|---|---|---|---|
| | 1 | 2 | 3 |
| 2 | $\begin{bmatrix} 0 \\ 0 \\ 1 \end{bmatrix}$ | $\frac{1}{\sqrt{2}}\begin{bmatrix} 0 & 0 \\ 1 & 0 \\ 0 & 1 \end{bmatrix}$ | — |

TABLE 27

Port selection codebook for υ layer CSI reporting for X = 3

| Codebook index, n | Number of layers υ | | | |
|---|---|---|---|---|
| | 1 | 2 | 3 | 4 |
| 0 | $\begin{bmatrix} 1 \\ 0 \\ 0 \\ 0 \end{bmatrix}$ | $\frac{1}{\sqrt{2}}\begin{bmatrix} 1 & 0 \\ 0 & 1 \\ 0 & 0 \\ 0 & 0 \end{bmatrix}$ | $\frac{1}{\sqrt{3}}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 1 | $\begin{bmatrix} 0 \\ 1 \\ 0 \\ 0 \end{bmatrix}$ | $\frac{1}{\sqrt{2}}\begin{bmatrix} 1 & 0 \\ 0 & 0 \\ 0 & 1 \\ 0 & 0 \end{bmatrix}$ | $\frac{1}{\sqrt{3}}\begin{bmatrix} 1 & 0 & 0 \\ 0 & 1 & 0 \\ 0 & 0 & 0 \\ 0 & 0 & 1 \end{bmatrix}$ | — |
| 2 | $\begin{bmatrix} 0 \\ 0 \\ 1 \\ 0 \end{bmatrix}$ | $\frac{1}{\sqrt{2}}\begin{bmatrix} 1 & 0 \\ 0 & 0 \\ 0 & 0 \\ 0 & 1 \end{bmatrix}$ | $\frac{1}{\sqrt{3}}\begin{bmatrix} 1 & 0 & 0 \\ 0 & 0 & 0 \\ 0 & 1 & 0 \\ 0 & 0 & 1 \end{bmatrix}$ | — |
| 3 | $\begin{bmatrix} 0 \\ 0 \\ 0 \\ 1 \end{bmatrix}$ | $\frac{1}{\sqrt{2}}\begin{bmatrix} 0 & 0 \\ 1 & 0 \\ 0 & 1 \\ 0 & 0 \end{bmatrix}$ | $\frac{1}{\sqrt{3}}\begin{bmatrix} 0 & 0 & 0 \\ 1 & 0 & 0 \\ 0 & 1 & 0 \\ 0 & 0 & 1 \end{bmatrix}$ | — |
| 4 | — | $\frac{1}{\sqrt{2}}\begin{bmatrix} 0 & 0 \\ 1 & 0 \\ 0 & 0 \\ 0 & 1 \end{bmatrix}$ | — | — |
| 5 | — | $\frac{1}{\sqrt{2}}\begin{bmatrix} 0 & 0 \\ 0 & 0 \\ 1 & 0 \\ 0 & 1 \end{bmatrix}$ | — | — |

In one embodiment 12, a UE is configured with the port selection codebook for multiple antenna panels (M>1) at the gNB (cf. FIG. 16), which is according to at least one of the following alternatives. In one example of Alt 12-0, one out of M panels is selected, and then a single panel port selection codebook according to some embodiments of the present disclosure is used for CSI reporting. In this alternative, the port selection is restricted to within a panel. The panel selection is either configured by the network (e.g. via RRC or MAC CE based or DCI signaling) or is reported by the UE where this reporting is either WB or SB.

In one example of Alt 12-1, m out of M panels are selected, where 1≤m≤M, then the port selection is performed across the ports in the selected m panels, and a port selection codebook according to some embodiments of the present disclosure is used for CSI reporting. In this alternative, a layer can be transmitted across multiple panels. The panel selection is either configured by the network (e.g. via RRC or MAC CE based or DCI signaling) or is reported by the UE where this reporting is either WB or SB.

In one example of Alt 12-2, layers are transmitted from only one panel, i.e., a subset of layers is transmitted from Panel 0, another subset of layers is transmitted from Panel 1, and so on. Within a panel, a port selection codebook according to some embodiments of the present disclosure is used for CSI reporting.

A dual-stage $W=W_1W_2$ codebook for high-resolution CSI reporting is provided, wherein $W_1$ codebook is used to select: an orthogonal basis set comprising of uniformly spaced $(L_1,L_2)$ DFT beams; $L \in \{2, 3, 4, 6, 8\}$ beams freely out of the $L_1L_2$ DFT beams in a basis set; and per layer strongest beam out of L beams and two polarizations, where L is either (e.g. RRC) configurable or UE reports a preferred L value. This selection is WB or partial band (e.g. a set of SBs). Two examples of basis set sizes are restricted orthogonal basis set in which $L_1L_2=\min(8, N_1N_2)$ and full orthogonal basis set in which $L_1L_2=N_1N_2$, one of the two is either supported in the specification or configured via RRC signaling.

$W_2$ codebook is used to combine L beams independently per layer with a common $W_1$ beam group, i.e., the selected L beams are the same for all layers and two polarizations, but strongest beam selection is per layer. The amplitude and phase of the combining coefficients are reported separately where phase is reported per SB and amplitude is reported WB or SB or both WB and SB.

A UE is configured with a high-resolution CSI codebook in which the rank R pre-coding matrix is given by $$W = \frac{1}{\sqrt{R}}[\; W^{(0)} \;\; W^{(1)} \;\; \ldots \;\; W^{(R-1)}\;] \quad \text{(equation 2)}$$

where the pre-coding vector for layer l is given by $$W^{(l)} = \frac{W_1^{(l)}w_2^{(l)}}{\|W_1^{(l)}w_2^{(l)}\|}, \text{ where } W_1^{(l)} = \begin{bmatrix} B_l & 0 \\ 0 & B_l \end{bmatrix}P_{1,l}$$

if the strongest beam corresponds to one polarization, e.g. polarization 0 (or +45), $$W_1^{(l)} = \begin{bmatrix} 0 & B_l \\ B_l & 0 \end{bmatrix}P_{1,l}$$

if the strongest beam corresponds to other polarization, e.g. polarization 1 (or −45); and $W_2^{(l)}=P_{2,l}c_l$.

The matrices $B_l$, $P_{1,l}$, $P_{2,l}$, and vector $c_l$ are defined as follows. $B_l$ is a $N_1N_2 \times L$ basis matrix $$\left[ b_{k_{l,1}^{(0)},k_{l,2}^{(0)}}, \ldots, b_{k_{l,1}^{(L-1)},k_{l,2}^{(L-1)}} \right]$$

common to both polarizations, where $b_{k_{l,1}^{(i)},k_{l,2}^{(i)}}$ is one of the L orthogonal DFT beams selected from the selected $(L_1,L_2)$ basis set, and $\{(k_{l,1}^{(i)},k_{l,2}^{(i)}):i=0, 1, \ldots, L-1\}$ are corresponding indices of L beams where $(k_{l,1}^{(0)},k_{l,2}^{(0)})$ is the strongest beam for layer l. Note that for rank R>1, the strongest beam can be different for different layers, hence the index of the strongest beam is indicated per layer and this indication is WB.

$P_{1,l}$ is a 2L×2L diagonal matrix with diagonal elements $[1\ p_{1,l,1}\ \cdots\ p_{1,l,L-1}\ p_{1,l,L}\ p_{1,l,L+1}\ \cdots\ p_{1,l,2L-1}]$, each belonging to [0,1], to indicate WB component of the relative beam power levels across L beams and two polarizations.

$P_{2,l}$ is a 2L×2L diagonal matrix with diagonal elements $[1\ p_{2,l,1}\ \cdots\ p_{2,l,L-1}\ p_{2,l,L}\ p_{2,l,L+1}\ \cdots\ p_{2,l,2L-1}]$, each belonging to [0,1], to indicate SB component of the relative beam power levels across L beams and two polarizations. $c_l$ is a 2L×1 vector $[1\ c_{l,1}\ \cdots\ c_{l,L-1}\ c_{l,L}\ c_{l,L+1}\ \cdots\ c_{l,2L-1}]^T$, where $$c_{l,i} = \exp\left(\frac{j2\pi n}{2^N}\right) \forall\ i;$$

$n \in \{0, 1, \ldots, 2^N-1\}$, $N \in \{2,3,4\}$, to indicate SB relative phase of coefficients across L beams and two polarizations.

Note that one of the diagonal elements of $P_{1,l}$, $P_{2,l}$, and elements of $c_l$ is exactly one which corresponds to the strongest beam whose coefficient (both power and phase) can be assumed to be one in general. Also, if only WB components of relative beam power levels are reported, then $P_{2,l}$ is an identity matrix (hence not reported). Likewise, if only SB components of relative beam power levels are reported, then $P_{1,l}$ is an identity matrix (hence not reported).

In the rest of the present disclosure, $p_{1,l,i}$ and $p_{2,l,i}$ are referred to as amplitudes of beam combining coefficients or weights. They can also be referred to as beam power levels.

In one embodiment 13, a UE is configured with rank 3 and 4 high-resolution (Type II) CSI reporting according to the above-mentioned codebook (e.g., equation 2) in which layers are encoded independently and according to at least one of the following alternatives. In one example of Alt 13-0, L beams are selected (in a WB manner), where L is RRC configured, for example from {2, 3, 4}, and the linear combination (LC) of the selected L beams is performed (cf. equation 2) to determine rank 3 and 4 pre-coding matrices.

In one example of Alt 13-1, 2 beams are selected (in a WB manner) regardless of the configured L value and the linear combination (LC) of the selected 2 beams is performed (cf. equation 2) to determine rank 3 and 4 pre-coding matrices.

In one example of Alt 13-2, L beams are selected (in a WB manner), where L is RRC configured, for example from {2, 3, 4}, then 2 out of the selected L beams are selected per SB, and LC of the selected 2 beams is performed (cf. equation 2) to determine rank 3 and 4 pre-coding matrices. Note that in this alternative, $\lceil \log_2(_2{}^L) \rceil$ bits indication is needed to report 2 out of L beam selection per SB. In one alternative, this SB beam selection is common for all layers. In another alternative, it is independent for each layer. In this later alternative, $R\lceil \log_2(_2{}^L) \rceil$ bits indication is needed to report 2 out of L beam selection per SB, where R=3 or 4.

In one example of Alt 13-3, L beams are selected (in a WB manner), where L is RRC configured, for example from {2, 3, 4}, and for each layer, 2L coefficients are grouped into two groups, the first group comprises K stronger coefficients and the second group comprises the remaining 2L−K weaker coefficients. The information about the stronger and the weaker groups is indication per layer using WB amplitude reporting. For the stronger group, the reported WB amplitudes are positive $p_{1,l,L-1} > 0$, and for the weaker group, the reported WB amplitudes are zero $p_{1,l,L-1} = 0$. Then, the SB phases and SB amplitudes are reported only for the coefficients in the stronger group (for the weaker group, the SB phases and SB amplitudes are not reported since their WB amplitudes are 0). In one alternative, the value K is fixed for all L values, for example K=4. In another alternative, the value K depends on the L value. In another alternative, the value K depends on rank. For example, K=min(2L, 6) for rank 3 and K=4 for rank 4. In yet another alternative, the K value depends on both L and rank.

In one example of Alt 13-4, L beams are selected (n a WB manner), where L is RRC configured, for example from {2, 3, 4}, and differential reporting of rank 3 and 4 pre-coding matrices in multiple reporting instances is performed, where each differential rank 3 and 4 pre-coding matrix corresponds to L=2 beams. For differential reporting in number of beams (L value) and number of layers, a few examples of rank 3 and 4 CSI reporting is as follows.

In one instance of Ex 13-0, the differential is in number of beams, and rank 3 and 4 pre-coding matrices corresponding to L=2 beams are reported in each reporting instance. In one instance of Ex 13-1, the differential is in number of layer, and a subset of layers of rank 3 and 4 pre-coding matrices are reported in each reporting instance. In one instance of Ex 13-2, a combination of Ex 13-0 and Ex 13-1 is used.

In one embodiment 13-A, a UE is configured with rank 3 and 4 high-resolution (Type II) CSI reporting according to a variation of Alt 13-2 in the aforementioned embodiment 13 in which 2 beams are selected per layer for linear combination (LC) according to at least one of the following alternatives. In one example of Alt 13-A-0, L beams are selected (in a WB manner), where L is RRC configured, for example from {2, 3, 4}, and 2 out of the selected L beams are selected independently for each layer where this selection is WB. This requires $$R\left\lceil \log_2\binom{L}{2} \right\rceil$$

bits indication to report WB selection of 2 out of L beams per layer, where R=3 or 4.

In one example of Alt 13-A-1, L beams are selected (in a WB manner), where L is RRC configured, for example from {2, 3, 4}, and 2 out of the selected L beams are selected independently for each layer where this selection is SB. This requires $$R\left\lceil \log_2\binom{L}{2} \right\rceil$$

bit indication to report SB selection of 2 out of L beams per layer, where R=3 or 4.

In one example of Alt 13-A-2, 2 out of $N_1N_2$ orthogonal DFT beams are selected independently for each layer where this selection is WB. This requires $$R\left\lceil \log_2\binom{N_1N_2}{2} \right\rceil$$

bits indication to report WB selection of 2 out of $N_1N_2$ beams per layer, where R=3 or 4.

In one example of Alt 13-A-3, 2 out of $N_1N_2$ orthogonal DFT beams are selected independently for each layer where this selection is SB. This requires $$R\left\lceil \log_2 \binom{N_1N_2}{2} \right\rceil$$

bits indication to report SB selection of 2 out of $N_1N_2$ beams per layer, where R=3 or 4.

The LC of the selected 2 beams is then performed (cf. Equation 2) to determine rank 3 and 4 pre-coding matrices.

In one embodiment 13-B, a UE is configured with rank 3 and 4 high-resolution (Type II) CSI reporting according to a variation of Alt 13-2 in the aforementioned embodiment 13 in which 1<L beams are selected for LC according to at least one of the following alternatives.

In one example of Alt 13-B-0, L beams are selected (in a WB manner), where L is RRC configured, for example from {2, 3, 4}, and 1 out of the selected L beams are selected common for all layers where this selection is SB. This requires $$\left\lceil \log_2 \binom{L}{1} \right\rceil$$

bits indication to report SB selection of 1 out of L beams.

In one example of Alt 13-B-1, L beams are selected (in a WB manner), where L is RRC configured, for example from {2, 3, 4}, and 1 out of the selected L beams are selected independently for each layer where this selection is WB. This requires $$R\left\lceil \log_2 \binom{L}{1} \right\rceil$$

bits indication to report WB selection of 1 out of L beams per layer, where R=3 or 4.

In one example of Alt 13-B-2, L beams are selected (in a WB manner), where L is RRC configured, for example from {2, 3, 4}, and 1 out of the selected L beams are selected independently for each layer where this selection is SB. This requires $$R\left\lceil \log_2 \binom{L}{1} \right\rceil$$

bits indication to report SB selection of 1 out of L beams per layer, where R=3 or 4.

In one example of Alt 13-B-3, 1 out of $N_1N_2$ orthogonal DFT beams are selected independently for each layer where this selection is WB. This requires $$R\left\lceil \log_2 \binom{N_1N_2}{1} \right\rceil$$

bits indication to report WB selection of 1 out of $N_1N_2$ beams per layer, where R=3 or 4.

In one example of Alt 13-B-4, 1 out of $N_1N_2$ orthogonal DFT beams are selected independently for each layer where this selection is SB. This requires $$R\left\lceil \log_2 \binom{N_1N_2}{1} \right\rceil$$

bits indication to report SB selection of 1 out of $N_1N_2$ beams per layer, where R=3 or 4.

The LC of the selected 1 beams is then performed (cf. Equation 2) to determine rank 3 and 4 pre-coding matrices. The value 1 is either fixed or higher-layer configured (e.g. via RRC signaling) or reported by the UE. The value 1 may also vary depending on the configured value of L.

In one embodiment 13-C, a UE is configured with rank 3 and 4 high-resolution (Type II) CSI reporting according to a variation of Alt 13-3 in the aforementioned embodiment 13 in which L beams are selected (in a WB manner), where L is RRC configured, for example from {2, 3, 4}, and for each layer, 2L coefficients are grouped into two groups, the first group comprises K stronger coefficients and the second group comprises the remaining 2L−K weaker coefficients.

The information about the stronger and the weaker groups is indication implicitly per layer using WB amplitude reporting. For both the stronger group and the weaker group, the reported WB amplitudes are positive $p_{1,l,L-1} > 0$. Then, the SB phases (and SB amplitudes if configured to be reported) are reported individually for each coefficient in the stronger group, i.e., K phase values (and K amplitudes) are reported, and one common SB phase (and one common SB amplitude if configured to be reported) is (are) reported for all 2L−K coefficients in the weaker group.

The WB amplitudes of the weaker group can be reported either individually per coefficient or a common value for all coefficients comprising the weaker group. In one alternative, the value K is fixed for all L values, for example K=4. In another alternative, the value K depends on the L value. In another alternative, the value K depends on rank. For example, K=min(2L, 6) for rank 3 and K=4 for rank 4. In yet another alternative, the K value depends on both L and rank.

In one embodiment 13-D, a UE is configured with rank 3 and 4 high-resolution (Type II) CSI reporting according to a variation of Alt 13-3 in the aforementioned embodiment 13 in which L beams are selected (in a WB manner), where L is RRC configured, for example from {2, 3, 4}, and for each layer, 2L coefficients are grouped into three groups, the first group comprises K stronger coefficients, the second group comprises M weaker coefficients, and the third group comprises the remaining 2L−K−M coefficients with zero amplitude.

The information about the first, the second, and the third group is indication implicitly per layer using WB amplitude reporting. For the first group and the second group, the reported WB amplitudes are positive $p_{1,l,L-1} > 0$, and for the third group, the reported WB amplitudes are zero $p_{1,l,L-1} = 0$. Then, the SB phases (and SB amplitudes if configured to be reported) are reported individually for each coefficient in the first group, i.e., K phase values (and K amplitudes) are reported, and one common SB phase (and one common SB amplitude if configured to be reported) is (are) reported for all M coefficients in the second group.

The WB amplitudes of the second group can be reported either individually per coefficient or a common value for all coefficients comprising the second group. For the third group, SB amplitudes and phase values are not reported (since their WB amplitude is zero). In one alternative, K and M are fixed for all L values, for example K=2, M=2. In another alternative, their value depends on the L value. In another alternative, L values depend on rank. For example, K=3, M=1 for rank 3 and K=2, M=2 for rank 4. In yet another alternative, the K and M values depend on both L and rank.

In one embodiment 13-E, a UE is configured with rank 3 and 4 high-resolution (Type II) CSI reporting in which the number of beams for Layer 0 and 1 corresponds to the configured L value, for example from {2, 3, 4}, and is the same as rank 1 and rank 2 CSI reporting, and that for Layer 2 and Layer 3 are according to at least one of the following alternatives.

In one example of Alt 13-E-0, 2 out of the selected L beams (for Layer 0 and 1) are selected for Layer 2 and Layer 3, where the selection of the 2 beams is according to at least one of the alternatives in some embodiments in the present disclosure.

In one example of Alt 13-E-1, l<L out of the selected L beams (for Layer 0 and 1) are selected for Layer 2 and Layer 3, where the selection of the l beams is according to at least one of the alternatives in some embodiments in the present disclosure. The value l is fixed and the value can be the same or different for Layer 2 and 3. In one example, if L=4, then l belongs to {2, 3} for Layer 2, and l=2 for Layer 3.

In a sub-embodiment, the L value for rank 1 and rank 2 CSI reporting and that for Layer 0 and Layer 1 of rank 3 and rank 4 CSI reporting (as provided in this embodiment) are different. For example, L belongs to {2, 3, 4} for rank 1 and rank 2 CSI reporting, and min{3, L} beams are selected (out of L beams) for Layer 0 and Layer 1 of rank 3 and rank 4 CSI reporting. Layer 2 and Layer 3 remains the same as in either Alt 13-E-0 or Alt 13-E-1.

In one embodiment 13-F, let L be the number of beams selected (WB) for Layer 0-1 of rank 1-2 CSI reporting. Let $L_1$ and $L_2$ be the number of beams selected (WB) for Layer 0-1, and Layer 2-3, respectively of rank 3-4 CSI reporting. At least one of the configuration alternatives is used to configure L or/and $L_1$ or/and $L_2$. In one example of Alt 13-F-0, L is configured; one or both of $L_1$ and $L_2$ are either fixed or derived from the configured L.

In one example of Alt 13-F-1, L and $L_1$ are configured; $L_2$ is either fixed or derived from L or/and $L_1$. In one example of Alt 13-F-2, L and $L_2$ are configured; $L_1$ is either, fixed or derived from L or/and $L_2$. In one example of Alt 13-F-3, L, $L_1$, and $L_2$ are configured.

An example of the configuration is via high-layer RRC signaling.

In one embodiment 13-G, the values of L, $L_1$, and $L_2$ are configured/determined according to at least one of the following alternatives. In one example of Alt 13-G-0, $L_1$=L; $L_2$<L. In one example of Alt 13-G-1, $L_1$<L; $L_2$<L. In one example of Alt 13-G-2, $L_1$ belongs to {2, 3, 4}; $L_2$=2; and WB/SB selection of $L_2$ beams out of $L_1$ beams. In one example of Alt 13-G-3, $L_1$ belongs to {2, 3, 4}; $L_2$ belongs to {2,3} for layer 2, and $L_2$=2 for Layer 3 and WB/SB selection of $L_2$ beams out of $L_1$ beams. In one example of Alt 13-G-4, $L_1$ belongs to {2,3}; $L_2$=2; and WB/SB selection of $L_2$ beams out of $L_1$ beams. In one example of Alt 13-G-5, $L_1$ belongs to {2,3}; $L_2$ belongs to {2, 3} for layer 2, and $L_2$=2 for Layer 3 and WB/SB selection of $L_2$ beams out of $L_1$ beams.

In one embodiment 13-H, for each layer, the coefficient phase ($c_{l,i}$) for rank 3 and 4 CSI reporting is according to at least one of the following alternatives. In one example of Alt 13-H-0, QPSK alphabet is used to report coefficient phase, i.e., $$c_{l,i} \in \left\{ \exp\left(\frac{j2\pi n}{2^2}\right); n \in \{0, 1, \ldots, 2^2 - 1\} \right\}.$$

This is regardless of the coefficient phase quantization for rank 1 and rank 2 CSI reporting in which 8PSK alphabet can be configured for phase reporting.

In one example of Alt 13-H-1, for each layer, the 2L coefficients are divided into two groups, a stronger group comprising K coefficients and a weaker group comprising reaming 2L-K coefficients, and two different phase quantization codebooks are used to report the phase for the coefficients in the two groups. For example, QPSK codebook is used for the stronger group and BPSK codebook {1, −1} is used for the weaker group.

In one example of Alt 13-H-2, for each layer, the coefficient phases are reported comprising a single WB phase component (common for all SBs) and a SB phase component (independent for each SB).

In one example of 13-H-0, 2 bit codebook for the WB components is $$\left\{ e^{\frac{j\pi}{4}}, e^{\frac{j3\pi}{4}}, e^{\frac{j5\pi}{4}}, e^{\frac{j7\pi}{4}} \right\}$$

and 1 bit codebook for the SB component is $$\left\{ e^{-\frac{j\pi}{4}}, e^{\frac{j\pi}{4}} \right\}.$$

Note that the resultant phase is QPSK. In one instance of Example 13-H-1, bit codebook for the WB components is $$\left\{ e^{\frac{j\pi}{4}}, e^{\frac{j3\pi}{4}}, e^{\frac{j5\pi}{4}}, e^{\frac{j7\pi}{4}} \right\}$$

and 1 bit codebook for the SB component is $$\left\{ 1, e^{\frac{j\pi}{4}} \right\}.$$

Note that the resultant phase is 8PSK. In one instance of Example 13-H-2: 2 bit codebook for the WB components is $$\left\{ e^{\frac{j\pi}{4}}, e^{\frac{j3\pi}{4}}, e^{\frac{j5\pi}{4}}, e^{\frac{j7\pi}{4}} \right\}$$

and 1 bit codebook for the SB component is $$\left\{ e^{-\frac{j\pi}{4}}, 1 \right\}.$$

Note that the resultant phase is 8PSK. In one instance of Example 13-H-3, 2 bit codebook for the WB components is $$\left\{e^{\frac{j\pi}{4}}, e^{\frac{j3\pi}{4}}, e^{\frac{j5\pi}{4}}, e^{\frac{j7\pi}{4}}\right\}$$

and 2 bit codebook for the SB component is $$\left\{e^{-\frac{j\pi}{4}}, 1, e^{\frac{j\pi}{4}}, e^{\frac{j2\pi}{4}}\right\}.$$

Note that the resultant phase is 8PSK.

In one embodiment 13-I the coefficient amplitude reporting is always WB for rank 3 and rank 4 CSI reporting. This is regardless of rank 1 and rank 2 CSI reporting which can be configured with SB coefficient amplitude reporting in addition to the WB amplitude reporting.

In one embodiment 13-J, the rank 3 and rank 4 CSI reporting is according to a combination of alternatives in the aforementioned embodiment 13 through embodiment 13-I.

In one embodiment 14, a UE is configured with rank 3 and 4 high-resolution (Type II) CSI reporting according to the above-mentioned codebook (Equation 2) in which a subset of layers are encoded independently and the remaining layers are encoded dependently. The rank 3 and 4 codebooks are according to at least one of the following alternatives.

In one example of Alt 14-0, Layer 0 and Layer 1 are encoded independently and remaining layers are encoded dependently as follows: Layer 2 pre-coder is orthogonal to Layer 0 pre-coder. Two examples of Layer 2 pre-coder are $$W^{(2)} = \begin{bmatrix} p_0 \\ -p_1 \end{bmatrix} \text{ and } W^{(2)} = \begin{bmatrix} -p_0 \\ p_1 \end{bmatrix} \text{ where } W^{(0)} = \begin{bmatrix} p_0 \\ p_1 \end{bmatrix}$$

is the Layer 0 pre-coder; and Layer 3 pre-coder is orthogonal to Layer 1 pre-coder. Two examples of Layer 3 pre-coder are $$W^{(3)} = \begin{bmatrix} p_0 \\ -p_1 \end{bmatrix} \text{ and } W^{(3)} = \begin{bmatrix} -p_0 \\ p_1 \end{bmatrix} \text{ where } W^{(1)} = \begin{bmatrix} p_0 \\ p_1 \end{bmatrix}$$

is the Layer 1 pre-coder.

Note that in this alternative, Layer 0 and Layer 1 pre-coders are determined independently (independent codebook search, for example using two dominant eigenvectors). Once Layer 0 and Layer 1 pre-coders are determined, Layer 2 and Layer 3 pre-coders can be the determined based on Layer 0 and Layer 1 pre-coders without any codebook search.

In one example of Alt 14-1, Layer 0 and Layer 1 are encoded independently and remaining layers are encoded dependently as follows. In one instance, Layer 2 pre-coder is orthogonal to both Layer 0 and Layer 1 pre-coders. One example of such a pre-coder is as follows. Let $W^{(l)} = [c_0^{(l)} b_0^T \ldots c_{L-1}^{(l)} b_{L-1}^T c_L^{(l)} b_0^T c_{L+1}^{(l)} b_1^T \ldots c_{2L-1}^{(l)} b_{L-1}^T]$ where l=0 and 1 be the pre-coders for Layer 0 (l=0) and Layer 1 (l=1) that are determined independently (independent codebook search, for example using two dominant eigenvectors). The pre-coder for Layer 2 is then given by $W^{(2)}[d_0^{(l)} b_0^T d_1^{(l)} b_1^T \ldots d_{L-1}^{(l)} b_{L-1}^T -d_L^{(l)} b_0^T -d_{L+1}^{(l)} b_1^T \ldots -d_{2L-1}^{(l)} b_{L-1}^T]$ or $[-d_0^{(l)} b_0^T -d_1^{(l)} b_1^T \ldots -d_{L-1}^{(l)} b_{L-1}^T d_L^{(l)} b_0^T d_{L+1}^{(l)} b_1^T \ldots d_{2L-1}^{(l)} b_{L-1}^T]$, where $$d_r^{(2)} = \frac{d_r^{(0)} + d_r^{(1)}}{|d_r^{(0)} + d_r^{(1)}|}$$

for r=0, 1, 2, . . . , 2L−1. In another instance, Layer 3 pre-coder is orthogonal to one of Layer 0 pre-coder (as in Alt 14-0).

In one example of Alt 14-2, Layer 2 pre-coder is determined as in Alt 14-1 and Layer 3 pre-coder is orthogonal to one of Layer 1 pre-coder (as in Alt 14-0).

In one example of Alt 14-3, Alt 14-1 with Layer 2 and Layer 3 swapped.

In one example of Alt 14-4, Alt 1-2 with Layer 2 and Layer 3 swapped.

In one example of Alt 14-5, Layer 2 coefficients are a permutation of Layer 0 coefficients; and Layer 3 coefficients are a permutation of Layer 1 coefficients, where permutation is either only in amplitude or in phase or in both. The permutation of coefficients can be fixed. In another alternative, the UE is configured with the permutation rule that the UE may use where this configuration is either via higher-layer RRC signaling or more dynamic MAC CE based or DCI signaling. In yet another alternative, the UE reports a permutation rule out of a plurality of permutation rules, where the plurality of permutation rules is either fixed or configured, and the reporting of a permutation rule is either (a) WB or (b) SB or (c) common for Layer 2 and Layer 3 or (d) independent for Layer 2 and Layer 3 or (e) a combination of at least two of (a), (b), (c), and (d).

In one embodiment 15, a UE is configured with rank 3 and 4 high-resolution (Type II) CSI reporting in which all layers are encoded dependently. The extension of the aforementioned embodiments 13-15 to rank 5-8 CSI reporting is straightforward for those skilled-in-the-art.

The following embodiments 16 and 17 are applicable to rank 1 and rank 2 high-resolution (Type II) CSI codebook in which rank 1 and rank 2 high-resolution (Type II) CSI codebook is referred to as Type II SP codebook. They are also applicable to higher rank (3 and 4) high-resolution (Type II) CSI codebook provided according to some embodiments of the present disclosure in which layers are independently encoded.

In one embodiment 16, a UE is configured to report the L beam selection (from full orthogonal DFT basis) according to one of the following alternatives. In one example of Joint, this requires $$\left\lceil \log_2 \binom{N_1 N_2}{L} \right\rceil$$

bits signaling to report beam selection. In one example of Independent, this requires $L\lceil \log_2(N_1 N_2) \rceil$ bits signaling to report beam selection.

TABLE 28 summarizes the additional overhead of independent beam selection over joint beam selection. Note that the independent beam selection requires up to 8 additional bits.

TABLE 28

Additional overhead of independent over joint beam selection

| | | $N_1N_2$ | | | | | |
|---|---|---|---|---|---|---|---|
| | | 2 | 4 | 6 | 8 | 12 | 16 |
| L | 2 | 0 | 1 | 2 | 1 | 1 | 1 |
| | 3 | 0 | 4 | 4 | 3 | 4 | 2 |
| | 4 | 0 | 0 | 8 | 5 | 7 | 5 |

In one embodiment 17, a UE is configured to report the PMI (for high-resolution CSI reporting for up to rank 2) comprising a WB PMI $i_1$ and a SB PMI $i_2$. The WB PMI $i_1$ has the following components. In one example of Layer-common components: $(i_{1,1}, i_{1,2})$ to indicate the rotation factors $(q_1, q_2)$, requires $\lceil \log_2(O_1O_2) \rceil$ bits signaling; and $i_{1,3}$ for joint indication of L beams, requires $$\left\lceil \log_2 \binom{N_1N_2}{L} \right\rceil$$

bits signaling for joint indication and $L\lceil \log_2(N_1N_2) \rceil$ bits signaling for independent indication.

In another example of Layer-specific components: =1 for rank 1, and v=1,2 for rank 2: $i_{1,4,v}$ to indicate the strongest coefficient, requires $[\log_2 2L]$ bits per layer; and $i_{1,5,v}$ to indicate the WB amplitudes $p_{1,l,i}$ or $p_{r,l,i}^{(WB)}$, requires 3×(2L−1) bits per layer.

The SB PMI $i_2$ has the following components (layer-specific): v=1 for rank 1, and v=1, 2 for rank 2. $i_{2,1,v}$ to indicate the SB phases $c_{r,l,i}$, requires Z×(N−1)+2×(M−N) bits per layer. If SB amplitude reporting is configured, $i_{2,2,v}$ to indicate the SB amplitudes $p_{1,l,i}$ or $p_{r,l,i}^{(SB)}$, requires 1×(N−1) bits per layer, where Z∈{2, 3} for QPSK and 8PSK phase reporting, M=number of non-zero WB amplitude (note: M=2L if all $p_{1,l,i}$ or $p_{r,l,i}^{(WB)}$>0), N=min(K, M), where K=2L if amplitude reporting is configured WB only, and K=4, 4, and 6 for L=2, 3, and 4, respectively if amplitude reporting is configured WB+SB, and the grouping of 2L coefficients into two groups, the stronger group comprising N coefficients and the weaker group comprising M−N coefficients, is determined based on implicit ordering of the reported WB amplitudes.

In one embodiment 18, a UE is configured with a high-resolution (Type II) CSI reporting by extending the agreed rank 1 and rank 2 codebook and higher rank (>2) codebooks provided in the present disclosure to include L=1 for rank 1 and 2, and L>4, for example L=6 and 8 at least for low rank (for example rank 1-2).

Figure 17:
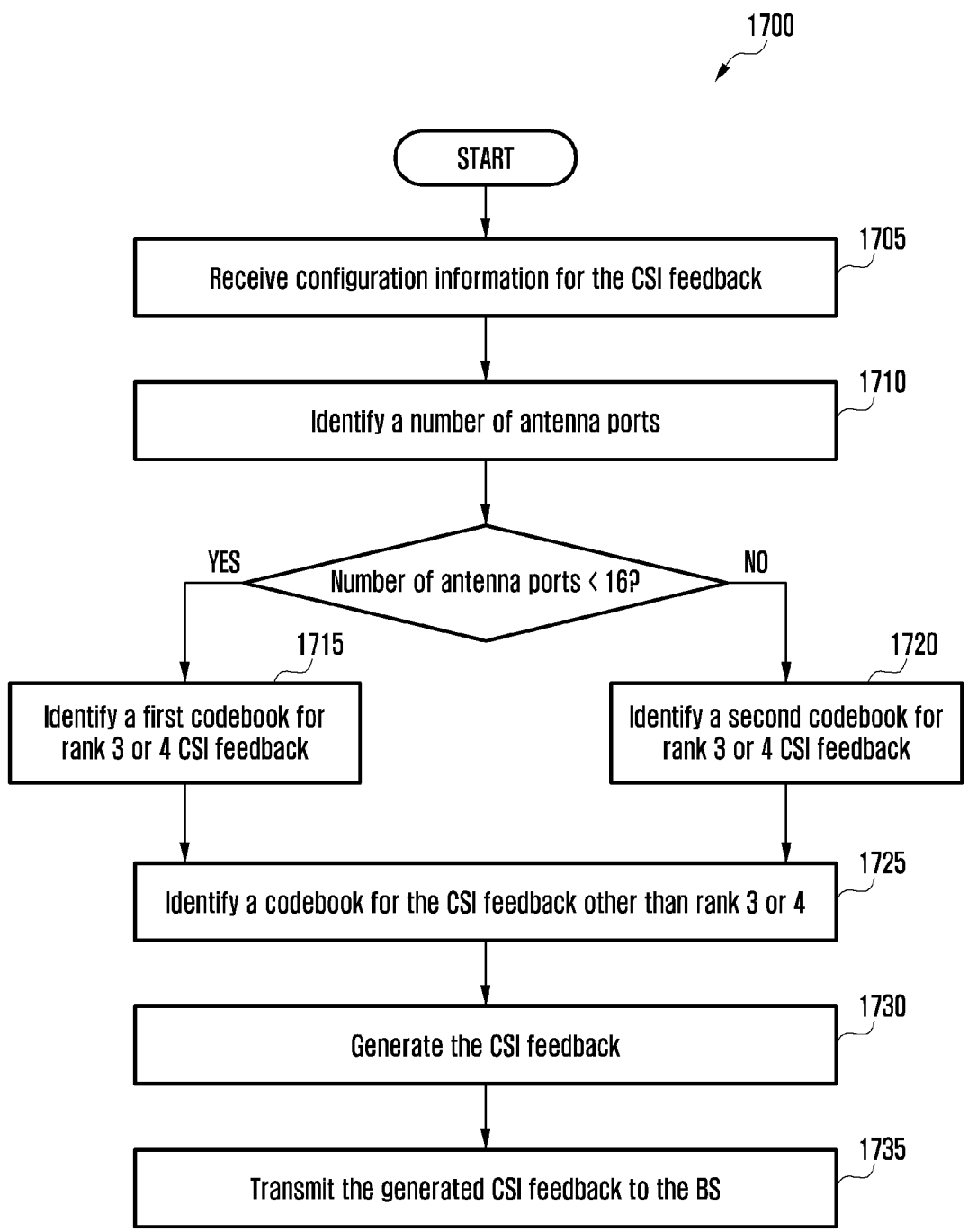
FIG. 17 illustrates a flow chart of a method for CSI reporting according to embodiments of the present disclosure.

FIG. 17 illustrates a flow chart of a method 1700 for CSI reporting according to embodiments of the present disclosure, as may be performed by a user equipment (UE). The embodiment of the method 1700 illustrated in FIG. 17 is for illustration only. FIG. 17 does not limit the scope of this disclosure to any particular implementation.

As shown in FIG. 17, the method 1700 begins at step 1705. At step 1705, the UE receives configuration information from a base station for the CSI feedback. At step 1705, the CSI feedback includes a pre-coding matrix indicator (PMI) that for the rank value of 3 or 4 includes PMI indices $i_{1,1}$, $i_{1,2}$, and $i_{1,3}$, At step 1710, the UE identifies a number of antenna ports for the CSI feedback.

At step 1715, the UE, if the number of antenna ports is <16, identifies a first codebook for the CSI feedback corresponding to a rank value of 3 or 4. Here, the rank value corresponds to a plurality of layers indicated by a RI and the first codebook has a structure that partitions the antenna ports into two equal partitions, $P_i$ where i=0,1. At step 1715, for the first codebook, the PMI indices $i_{1,1}$ and $i_{1,2}$ indicate a first beam $v_{i_{1,1},i_{1,2}}$, and the PMI index $i_{1,3}$ indicates a distance $(k_1,k_2)$ of a second beam $v_{i_{1,1}+k_1,i_{1,2}+k_2}$ with respect to the first beam $v_{i_{1,1},i_{1,2}}$, where $v_{i_{1,1},i_{1,2}}$ and $v_{i_{1,1}+k_1,i_{1,2}+k_2}$ are used in common for the two partitions, $P_i$. In one embodiment, when the number of antenna ports is <16, mapping of the PMI index $i_{1,3}$ to $k_1$ and $k_2$ for the CSI feedback corresponding to the rank value of 3 or 4 is determined according to:

| | $N_1=2, N_2=1$ | | $N_1=4, N_2=1$ | | $N_1=6, N_2=1$ | | $N_1=2, N_2=2$ | | $N_1=3, N_2=2$ | |
|---|---|---|---|---|---|---|---|---|---|---|
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | | $O_2$ |
| 3 | | | $4O_1$ | 0 | | | | | $2O_1$ | 0 |

At step 1715, $N_1$ and $N_2$ are higher layer signaled parameters that indicate a number of antenna ports with a same polarization in first and second dimensions, respectively, and $O_1$ and $O_2$ are oversampling factors in first and second dimensions, respectively, that are used to obtain a over-sampled two-dimensional discrete Fourier transform (DFT) codebook for the first and second beams, $v_{i_{1,1},i_{1,2}}$ and $v_{i_{1,1}+k_1,i_{1,2}+k_2}$.

In one embodiment, at step 1715, the CSI feedback corresponds to the rank value of 3. In such embodiment, when the number of antenna ports is <16, the first codebook is determined based on a pre-coding matrix:

$$W^{(3)}_{l,l',m,m',n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}.$$

In such embodiment, $l = j_{1,1}, m = i_{1,2}, l' = i_{1,1} + k_1, m' = i_{1,2} + k_2, p = i_{1,3}, n = i_2, P_{CSI-RS}$ $\varphi_n = e^{j\pi n/2}$ $\theta_p = e^{j\pi p/4}$ $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

-continued $$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

is the number of antenna ports, and $$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T.$$

In one embodiment, at step 1715, the CSI feedback corresponds to the rank value of 4. In such embodiment, when the number of antenna ports is <16, the first codebook is determined based on a pre-coding matrix:

$$W^{(4)}_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}.$$

In such embodiment, $l = i_{1,1}, m = i_{1,2}, l' = i_{1,1} + k_1, m' = i_{1,2} + k_{1,2}, p = i_{1,3}, n = i_2, P_{CSI-RS}$ $\varphi_n = e^{j\pi n/2}$ $\theta_p = e^{j\pi p/4}$ $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

is the number of antenna ports, and $$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T.$$

At step 1720, the UE, if the number of antenna ports is ≥16, identifies a second codebook for the CSI feedback corresponding to the rank value of 3 or 4. In various embodiments, the second codebook has a structure that partitions the antenna ports into four equal partitions by partitioning each partition $P_i$ further into two equal sub-partitions, $P_{i,j}$ where j=0,1. At step 1720, for the second codebook, the PMI indices $i_{1,1}$ and $i_{1,2}$ indicate a beam $\tilde{v}_{i_{1,1},i_{1,2}}$, and the PMI index $i_{1,3}$ indicates a co-phasing parameter $\theta_p$ between the two sub-partitions $P_{i,j}$ of each partition $P_i$ such that $\tilde{v}_{i_{1,1},i_{1,2}}$ is used for a first of the sub-partitions $P_{i,0}$ and $\theta_p \tilde{v}_{i_{1,1},i_{1,2}}$ is used for a second of the sub-partitions $P_{i,1}$. In one embodiment, the co-phasing parameter $\theta_p = e^{j\pi p/4}$, and $i_{1,3}=p=0,1,2,3$, or the PMI includes a PMI index $i_2$ that indicates a co-phasing parameter $\varphi_n$ between the two partitions $P_i$, where $\varphi_n = e^{j\pi n/2}$, and $i_2 = n = 0,1$.

In one embodiment, at step 1720, the CSI feedback corresponds to the rank value of 3. In such embodiment, when the number of antenna ports is ≥16, the second codebook is determined based on a pre-coding matrix:

$$W^{(3)}_{l,m,p,n} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}.$$

Here, the rows of $W^{(3)}_{l,l',m,m',n}$ correspond to the two partitions $P_i$ and the rows of $W^{(3)}_{l,m,p,n}$ correspond to the four sub-partitions $P_{i,j}$.

In one embodiment, at step 1720, the CSI feedback corresponds to the rank value of 4. In such embodiment, and when the number of antenna ports is ≥16, the second codebook is determined based on a pre-coding matrix:

$$W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & -\varphi_n \theta_p \tilde{v}_{l,m} \end{bmatrix}.$$

Here, the rows of $W_{l,l',m,m',n}$ correspond to the two partitions $P_i$ and the rows of $W_{l,m,p,n}$ correspond to the four sub-partitions $P_{i,j}$.

At step 1725, the UE identifies a codebook for the CSI feedback corresponding to a rank value other than 3 or 4. For example, the UE identifies the codebook for rank 1 and/or rank 2 CSI feedback. At step 1730, the UE generates the CSI feedback using the identified codebooks, for example, using one of the first and second codebook and the codebook identified in step 1725. At step 1735, the UE transmits the generated CSI feedback to the BS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

The invention claimed is:

1. A user equipment (UE) for channel state information (CSI) feedback, the UE comprising:
   a transceiver; and
   a processor operably connected to the transceiver, the processor configured to:
      receive, from a base station (BS) via the transceiver, configuration information for the CSI feedback,
      identify that a number of antenna ports configured by the configuration information for the CSI feedback is equal to or larger than 16,
      in response to identifying that the number of antenna ports for the CSI feedback is equal to or larger than 16, identify a codebook for the CSI feedback corresponding to a rank value of 3 or 4,
      generate the CSI feedback based on the identified codebook, and
      transmit, to the BS, the generated CSI feedback, wherein the codebook is based on a common beam $\tilde{v}_{i_{1,1},i_{1,2}}$ for the codebook, and a first co-phasing parameter $\varphi_n$ and a second co-phasing parameter $\theta_p$ applied to the common beam.

2. The UE of claim 1, wherein:
the CSI feedback includes a pre-coding matrix indicator (PMI) that for the rank value of 3 or 4 includes PMI indices $i_{1,1}$, $i_{1,2}$, and $i_{1,3}$, and
for the codebook, the PMI indices $i_{1,1}$ and $i_{1,2}$ indicate the common beam $\tilde{v}_{i_{1,1},i_{1,2}}$ and the PMI index $i_{1,3}$ indicates the second co-phasing parameter $\theta_p$.

3. The UE of claim 2, wherein, for the CSI feedback corresponding to the rank value of 3:
the codebook is determined based on a following pre-coding matrix:

$$W^{(3)}_{l,m,p,n} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$
$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$
$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

4. The UE of claim 2, wherein, for the CSI feedback corresponding to the rank value of 4:
the codebook is determined based on a following pre-coding matrix:

$$W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix},$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$
$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$
$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

5. The UE of claim 2, wherein the second co-phasing parameter $\theta_p = e^{j\pi p/4}$, where $i_{1,3}=p=0,1,2,3$.

6. The UE of claim 2, wherein the PMI that for the rank value of 3 or 4 further includes a PMI index $i_2$ that indicates the first co-phasing parameter $\varphi_n$, where $\varphi_n = e^{j\pi n/2}$, and $i_2 = n = 0,1$.

7. A base station (BS) for receiving channel state information (CSI) feedback, the BS comprising:
a transceiver;
a processor operably connected to the transceiver, the processor configured to:
transmit, to a user equipment (UE) via the transceiver, configuration information for the CSI feedback, and
receive, from the UE, the CSI feedback generated by the UE,
wherein a number of antenna ports configured by the configuration information for the CSI feedback is equal to or larger than 16 and the CSI feedback has a rank corresponding to a rank value of 3 or 4 that is generated based on a codebook, and
wherein the codebook is based on a common beam $\tilde{v}_{i_{1,1},i_{1,2}}$ for the codebook, and a first co-phasing parameter $\varphi_n$ and a second co-phasing parameter $\theta_p$ applied to the common beam.

8. The BS of claim 7, wherein:
the CSI feedback includes a pre-coding matrix indicator (PMI) that for the rank value of 3 or 4 includes PMI indices $i_{1,1}$, $i_{1,2}$, and $i_{1,3}$, and
for the codebook, the PMI indices $i_{1,1}$ and $i_{1,2}$ indicate the common beam $\tilde{v}_{i_{1,1},i_{1,2}}$, and the PMI index $i_{1,3}$ indicates the second co-phasing parameter $\theta_p$.

9. The BS of claim 8, wherein, for the CSI feedback corresponding to the rank value of 3:
the codebook is determined based on a following pre-coding matrix:

$$W^{(3)}_{l,m,p,n} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix},$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$
$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$
$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

10. The BS of claim 8, wherein, for the CSI feedback corresponding to the rank value of 4:
the codebook is determined based on a following pre-coding matrix:

$$W_{l,m,p,n}^{(4)} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix},$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

11. The BS of claim 8, wherein the second co-phasing parameter $\theta_p = e^{j\pi p/4}$, where $i_{1,3} = p = 0, 1, 2, 3$.

12. The BS of claim 8, wherein the PMI that for the rank value of 3 or 4 further includes a PMI index $i_2$ that indicates the first co-phasing parameter $\varphi_n$, where $\varphi_n = e^{j\pi n/2}$, and $i_2 = n = 0, 1$.

13. A method performed by a user equipment (UE) for channel state information (CSI) feedback, the method comprising:
 receiving, from a base station (BS), configuration information for the CSI feedback;
 identifying that a number of antenna ports configured by the configuration information for the CSI feedback is equal to or larger than 16;
 in response to identifying that the number of antenna ports for the CSI feedback is equal to or larger than 16, identifying a codebook for the CSI feedback corresponding to a rank value of 3 or 4;
 generating the CSI feedback using the identified codebook; and
 transmitting the generated CSI feedback to the BS,
 wherein the codebook is based on a common beam $\tilde{v}_{i_{1,1}, i_{1,2}}$ for the codebook, and a first co-phasing parameter $\varphi_n$ and a second co-phasing parameter $\theta_p$ applied to the common beam.

14. The method of claim 13, wherein:
 the CSI feedback includes a pre-coding matrix indicator (PMI) that for the rank value of 3 or 4 includes PMI indices $i_{1,1}$, $i_{1,2}$, and $i_{1,3}$, and
 for the codebook, the PMI indices $i_{1,1}$ and $i_{1,2}$ indicate the common beam $\tilde{v}_{i_{1,1}, i_{1,2}}$, and the PMI index $i_{1,3}$ indicates the second co-phasing parameter $\theta_p$.

15. The method of claim 14, wherein, for the CSI feedback corresponding to the rank value of 3:
 the codebook is determined based on a following pre-coding matrix:

$$W_{l,m,p,n}^{(3)} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix},$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

16. The method of claim 14, wherein, for the CSI feedback corresponding to the rank value of 4:
 the codebook is determined based on a following pre-coding matrix:

$$W_{l,m,p,n}^{(4)} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix},$$

where $l=i_{1,1}$, $m=i_{1,2}$, $l'=i_{1,1}+k_1$, $m'=i_{1,2}+k_2$, $p=i_{1,3}$, $n=i_2$, $P_{CSI-RS}$ is the number of antenna ports, and $$\varphi_n = e^{j\pi n/2}$$
$$\theta_p = e^{j\pi p/4}$$
$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

17. The method of claim 14, wherein the second co-phasing parameter $\theta_p = e^{j\pi p/4}$, where $i_{1,3} = p = 0, 1, 2, 3$.

18. The method of claim 14, wherein the PMI that for the rank value of 3 or 4 further includes a PMI index $i_2$ that indicates the first co-phasing parameter $\varphi_n$, where $\varphi_n = e^{j\pi n/2}$, and $i_2 = n = 0, 1$.

19. A method performed by a base station (BS) for receiving channel state information (CSI) feedback, the method comprising:
 transmitting, to a user equipment (UE), configuration information for the CSI feedback; and
 receiving, from the UE, the CSI feedback generated by the UE,
 wherein a number of antenna ports configured by the configuration information for the CSI feedback is equal to or larger than 16 and the CSI feedback has a rank corresponding to a rank value of 3 or 4 that is generated based on a codebook, and
 wherein the codebook is based on a common beam $\tilde{v}_{i_{1,1}, i_{1,2}}$ for the codebook, and a first co-phasing parameter $\varphi_n$, and a second co-phasing parameter $\theta_p$ applied to the common beam.

20. The method of claim 19, wherein:
the CSI feedback includes a pre-coding matrix indicator (PMI) that for the rank value of 3 or 4 includes PMI indices $i_{1,1}$, $i_{1,2}$, and $i_{1,3}$, and
for the codebook, the PMI indices $i_{1,1}$ and $i_{1,2}$ indicate the beam $\tilde{v}_{i_{1,1},i_{1,2}}$, and the PMI index $i_{1,3}$ indicates the second co-phasing parameter $\theta_p$.

21. The method of claim 20, wherein the first co-phasing parameter $\theta_p = e^{j\pi p/4}$, where $i_{1,3} = p = 0,1,2,3$.

22. The method of claim 20, wherein the PMI that for the rank value of 3 or 4 further includes a PMI index $i_2$ that indicates the co-phasing parameter $\varphi_n$, where $\varphi_n = e^{j\pi n/2}$, and $i_2 = n = 0,1$.

23. The method of claim 20, wherein, for the CSI feedback corresponding to the rank value of 3:
the codebook is determined based on a following pre-coding matrix:

$$W^{(3)}_{l,m,p,n} = \frac{1}{\sqrt{3P_{CSI-RS}}} \begin{bmatrix} \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix},$$

where $l = i_{1,1}$, $m = i_{1,2}$, $l' = i_{1,1} + k_1$, $m' = i_{1,2} + k_2$, $p = i_{1,3}$, $n = i_2$, $P_{CSI-RS}$ is the number of antenna ports, and $$\varphi_n = e^{j\pi n/2}$$

$$\theta_p = e^{j\pi p/4}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T.$$

24. The method of claim 20, wherein, for the CSI feedback corresponding to the rank value of 4:
the codebook is determined based on a following pre-coding matrix:

$$W^{(4)}_{l,m,p,n} = \frac{1}{\sqrt{4P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & \theta_p \tilde{v}_{l,m} & -\theta_p \tilde{v}_{l,m} & -\theta_p \tilde{v}_{l,m} \\ \varphi_n \tilde{v}_{l,m} & -\varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix},$$

where $l = i_{1,1}$, $m = i_{1,2}$, $l' = i_{1,1} + k_1$, $= i_{1,2} + k_2$, $p = i_{1,3}$, $n = i_2$, $P_{CSI-RS}$ is the number of antenna ports, and $$\varphi_n = e^{j\pi n/2}$$

$$\theta_p = e^{j\pi p/4}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T.$$

* * * * *

UNITED STATES PATENT AND TRADEMARK OFFICE
CERTIFICATE OF CORRECTION

PATENT NO. : 11,336,351 B2
APPLICATION NO. : 16/608785
DATED : May 17, 2022
INVENTOR(S) : Rahman et al.

It is certified that error appears in the above-identified patent and that said Letters Patent is hereby corrected as shown below:

In the Claims

Column 79, Claim 1, Line 2, delete "for the codebook, and a first co-phasing parameter $\varphi_n$" and insert --for the codebook, a first co-phasing parameter $\varphi_n$,--
Column 79, Claim 1, Line 3, delete "$\theta_p$ applied" and insert --$\theta_p$, and wherein the first co-phasing parameter $\varphi_n$ and the second co-phasing parameter $\theta_p$ are applied--
Column 79, Claim 1, Line 4, delete "common beam." and insert --common beam $\tilde{v}_{i_{1,1},i_{1,2}}$.--
Column 80, Claim 7, Line 24, delete "for the codebook, and a first co-phasing parameter $\varphi_n$" and insert --for the codebook, a first co-phasing parameter $\varphi_n$,--
Column 80, Claim 7, Line 25, delete "$\theta_p$ applied" and insert --$\theta_p$, and wherein the first co-phasing parameter $\varphi_n$ and the second co-phasing parameter $\theta_p$ are applied--
Column 80, Claim 7, Line 26, delete "common beam." and insert --common beam $\tilde{v}_{i_{1,1},i_{1,2}}$.--
Column 81, Claim 13, Line 45, delete "for the codebook, and a first co-phasing parameter $\varphi_n$" and insert --for the codebook, a first co-phasing parameter $\varphi_n$,--
Column 81, Claim 13, Line 45, delete "common beam." and insert --common beam $\tilde{v}_{i_{1,1},i_{1,2}}$.--
Column 81, Claim 13, Line 46, delete "$\theta_p$ applied" and insert --$\theta_p$, and wherein the first co-phasing parameter $\varphi_n$ and the second co-phasing parameter $\theta_p$ are applied--
Column 82, Claim 19, Line 65, delete "for the codebook, and a first" and insert --for the codebook, a first--
Column 82, Claim 19, Line 66, delete "$\theta_p$ applied" and insert --$\theta_p$, and wherein the first co-phasing parameter $\varphi_n$ and the second co-phasing parameter $\theta_p$ are applied--
Column 82, Claim 19, Line 66, delete "common beam." and insert --common beam $\tilde{v}_{i_{1,1},i_{1,2}}$.--
Column 83, Claim 20, Lines 5 & 6, delete "indicate the beam" and insert --indicate the common beam--
Column 83, Claim 22, Line 12, delete "the co-phasing parameter" and insert --the second co-phasing parameter--

Signed and Sealed this
Twentieth Day of June, 2023

Katherine Kelly Vidal
*Director of the United States Patent and Trademark Office*